US011047292B2

(12) United States Patent
Hayakawa et al.

(10) Patent No.: US 11,047,292 B2
(45) Date of Patent: Jun. 29, 2021

(54) IGNITION DEVICE AND INTERNAL COMBUSTION ENGINE

(71) Applicants: Kenichi Hayakawa, Kanagawa (JP); Kentaroh Hagita, Miyagi (JP); Naoto Jikutani, Miyagi (JP); Toshiyuki Ikeoh, Miyagi (JP)

(72) Inventors: Kenichi Hayakawa, Kanagawa (JP); Kentaroh Hagita, Miyagi (JP); Naoto Jikutani, Miyagi (JP); Toshiyuki Ikeoh, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 16/253,694

(22) Filed: Jan. 22, 2019

(65) Prior Publication Data

US 2019/0226387 A1 Jul. 25, 2019

(30) Foreign Application Priority Data

Jan. 23, 2018 (JP) ............................ JP2018-009215
Oct. 24, 2018 (JP) ............................ JP2018-200020

(51) Int. Cl.
*F02B 19/00* (2006.01)
*F02B 19/12* (2006.01)
(Continued)

(52) U.S. Cl.
CPC .......... *F02B 19/12* (2013.01); *F02B 19/1023* (2013.01); *F02B 19/16* (2013.01);
(Continued)

(58) Field of Classification Search
CPC .... Y02T 10/125; F02B 19/1066; F02B 19/12; F02B 19/1023; F02B 19/16; F02B 19/18; F02P 13/00; F02P 23/04; H01T 13/54
See application file for complete search history.

(56) References Cited

U.S. PATENT DOCUMENTS 3,980,060 A * 9/1976 Noguchi ............ F02B 19/1066 123/261
4,071,001 A * 1/1978 Goto .................. F02B 19/1066 123/260
(Continued)

FOREIGN PATENT DOCUMENTS

DE 102006018973 10/2007
JP 2014-522939 9/2014
(Continued)

OTHER PUBLICATIONS

Extended European Search Report for 19152891.8 dated Jun. 21, 2019.

*Primary Examiner* — Gonzalo Laguarda
(74) *Attorney, Agent, or Firm* — IPUSA, PLLC

(57) ABSTRACT

An ignition device configured to ignite a fuel included in an air-fuel mixture supplied to a main combustion chamber of an internal combustion engine. The ignition device includes a partition member that forms a precombustion chamber that encloses an ignition point of a fuel. The partition member has a plurality of communicating holes communicating between the main combustion chamber and the precombustion chamber. The ignition device further includes a first interference member that protrudes inward from an inner surface of the partition member.

16 Claims, 34 Drawing Sheets

(51) Int. Cl.

| | |
|---|---|
| ***F02P 23/04*** | (2006.01) |
| ***F02B 19/10*** | (2006.01) |
| ***F02B 19/18*** | (2006.01) |
| ***F02B 19/16*** | (2006.01) |
| ***H01T 13/54*** | (2006.01) |

(52) U.S. Cl.

CPC .............. *F02B 19/18* (2013.01); *F02P 23/04* (2013.01); *H01T 13/54* (2013.01); *F02B 19/1066* (2013.01)

(56) References Cited

U.S. PATENT DOCUMENTS

| | | | | |
|---|---|---|---|---|
| 8,375,911 | B2 | 2/2013 | Weinrotter et al. | |
| 9,935,420 | B2 | 4/2018 | Izumiya et al. | |
| 2012/0060791 | A1* | 3/2012 | Woerner ................. | F02B 19/12 123/260 |
| 2012/0125287 | A1 | 5/2012 | Chiera et al. | |
| 2013/0186362 | A1 | 7/2013 | Kanehara et al. | |
| 2014/0165980 | A1 | 6/2014 | Chiera et al. | |
| 2014/0225497 | A1 | 8/2014 | Woerner et al. | |
| 2016/0273443 | A1 | 9/2016 | Chiera et al. | |

FOREIGN PATENT DOCUMENTS

| | | |
|---|---|---|
| JP | 5630765 | 11/2014 |
| JP | 2016-072617 | 5/2016 |
| JP | 2016-512914 | 5/2016 |
| JP | 6099295 | 3/2017 |
| WO | 2010/112279 | 10/2010 |

* cited by examiner

IGNITION DEVICE AND INTERNAL COMBUSTION ENGINE

BACKGROUND OF THE INVENTION

1. Field of the Invention

The present invention relates to an ignition device and an internal combustion engine.

2. Description of the Related Art

An ignition plug is known, for example, a laser ignition plug provided at a cylinder head and igniting an air-fuel mixture present in a pre-chamber through laser radiation (for example, see Japanese Laid-Open Patent Application No. 2014-522939).

SUMMARY OF THE INVENTION

An ignition device according to one aspect of the present invention ignites a fuel included in an air-fuel mixture supplied to a main combustion chamber of an internal combustion engine. The ignition device includes a partition member that forms a precombustion chamber enclosing an ignition point of a fuel. The partition member includes a plurality of communicating holes communicating between the main combustion chamber and the precombustion chamber. The ignition device further includes a first interference member projecting inward from an inner surface of the partition member.

Other objects, features, and advantages of the present invention will become more apparent from the following detailed description when read in conjunction with the accompanying drawings.

DETAILED DESCRIPTION OF THE EMBODIMENTS

Figure 1:
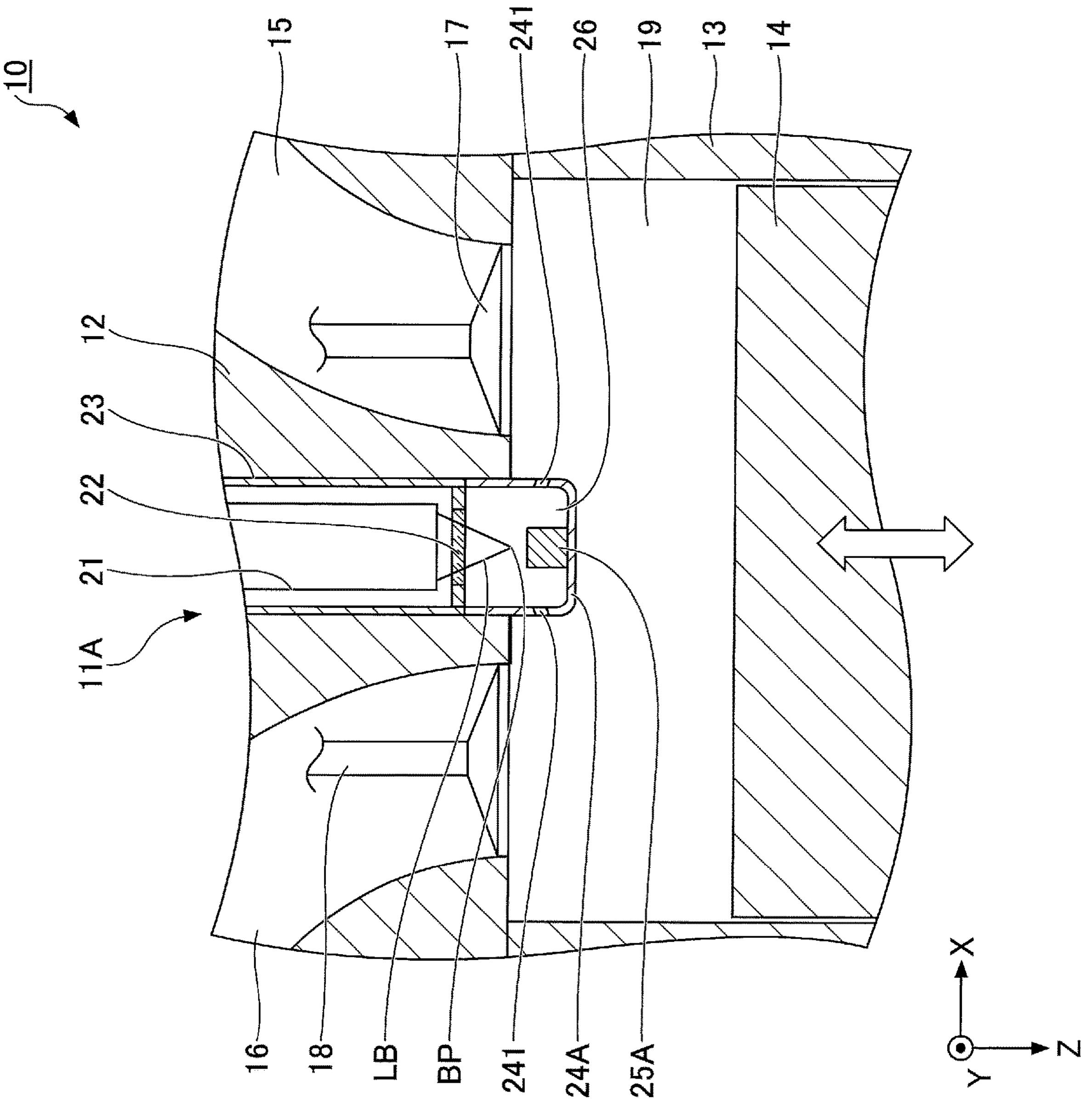
FIG. 1 is a sectional view of an internal combustion engine including an ignition device according to a first embodiment.

Recently, it is desirable to improve the efficiency of an engine for power generation for a cogeneration system from a viewpoint of a reduction in $CO_2$ and a reduction in $NO_N$. In order to improve the efficiency of an engine, it is desirable to implement stable combustion of a fuel included in a thin air-fuel mixture in the engine under high super charging, high compression, and super thin conditions.

In a case of implementing spark ignition under high super charging, high compression, and super thin conditions, the cylinder pressure before ignition is high and the cylinder has a super-thin condition. Therefore, it is desired to remarkably increase energy to be supplied to an ignition plug. As an ignition device used in such an engine, a pre-chamber plug, for example, may be used where a pre-chamber is used to more efficiently burn a thin air-fuel mixture.

As such a pre-chamber plug, an ignition plug is known, for example. The ignition plug that is a laser ignition plug provided at a cylinder head ignites an air-fuel mixture present in a pre-chamber by emitting laser radiation (for example, see Japanese Laid-Open Patent Application No. 2014-522939).

However, in such an ignition device according to the related art, during a compression stroke of an engine, an air-fuel mixture flows into a pre-chamber from a main combustion chamber through pre-chamber holes that communicate between the main combustion chamber and the pre-chamber. As a result of an air-fuel mixture flowing into the pre-chamber, the flow-rate of the air-fuel mixture in the pre-chamber is high. Therefore, in a case where an ignition point is in a zone where the flow rate of the air-fuel mixture is high, an initial flare generated through ignition may be easily extinguished, and as a result, it may be impossible to surely ignite the fuel in the combustion chamber.

The present disclosure has an object to provide an ignition device capable of reducing the flow rate of an air-fuel mixture at and near an ignition point to improve the stability in ignition.

An ignition device according to the present disclosure ignites a fuel included in an air-fuel mixture supplied to a main combustion chamber of an internal combustion engine. The ignition device includes a partition member to form a precombustion chamber surrounding an ignition point of a fuel. The partition member includes a plurality of communicating holes communicating between the main combustion chamber and the precombustion chamber. The ignition device further includes a first interference member projecting inward from an inner surface of the partition member.

According to an ignition device of the present disclosure, it is possible to reduce the flow rate of an air-fuel mixture at and near an ignition point to improve the stability in ignition.

Below, embodiments will be described in detail.

First Embodiment

Below, a case where an ignition device according to a first embodiment is applied to an internal combustion engine will be described with reference to drawings. Concerning the present embodiment, a case where, as an internal combustion engine, a gas engine for power generation is used will be described.

<Internal Combustion Engine>

FIG. 1 is a sectional view illustrating an internal combustion engine including an ignition device according to the first embodiment. Herein, a three-dimensional coordinate system for 3-axis orthogonal directions (an x-axis direction, a y-axis direction, and a z-axis direction) will be used. Hereinafter, it is assumed that a direction in which a light source of a laser device emits laser light is a +z direction. It is assumed that, on a plane perpendicular to the optical axis of laser light, one direction of mutually perpendicular two directions is an x-axis direction and the other direction is a y-axis direction.

As illustrated in FIG. 1, the internal combustion engine (that may be simply referred to as an engine) 10 includes an ignition device 11A, a cylinder head 12, a cylinder 13, a piston 14, a suction port 15, an ejection port 16, a suction valve 17, and an the ejection valve 18. In the cylinder 13, a main combustion chamber 19 of the engine 10 is formed from being surrounded by the ignition device 11A, the cylinder head 12, the piston 14, the suction valve 17, and the ejection valve 18.

An extending end of the ignition device 11A projects from the cylinder head 12 to the main combustion chamber 19. The ignition device 11A includes a laser device 21, a window member 22, a housing 23, a pre-chamber cap (a partition member) 24A, and a first interference member 25A. An air-fuel mixture supplied to the main combustion chamber 19 is supplied from the main combustion chamber 19 to a precombustion chamber 26 that is a pre-chamber inside the pre-chamber cap 24A through a plurality of communicating holes (pre-chamber holes) 241 of the pre-chamber cap 24A. The air-fuel mixture supplied to the precombustion chamber 26 is irradiated with laser light LB where the laser light LB is focused. As a result of generating plasma at a focal point of the laser light LB as an ignition point (a breakdown point) BP, the fuel included in the air-fuel mixture is ignited. The ignition device 11A will be described later in detail.

The cylinder head 12 is made in a cylinder block that is a molded product made of an iron, an aluminum alloy, or the like.

The cylinder 13 is a metal member shaped as a hollow cylinder having a bottom, which has a plurality of openings to receive the ignition device 11A, the suction valve 17, and the ejection valve 18. In an operating state, the suction valve 17 and the ejection valve 18 are opened to supply an air and a fuel to the main combustion chamber 19 at a predetermined supply ratio.

The piston 14 is connected with a crank shaft and a coupling rod, both not illustrated: the piston 14 reciprocally moves due to a rotation of the crank shaft.

The ignition device 11A, the suction valve 17, and the ejection valve 18 are electrically connected with a not-illustrated drive unit installed outside the engine 10, and the ignition device 11A is controlled by the drive unit on the basis of instructions provided by a not-illustrated control unit.

Operation of the engine 10 will now be briefly described. The suction valve 17 is raised in a suction port 15 to jet a combustible air-fuel mixture including a fuel and an air from the suction port 15 to the main combustion chamber 19 (a suction stroke). Thereafter, the piston 14 is raised to compress the air-fuel mixture (a compression stroke). The compressed air-fuel mixture in the main combustion chamber 19 is supplied to the precombustion chamber 26 of the ignition device 11A. In the ignition device 11A, laser light emitted from a laser device 21 is focused in the supplied air-fuel mixture, and thus, plasma is generated. The generated plasma ignites the fuel included in the air-fuel mixture. As a result of the fuel being thus ignited in the precombustion chamber 26, precombustion of the air-fuel mixture occurs. Then, the air-fuel mixture, the precombustion of which has occurred in the precombustion chamber 26, is jetted as an ignition flare to the main combustion chamber 19 through the pre-chamber holes 241 of the pre-chamber cap 24A. The fuel of the air-fuel mixture in the main combustion chamber

19 is ignited by the ignition flare, and main combustion occurs. Then, a combustion gas in the main combustion chamber 19 expands. As a result, the piston 14 is lowered (a combustion stroke). Thereafter, the ejection valve 18 is raised in the ejection port 16, and then, from the ejection port 16, the combustion gas is ejected to the outside of the main combustion chamber 19 (an exhaust stroke).

Thus, in the engine 10, a series of processes are repeated at a cycle that includes the four processes including the suction stroke, the compression stroke, the combustion stroke, and the exhaust stroke. Then, in response to the change in the volume of the gas in the main combustion chamber 19, the piston 14 moves, and thus, kinetic energy is generated. As the fuel, for example, a natural gas, a town gas, or the like may be used.

Note that, emitting of laser light in the ignition device 11A is controlled by the not-illustrated derive device on the basis of instructions provided from the not-illustrated control unit. The suction valve 17 and the ejection valve 18 are controlled by not-illustrated units to operate at appropriate timings with respect to the four processes.

The engine 10 is a 4-cycle engine. However, the engine 10 may be a 2-cycle engine.

<Ignition Device>

Figure 2:
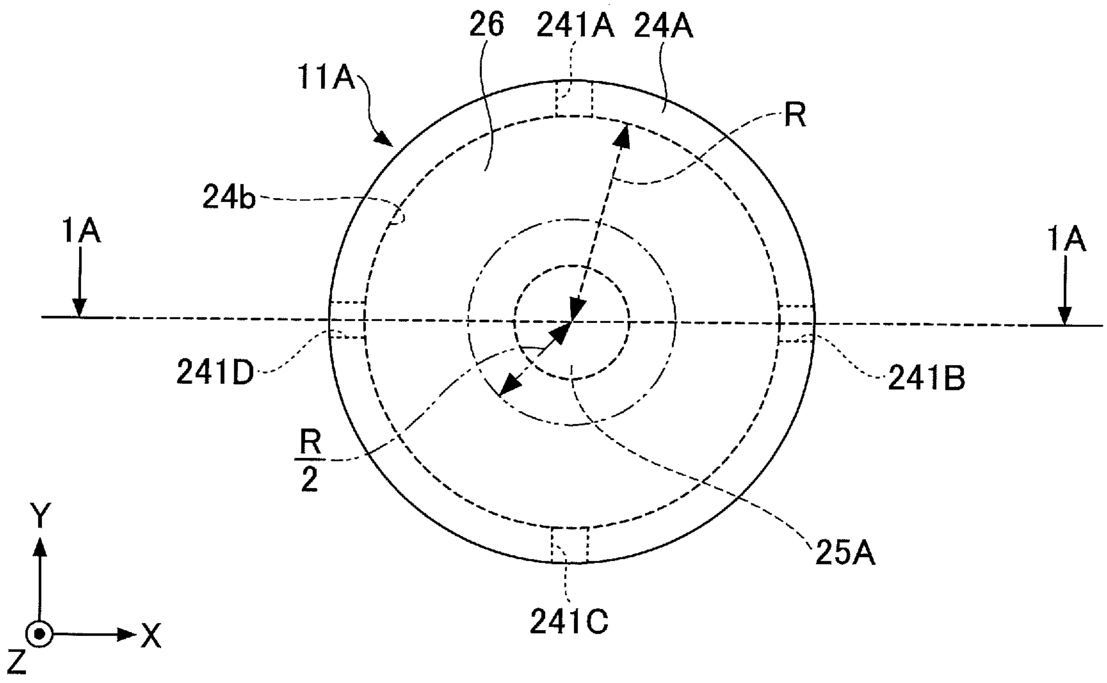
FIG. 2 is a front view illustrating a configuration of a pre-chamber cap obtained from viewing the ignition device according to the embodiment from a main combustion chamber side.
Figure 3:
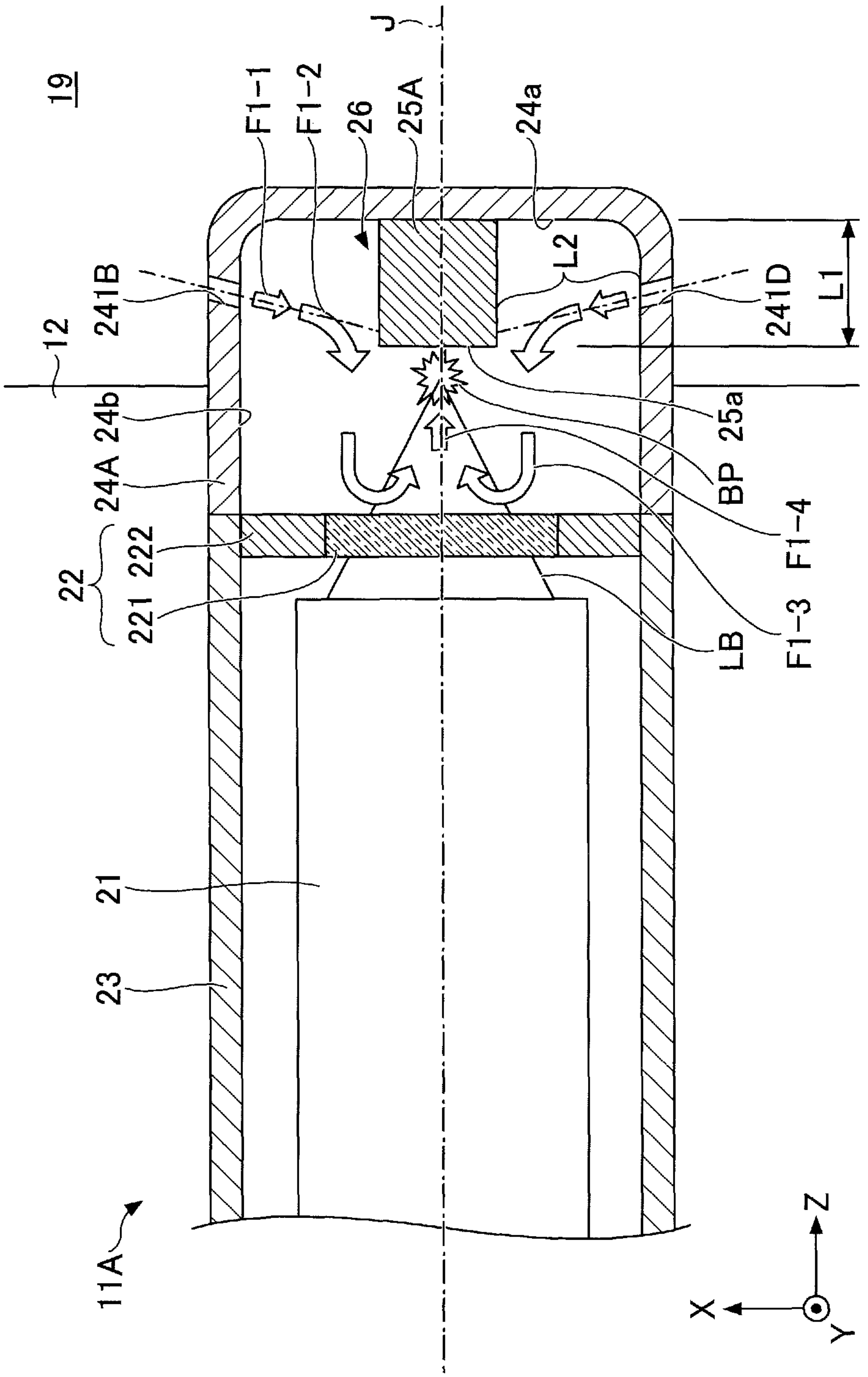
FIG. 3 is a sectional view taken along a 1A-1A line illustrated in FIG. 2.

The ignition device 11A will now be described. A structure of the ignition device 11A is illustrated in FIGS. 2 and 3. FIG. 2 is a front view illustrating a structure of the pre-chamber cap 24A obtained from viewing the ignition device according to the present embodiment from the main combustion chamber 19 side. FIG. 3 is a sectional view taken along a line 1A-1A of FIG. 2. Note that alternate long and short dash lines in FIGS. 3 and 4 denote a central axis J extending along the longitudinal direction of the ignition device 11A. The central axis J is coincident with the optical axis of laser light emitted from the laser device, and also coincident with the central axis of the laser device.

As illustrated in FIGS. 2 and 3, the ignition device 11A includes the laser device 21, the window member 22, the housing 23, the pre-chamber cap 24A, and the first interference member 25A. Inside the pre-chamber cap 24A, the precombustion chamber (i.e., the pre-chamber) 26 is formed.

The laser device 21 includes a light source emitting laser light and a condensing optical system that condenses and focuses the laser light. The laser device 21 condenses laser light LB emitted from the light source in the precombustion chamber 26. The laser device 21 is installed in such a manner that the longitudinal directional axis of the laser device 21 (the z-axis direction) is laid in parallel to the direction (the z-axis direction) along which the piston 14 (see FIG. 1) moves reciprocally.

As the light source, for example, a semiconductor laser such as a surface-emitting laser or an edge emitting laser may be used. Thereamong, it is desirable to use a surface-emitting laser as the light source. A surface-emitting laser is a light source for excitation, and includes a plurality of light emitting elements. Each light emitting element is a VCSEL (Vertical Cavity Surface Emitting Laser). A wavelength of laser light emitted from a surface-emitting laser is, for example, approximately 808 nm. A surface-emitting laser has a very small wavelength fluctuation in emitted laser light due to a temperature variation. Therefore, a surface-emitting laser is an advantageous light source to be used for increasing an energy density of laser light in a Q-switched laser resonator having a large characteristic fluctuation due to a variation in wavelength. A surface-emitting laser is electrically connected with a not-illustrated drive unit and driven by a not-illustrated engine control unit to emit laser light.

The condensing optical system includes at least one condenser lens. As the condenser lens, a lens suitable for a desired cross-sectional area of laser light and so forth is selected. The condensing optical system condenses laser light LB emitted from the light source.

The condensing optical system may further include, in addition to the condenser lens, a concave lens that causes laser light to diverge and a collimator lens that collimates laser light. In addition, the condensing optical system may further include other optical elements such as an optical fiber, a Q-switched laser resonator, and so forth.

By providing an optical fiber, the condensing optical system can be such that laser light emitted from the light source is incident on one end of the optical fiber and emitted from the other end of the optical fiber. Thus, it is possible to cause laser light to emit from any position through the optical fiber, resulting in an improvement in freedom of an arrangement of the light source and the condensing optical system. In addition, it is possible to make the light source distant from a high temperature zone around the engine 10 (see FIG. 1), and thus, it is possible to increase available variations in a cooling method for the engine 10. Furthermore, because it is possible to provide the light source at a position away from the engine 10 (see FIG. 1) that is a vibration source, it is possible to prevent laser light emitted from the light source from being vibrated.

In the condensing optical system, by providing a Q-switched laser resonator mentioned above, it is possible to increase energy density incident on the laser resonator and to emit laser light having the wavelength of, for example, approximately 1064 nm with a short pulse width. The increase in energy density of laser light incident on the laser resonator is implemented as a result of the laser light being amplified through a resonation in the laser resonator. Then, when the absorbed amount of the laser light has become saturated, a Q-switched oscillation occurs. As a result, laser light having high energy density is emitted with a short pulse width in a condition where the energy is condensed. Note that in a case where the condensing optical system is provided with the laser resonator, laser light incident on the laser resonator is also called “excitation light”. Laser light incident on the laser resonator is also called “pulse laser light”. The wavelength of pulse laser light is, for example, approximately 1064 nm.

The laser device 21 condenses laser light through the condensing optical system so that it is possible to obtain high energy at a focal point. As a result of the energy density of condensed laser light LB exceeding certain energy density, molecules of the gas included in the air-fuel mixture in the precombustion chamber 26 are ionized, separated into cations and electrons, and thus, become plasma (i.e., a breakdown occurs).

The window member 22 includes, as illustrated in FIG. 3, an optical window 221 and an optical window holding member 222. Laser light LB emitted from the condensing optical system is transmitted through the optical window 221 and focused in the precombustion chamber 26.

The optical window 221 is placed, as illustrated in FIG. 3, on a light path of laser light LB emitted from the laser device 21.

A shape of the optical window 221 in a plan view is not particularly limited, and, for example, may be a rectangular shape, a circular shape, an elliptical shape, an oblong shape, a polygonal shape, or the like.

The optical window 221 is made of a transparent or a semitransparent material. As a material of the optical window 221, for example, an optical glass, a heat-resistant glass, a quartz glass, a sapphire glass, or the like may be used. The optical window 221 needs to have a sufficient pressure resisting strength for protecting the optical members and so forth inside the housing 23 from a combustion pressure generated in the precombustion chamber 26. As a material of the optical window 221, it is desirable to use a sapphire glass that has superior durability under high temperature and high pressure environments even if the thickness of the optical window 221 is small.

The optical window 221 may have an AR (Anti Reflection) film on a face on which laser light is incident. The AR film is provided on the incident face of the optical window 221 and restrains reflection of laser light. The AR film has a high transmission factor with respect to laser light having the wavelength of 1064 nm.

As the material of the AR film, for example, a material composed mainly of any one of Si, Na, Al, Ca, Mg, B, C, Ca, Ti, V, Cr, Mn, Fe, Co, Ni, Cu, Zn, Ga, Sr, Zr, Nb, Ru, Pd, Ag, In, Sn, Hf, Ta, W, Ot, Au, and Bi; or a material that includes at least any one of a nitride, an oxide, a carbide, and a fluoride of the above-mentioned main ingredient may be used. As a method of forming the AR film onto the optical window 221, for example, vapor deposition, sputtering, thermal splaying, coating, a sol-gel method, or the like may be used. The AR film may be of a single layer or of a multiple layers.

As illustrated in FIG. 3, the optical window holding member 222 is fixed to the inner surface of the housing 23. The optical window holding member 222 may be fixed to the inner surface of the housing 23 through welding, screwing, shrinkage fitting, with the use of an adhesive, or the like.

It is possible to fix and hold the optical window 221 to the inner surface of the optical window holding member 222 through brazing with the use of a brazing filler metal as a joining material. Note that, as the joining material, other than a brazing filler metal, another material may be used that has heat resistance at a high temperature condition. In addition, it is also possible to fix the optical window 221 to the optical window holding member 222 through screwing, shrinkage fitting, or the like instead of using a joining material.

As a material of the optical window holding member 222, for example, a heat-resistant metal material such as iron, nickel, a Ni—Fe-based alloy, a Ni—Cr—Fe-based alloy, a Ni—Co—Fe-based alloy, or stainless steel may be used. As a Ni—Cr—Fe-based alloy, for example, inconel or the like may be cited. As a Ni—Co—Fe-based alloy, for example, kovar or the like may be cited. Thereamong, according to the present embodiment, because it is desirable to make the optical window 221 of sapphire, it is desirable to use koval to form the optical window holding member 222: koval has a heat expansion coefficient close to the heat expansion coefficient of sapphire.

It is desirable to form the optical window holding member 222 of the same material as the material of the housing 23 to which the optical window holding member 222 is fixed. The optical window holding member 222 and the housing 23 are exposed to the inside of the precombustion chamber 26, and therefore, may be likely to be affected by the temperature of the precombustion chamber 26. As the optical window holding member 222 and the housing 23 are made of the same materials, the optical window holding member 222 and the housing 23 have the same heat expansion coefficients. Therefore, when the temperatures of the optical window holding member 222 and the housing 23 become high temperatures as a result of being affected by the temperature of the precombustion chamber 26 (for example, on the order of hundreds of degrees Celsius through approximately a thousand of degrees Celsius), it is possible to restrain a stress generated due to a heat expansion coefficient difference from being applied to the joint between the optical window holding member 222 and the housing 23. As a result, it is possible to reduce a load applied to the joint due to the stress difference which may cause the joint between the optical window holding member 222 and the housing 23 to be pulled and may cause a crack in the joint. As a result, it is possible to stably fix the optical window 221 to the optical window holding member 222.

The pre-chamber cap 24A is provided, as illustrated in FIG. 3, to protrude from an end of the housing 23 toward the main combustion chamber 19, and to provide a space (a pre-chamber) inside. The pre-chamber is the precombustion chamber 26. The pre-chamber cap 24A is joined to the housing 23 with the use of a brazing filler metal or through welding. The pre-chamber cap 24A is formed to have a circular shape similar to the housing 23 when viewed from the axial direction (the z-axis direction) of the ignition device 11A.

The pre-chamber cap 24A is made of, for example, a heat-resistant metal such as iron, a Ni—Fe-based alloy, a Cr—Fe-based alloy, a Ni—Cr—Fe-based alloy, a Ni—Co—Fe-based alloy, or stainless steel. As a Ni—Cr—Fe-based alloy, for example, inconel or the like may be cited. As a Ni—Co—Fe-based alloy, for example, koval or the like may be cited.

The pre-chamber cap 24A includes, as illustrated in FIGS. 2 and 3, first communicating holes (first pre-chamber holes) 241A-241D formed from the inner circumferential surface of the pre-chamber cap 24A communicating between the main combustion chamber 19 and the precombustion chamber 26. Concerning the present embodiment, the pre-chamber holes 241A-241D provided from the inner circumferential surface 24*b* that is a surface perpendicular to the axial direction (the z-axis direction) of the pre-chamber cap 24A are referred to as first pre-chamber holes.

The first pre-chamber holes 241A-241D are arranged at approximately equal intervals to draw a circle on the inner circumferential surface 24*b* of the pre-chamber cap 24A. An air-fuel mixture supplied to the main combustion chamber 19 is supplied to the precombustion chamber 26 from the main combustion chamber 19 through the first pre-chamber holes 241A-241D.

As illustrated in FIG. 3, it is desirable that the first pre-chamber holes 241A-241D are provided from the inner circumferential surface 24*b* of the pre-chamber cap 24A in such a manner that the respective axes (the central axes of the holes) do not cross the ignition point BP. As a result, it is possible to reduce flowing of an air-fuel mixture at the ignition point BP, and thus, the flow rates of an air-fuel mixture at and near the ignition point BP are reduced. Note that FIG. 3 illustrates only the axes of the first pre-chamber holes 241B and 241D. In this regard, the axes of the other first pre-chamber holes 241A and 241C have inclinations the same as or similar to the inclinations of the axes of the first pre-chamber holes 241B and 241D.

As illustrated in FIG. 3, the first pre-chamber holes 241A-241D are provided from the inner circumferential surface 24*b* of the pre-chamber cap 24A in such a manner that the respective axes cross the first interference member 25A. An air-fuel mixture flowing through the first pre-chamber holes 241A-241D into the precombustion chamber 26 is likely to collide with the first interference member 25A, thus the flow directions of the air-fuel mixture can be changed easily, and the air-fuel mixture is likely to flow toward the optical window 221. Thus, the flow rates of the air-fuel mixture at and near the ignition point BP are reduced.

As illustrated in FIG. 3, it is desirable that the first pre-chamber holes 241A-241D are provided in such a manner the ignition point BP is near the point at which the respective axes of the first pre-chamber holes 241A-241D cross each other. The first pre-chamber holes 241A-241D are provided in such a manner that each of the first pre-chamber holes 241A-241D crosses the first interference member 25A. Therefore, the flows of an air-fuel mixture supplied from the main combustion chamber 19 through the first pre-chamber holes 241A-241D into the precombustion chamber 26 are changed by the first interference member 25A when the air-fuel mixture flows at and near the ignition point BP.

The first pre-chamber holes 241A-241D are provided at such positions that, as illustrated in FIG. 2, any one of the first pre-chamber holes 241A-241D is opposite to another one with respect to the first interference member 25A present between these two holes. According to the present embodiment, among the first pre-chamber holes 241A-241D, the first pre-chamber holes 241A is opposite to the first pre-chamber holes 241C with respect to the first interference member 25A present between these two holes. The first pre-chamber hole 241B is opposite to the first pre-chamber holes 241D with respect to the first interference member 25A present between these two holes. Note that "opposite positions" are not to be such that any hole of the first pre-chamber holes 241A-241D is absolutely opposite to another hole with respect to the first interference member 25A present between these two holes and may be partially deviated from being absolutely opposite.

In addition, the number of the first pre-chamber holes 241A-241D is an even number. However, the number of first pre-chamber holes may be an even number or an odd number. Note that, in a case where the number of first pre-chamber holes is an odd number, any one hole from among the first pre-chamber holes does not have another first pre-chamber hole that is opposite with respect to the first interference member 25A present between these two holes.

The first interference member 25A is provided, as illustrated in FIG. 3, on a front inner surface 24*a* of the pre-chamber cap 24A at the main combustion chamber 19 side (i.e., nearer to the piston 14 (see FIG. 1)) to project inward from the front inner surface 24*a*. In other words, the first interference member 25A is provided as if the thickness of the pre-chamber cap 24A in the axial direction (the z-axis direction) is made greater by the first interference member 25A. According to the present embodiment, the first interference member 25A is formed to have a cylindrical shape.

The first interference member 25A has either one or both of a function to reduce the flow rates of an air-fuel mixture and a function to change the flow directions of an air-fuel mixture. In other words, the first interference member 25A can function as a flow rate reducing member or a flow direction changing member.

As described above, the first interference member 25A is provided on the front inner surface 24*a* in such a manner that, as illustrated in FIG. 3, the first interference member 25 is crossed by the respective axes of the first pre-chamber holes 241A-241D. As a result, an air-fuel mixture having flowed through the first pre-chamber holes 241A-241D into the precombustion chamber 26 collides with the first interference member 25A so that the flow directions of the air-fuel mixture are changed and the air-fuel mixture is likely to flow toward the optical window 221. Thus, the flow rates of the air-fuel mixture at and near the ignition point BP are reduced.

The first interference member 25A is designed in such a manner the ignition point BP is near an end face 25*a* of the first interference member 25A. Near the end face 25*a* of the first interference member 25A, a boundary layer of an air-fuel mixture is formed. Inside the boundary layer, the flow rates of an air-fuel mixture are low. Therefore, by providing the end face 25*a* near the ignition point BP, the ignition point BP is included in the boundary layer of an air-fuel mixture, and therefore, it is easy for an initial flare to be stably formed.

According to the present embodiment, it is desirable that the first interference member 25A is placed at such a position that the distance between the ignition point BP and the end face 25*a* of the first interference member 25A is smaller than or equal to 30% of the inner diameter of the pre-chamber cap 24A. In addition, the first interference member 25A is placed at such a position that the distance between the ignition point BP and each of the axes of the first pre-chamber holes 241A-241D is smaller than or equal to 50% of the inner diameter of the pre-chamber cap 24A. As a result, it is possible to reduce the flow rates of an air-fuel mixture flowing at and near the ignition point BP and increase the flow rates of an air-fuel mixture outside the zone at and near the ignition point BP. The greater the flow rates of an air-fuel mixture inside the precombustion chamber 26 are, the more likely a flare generated in the precombustion chamber 26 is to spread faster, and thus, the more strongly an ignition flare is jetted.

As illustrated in FIG. 2, the first interference member 25A is desirable to be provided in such a manner as to be crossed by the straight line connecting between each opposite pair of the first pre-chamber holes 241A-241D. According to the present embodiment, the first interference member 25A is provided in such a manner that the first interference member 25A is crossed by the straight line connecting between the opposite first pre-chamber holes 241A and 241C and the straight line connecting between the opposite first pre-chamber holes 241B and 241D. As a result, an air-fuel mixture flowing from the main combustion chamber 19 through the first pre-chamber holes 241A-241D into the precombustion chamber 26 is likely to collide with the first interference member 25A and the flow directions of the air-fuel mixture are changed.

A material of the first interference member 25A is not limited. The first interference member 25A can be made of a material the same as or similar to the material of the pre-chamber cap 24A.

Figure 4:
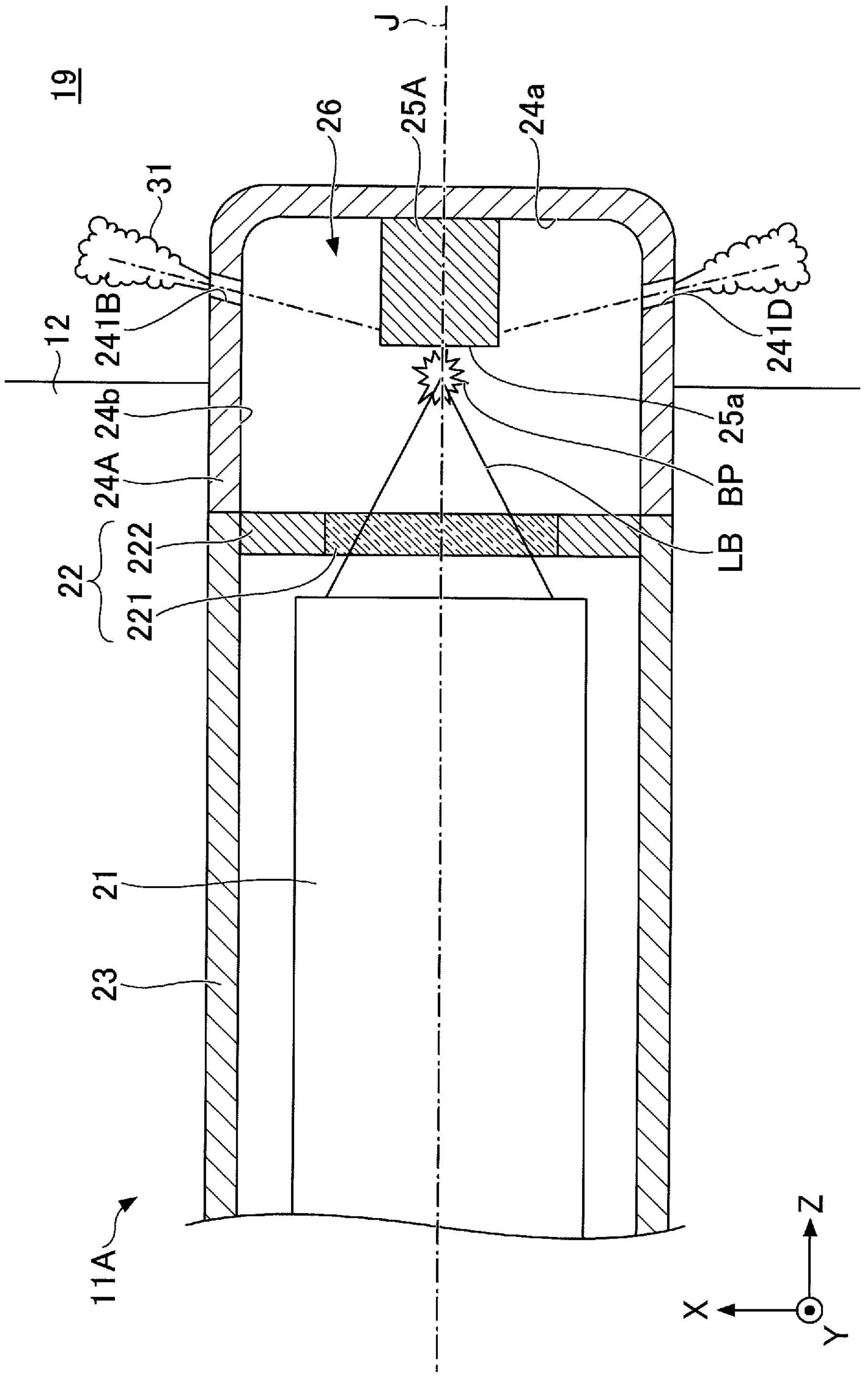
FIG. 4 illustrates a state where an ignition flare is generated.

The ignition device 11A configured as described above is such that, as illustrated in FIG. 4, laser light LB emitted from the laser device 21 passes through the optical window 221 and is focused inside the precombustion chamber 26. As a result of an air-fuel mixture supplied to the main combustion chamber 19 being forcibly supplied from the main combustion chamber 19 through the first pre-chamber holes 241A-241D into the precombustion chamber 26, the focal point of laser light LB functions as the ignition point BP and combustion of the fuel of the air-fuel mixture occurs (precombustion). As a result of an occurrence of precombustion of the fuel, as illustrated in FIG. 4, an ignition flare 31 is generated. The generated ignition flare 31 passes through the first pre-chamber holes 241A-241D and is jetted to the main combustion chamber 19. The ignition flare 31 jetted to the main combustion chamber 19 ignites the fuel of the air-fuel mixture in the main combustion chamber 19 and combustion of the fuel occurs (main combustion). In addition, as a result of the ignition flare 31 being jetted through the first pre-chamber holes 241A-241D to the main combustion chamber 19, the ignition energy in the main combustion chamber 19 is increased.

At this time, as illustrated in FIG. 3, the air-fuel mixture is supplied from the main combustion chamber 19 through the first pre-chamber holes 241A-241D into the precombustion chamber 26. As a result of the air-fuel mixture flowing into the precombustion chamber 26, as illustrated in FIG. 3, the air-fuel mixture flows along an arrow F1-1. As a result of the air-fuel mixture then colliding with the first interference member 25A, the flow directions of the air-fuel mixture are changed into flow directions as illustrated by an arrow F1-2, and the air-fuel mixture flows toward the window member 22 that includes the optical window 221 and the optical window holding member 222. As a result of the air-fuel mixture then colliding with the window member 22, the flow of the air-fuel mixture is inverted as illustrated as an arrow F1-3, and the air-fuel mixture flows toward the first interference member 25A. At and near the ignition point BP, the air-fuel mixture flows toward the first interference member 25A as illustrated by an arrow F1-4. After precombustion thus occurs at the ignition point BP, the air-fuel mixture in the precombustion chamber 26 becomes an ignition flare 31 and is jetted through the first pre-chamber holes 241A-241D (see FIG. 2) (see FIG. 4). According to the present embodiment, at and near the ignition point BP, because of being inside the boundary layer of the air-fuel mixture near the end face 25*a* of the first interference member 25A, the flow rates of the air-fuel mixture are reduced: such a state is advantageous to form a stable initial flare.

As a result of the flow directions of the air-fuel mixture being changed from the flow directions illustrated by the arrow F1-1 to the flow directions illustrated by the arrow F1-2, the ignition point BP is not exposed to the flows of the air-fuel mixture having flowed from the first pre-chamber holes 241A-241D. Therefore, it is possible form a flare stably at an initial stage of fuel combustion.

Thus, in the ignition device 11A, the first interference member 25A is provided in the precombustion chamber 26 inside the pre-chamber cap 24A to project inward from the front inner surface 24*a* of the pre-chamber cap 24A on the main combustion chamber 19 side. The first interference member 25A is provided on the front inner surface 24*a* in such a manner as to be crossed by the respective axes of the first pre-chamber holes 241A-241D. The first pre-chamber holes 241A-241D are provided in such a manner that the ignition point BP is near the axes of the first pre-chamber holes 241A-241D. As a result of the first interference member 25A being provided to be crossed by the axes of the first pre-chamber holes 241A-241D, the first interference member 25A can change the flow directions of an air-fuel mixture having flowed through the first pre-chamber holes 241A-241D into the precombustion chamber 26. As a result, it is possible to reduce the flow rates of an air-fuel mixture at and near the ignition point BP. As a result, it is possible to stably form an initial flare at the ignition point BP, and therefore, it is possible to stably ignite a fuel. As a result, it is possible to improve stability in ignition of a fuel by laser light LB in the precombustion chamber 26. In addition, it is possible to maintain the flow rates of an air-fuel mixture outside the zone at and near the ignition point BP, and therefore, it is possible to jet an ignition flare 31 through the first pre-chamber holes 241A-241D (see FIG. 4) to the main combustion chamber 19 uniformly.

In the ignition device 11A, the first interference member 25A is provided in such a manner that the ignition point is in the boundary layer near the end face 25*a* of the first interference member 25A. In this regard, it is possible to make the flow rates of an air-fuel mixture inside the boundary layer lower than the flow rates of an air-fuel mixture outside the boundary layer. As a result, it is possible to reduce the flow rates of an air-fuel mixture at and near the ignition point BP.

In the ignition device 11A, the first interference member 25A is provided to be crossed by the axes of the first pre-chamber holes 241A-241D. As a result, it is easy for an air-fuel mixture supplied through the first pre-chamber holes 241A-241D to collide with the first interference member 25A, and therefore, it is possible to reduce the flow rates of an air-fuel mixture at and near the ignition point BP. As a result, it is possible to stably ignite the fuel. In addition, because it is possible to maintain the flow rates of an air-fuel mixture outside of the zone at and near the ignition point BP, it is possible to make it easier to jet an ignition flare 31 (see FIG. 4) to the main combustion chamber 19 uniformly.

In the ignition device 11A, the first interference member 25A is provided in such a manner as to be crossed by the straight line connecting between the first pre-chamber holes 241A and 241C that are opposite with respect to the first interference member 25A present between these two holes and crossed by the straight line connecting between the first pre-chamber holes 241B and 241D that are opposite with respect to the first interference member 25A present between these two holes. As a result, an air-fuel mixture supplied through the first pre-chamber holes 241A-241D is likely to collide with the first interference member 25A. As a result, it is possible to reduce the flow rates of an air-fuel mixture at and near the ignition point BP, and therefore, it is possible to stably ignite the fuel. In addition, because it is possible to maintain the flow rates of an air-fuel mixture outside the zone at and near the ignition point BP, it is possible to make it easier to jet an ignition flare 31 (see FIG. 4) to the main combustion chamber 19 uniformly. Furthermore, it is possible to reduce the number of the first interference member 25A to the minimum possible number.

In the ignition device 11A, as illustrated in FIG. 2, the first pre-chamber holes 241A-241D are provided at positions outside the half (½×R) of the radius R of the inner circumferential surface 24*b* of the pre-chamber cap 24A. As a result, flows of an air-fuel mixture toward the first interference member 25A are formed at and near the ignition point BP, and as a result, it is possible to prevent an initial flare from being cooled by the window member 22 or the inner circumferential surface 24*b*, implementing stable forming of an initial flare. Because it is thus possible to reduce cooling of an initial flare in the ignition device 11A, it is possible to improve the stability in ignition.

In a case of an ignition device that uses a pre-chamber plug in the related art, during an engine compression stroke, an air-fuel mixture flows into a pre-chamber through pre-chamber holes communicating between the pre-chamber and a main combustion chamber of an engine. The air-fuel mixture thus flowing into the pre-chamber then flows toward a depth side of the pre-chamber (toward a laser device and a spark ignition plug), and therefore, an initial flare is caused to flow toward the depth side. Because, generally speaking, a wall surface at the depth side of the pre-chamber is cooled by a cooling water of a cylinder head, the temperature of the wall surface at the depth side of the pre-chamber is low. On the other hand, a wall surface of the pre-chamber protruding in the main combustion chamber is not in contact with the cylinder head, and therefore, the temperature of the wall surface is high. If an initial flare were caused to flow toward the depth side of the pre-chamber, the initial flare would come into contact with the wall surface at the depth side of the pre-chamber or the wall surface of the laser device or the spark ignition plug, resulting in that the initial flare generated in the pre-chamber might be cooled. In particular, in a case of using a spark ignition plug, if an initial flare generated between its central electrode and earth electrode were cooled, an initial combustion speed would be reduced, resulting in an increase in a misfire rate or in a variation in an initial combustion speed, and then, resulting in an increase in a variation of a combustion cycle. As a result, ignition would become unstable. In particular, there is a tendency that, in such a combustion condition that a combustion speed is low, ignition is likely to be unstable. Such a combustion condition that a combustion speed is low may occur, for example, in a case of a gas engine, in a case of a lean-burn, or the like. In a case of an engine other than a gas engine, the above-mentioned combustion condition that a combustion speed is low may occur, for example, in a case of using a type of a fuel having a slow combustion speed.

In contrast thereto, in the ignition device 11A, as mentioned above, the first pre-chamber holes 241A-241D are provided outside of the half (½×R) of the radius R of the inner circumferential surface 24*b* of the pre-chamber cap 24A as illustrated in FIGS. 2 and 3. As a result, flows of an air-fuel mixture toward the first interference member 25A occur at and near the ignition point BP, and therefore, an initial flare can be prevented from flowing toward the window member 22 or a depth-side portion of the inner circumferential surface. Generally speaking, the window member 22 and the inner circumferential surface 24*b* are cooled by a cooling water of the cylinder head 12 (see FIG. 1) and therefore have low temperatures. On the other hand, the first interference member 25A is not in contact with the cylinder head 12 (see FIG. 1), and as a result, has a high temperature. In the ignition device 11A, an initial flare can be prevented from flowing toward the window member 22 or the inner circumferential surface 24*b*, and thus, it is possible to restrain an initial flare from being cooled by the window member 22 or the inner circumferential surface 24*b*. Thus, in the ignition device 11A, it is possible to maintain an initial flare generated inside the pre-chamber cap 24A to form a stable initial flare. Thus, it is possible to improve the stability in ignition. Note that, in a case where a combustion speed is high, a flare can grow up until before the initial flare flows to the window member 22. Even under a combustion condition that the combustion speed is low and it is not easy for an initial flare to grow up in such as, for example, a case of lean-burn or a case of a turbulent flow or a weak flow of an air-fuel mixture at an ignition point BP or inside a pre-chamber cap 24A, it is possible to stably form an initial flare.

In the ignition device 11A, the first pre-chamber holes 241A-241D are arranged to draw a circle along a circumferential direction of the inner circumferential surface 24*b* of the pre-chamber cap 24A at approximately equal intervals. Because the axes of the first pre-chamber holes 241A-241D are arranged uniformly with respect to the main combustion chamber 19, a flare is jetted from the pre-chamber cap 24A to the main combustion chamber 19 uniformly in directions. As a result, the flare spreads uniformly in the main combustion chamber 19 and it is possible to increase the combustion speed in the main combustion chamber 19.

The ignition device 11A is inserted into the cylinder head 12 in such a manner that the pre-chamber cap 24A is in contact with and projects from the cylinder head 12. As a result, the ignition device 11A can be easily removed from and inserted into the cylinder head 12 with the use of the pre-chamber cap 24A.

The engine 10 (see FIG. 1) includes the ignition device 11A, and therefore, it is possible to perform stable ignition. Thus, it is possible to operate the engine efficiently. As a result, it is possible to improve the performance of the engine 10 (see FIG. 1).

In the description of the present embodiment, the case where the ignition device 11A according to the present embodiment is used as an ignition device of a gas engine for power generation as an internal combustion engine to drive a piston using a combustion gas has been described. However, embodiments are not limited to the present embodiment. The ignition device 11A may be, for example, used in another engine, causing combustion of a fuel to generate a combustion gas, such as a rotary engine, a gasoline engine for an automobile, a gas turbine engine, and a jet engine. In addition, the ignition device 11A may be used in a cogeneration that is a system using exhaust heat to extract power, warm heat, or cold heat to comprehensively improve the energy efficiency.

Note that, according to the present embodiment, the first interference member 25A has a cylindrical shape. However, the shape of the first interference member 25A may be an elliptic cylinder, a polyhedron, a hollow cylinder, a hollow elliptic cylinder, a circular cone, an elliptic cone, a truncated circular cone, a truncated elliptic cone, a sphere, or the like. In such a case, it is desirable that a portion of the first interference member 25A near the ignition point BP is a surface or a curved surface. As a result of a portion of the first interference member 25A near the ignition point BP being a surface or a curved surface, it is possible to easily obtain an advantageous effect to change the flow directions of an air-fuel mixture, to reduce the flow rates of an air-fuel mixture using a boundary layer, and, as will be described later, to reduce the flow rates of an air-fuel mixture using a stagnation point.

According to the present embodiment, the axes of the first pre-chamber holes 241A-241D cross the first interference member 25A. However, the axes of the first pre-chamber holes 241A-241D need not cross the first interference member 25A.

According to the present embodiment, the 4 first pre-chamber holes 241A-241D are provided from the inner circumferential surface 24*b* of the pre-chamber cap 24A. However, it may be sufficient that the number of the first pre-chamber holes provided from the inner circumferential surface 24*b* is 2 or more.

According to the present embodiment, all of the first pre-chamber holes 241A-241D are arranged along the respective peripheries of concentric circles as illustrated in FIG. 2. However, all of the first pre-chamber holes 241A-241D need not be arranged along the respective peripheries of concentric circles.

According to the present embodiment, the first interference member 25A may be welded to the front inner surface 24*a* of the pre-chamber cap 24A, or the pre-chamber cap 24A and the first interference member 25A may be formed together through a cutting process with the use of a 3D printer or the like to integrally form the first interference member 25A onto the front inner surface 24*a*.

According to the present embodiment, the pre-chamber cap 24A is joined to the housing 23. However, for example, the pre-chamber cap 24A may be joined to the window member 22 or to the cylinder head 12.

According to the present embodiment, the first interference member 25A is provided on the front inner surface 24*a* of the pre-chamber cap 24A. However, it may be sufficient that the first interference member 25A reduces the flow rates of an air-fuel mixture. Therefore, the first interference member 25A may be provided on the inner circumferential surface 24*b* of the pre-chamber cap 24A or on the housing 23.

According to the present embodiment, the housing 23 may be made of the same material as the material of the optical window holding member 222. Also, the housing 23 and the pre-chamber cap 24A may be made of the same materials as the material of the optical window holding member 222.

Second Embodiment

An ignition device according to a second embodiment will now be described with reference to drawings. Note that, for members having the same functions as the functions of the first embodiment, the same reference signs are given and detailed descriptions for the members will be omitted. The ignition device according to the present embodiment is the same as or similar to the first embodiment except that pre-chamber holes are further provided to the front inner surface 24*a* of the pre-chamber cap 24A of the ignition device 11A illustrated in FIGS. 2 and 3, and therefore, only a configuration of a pre-chamber cap 24B will be described.

Figure 5:
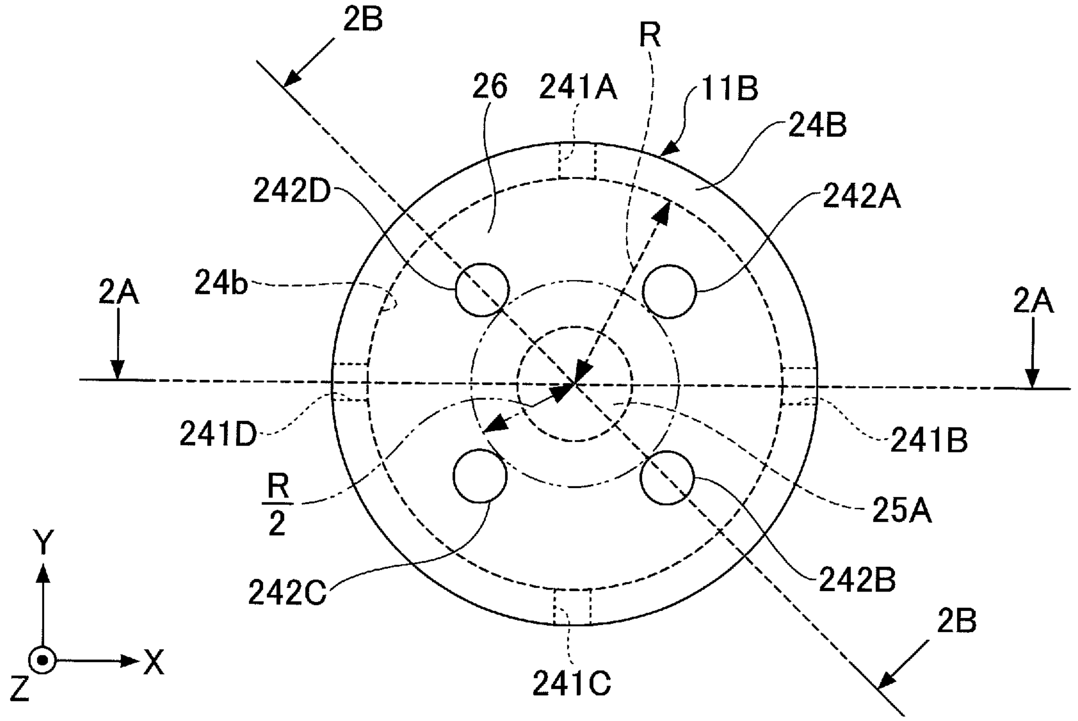
FIG. 5 is a front view illustrating a configuration of a pre-chamber cap obtained from viewing an ignition device according to a second embodiment from a main combustion chamber side.
Figure 6:
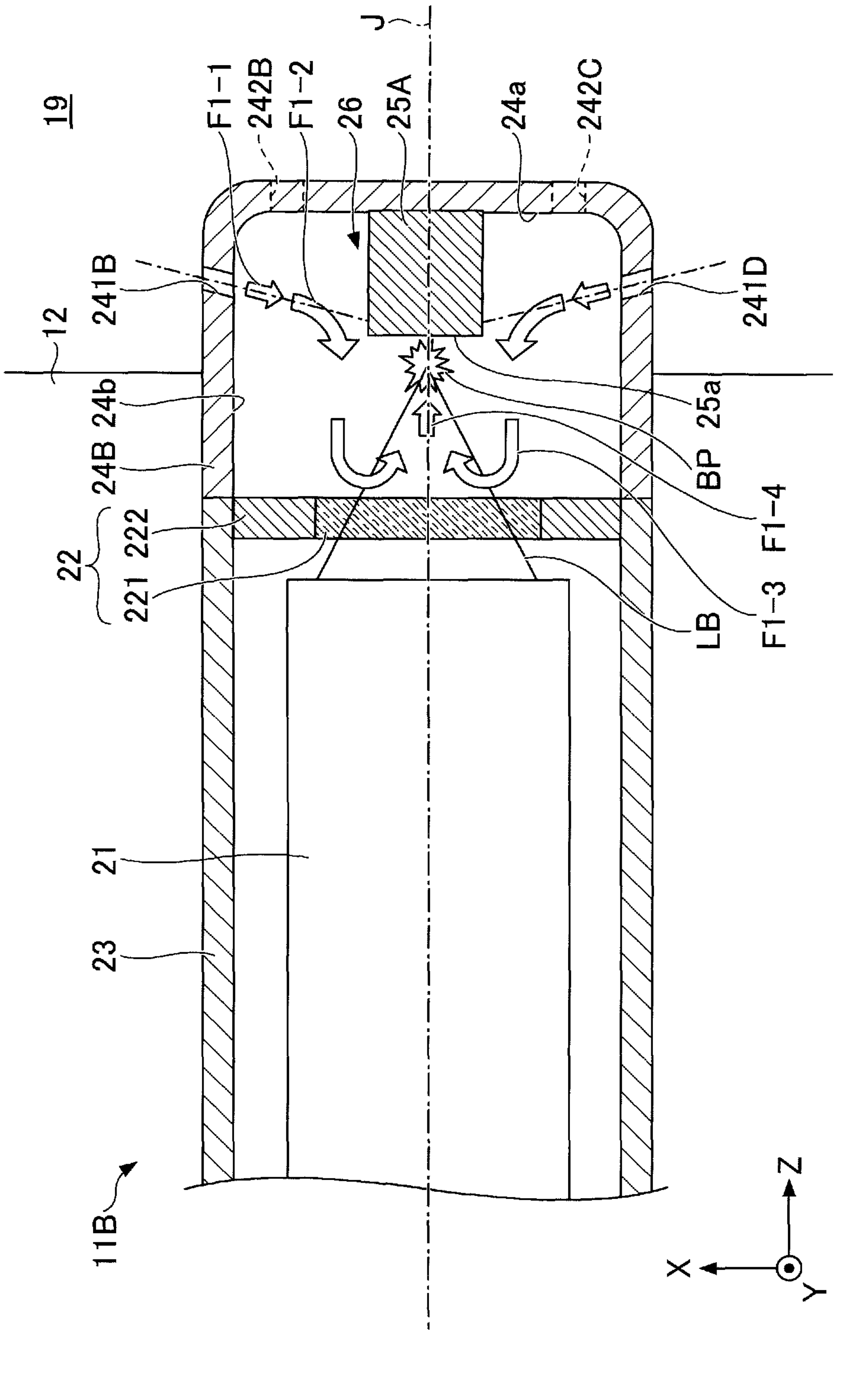
FIG. 6 is a sectional view taken along a 2A-2A line illustrated in FIG. 5.
Figure 7:
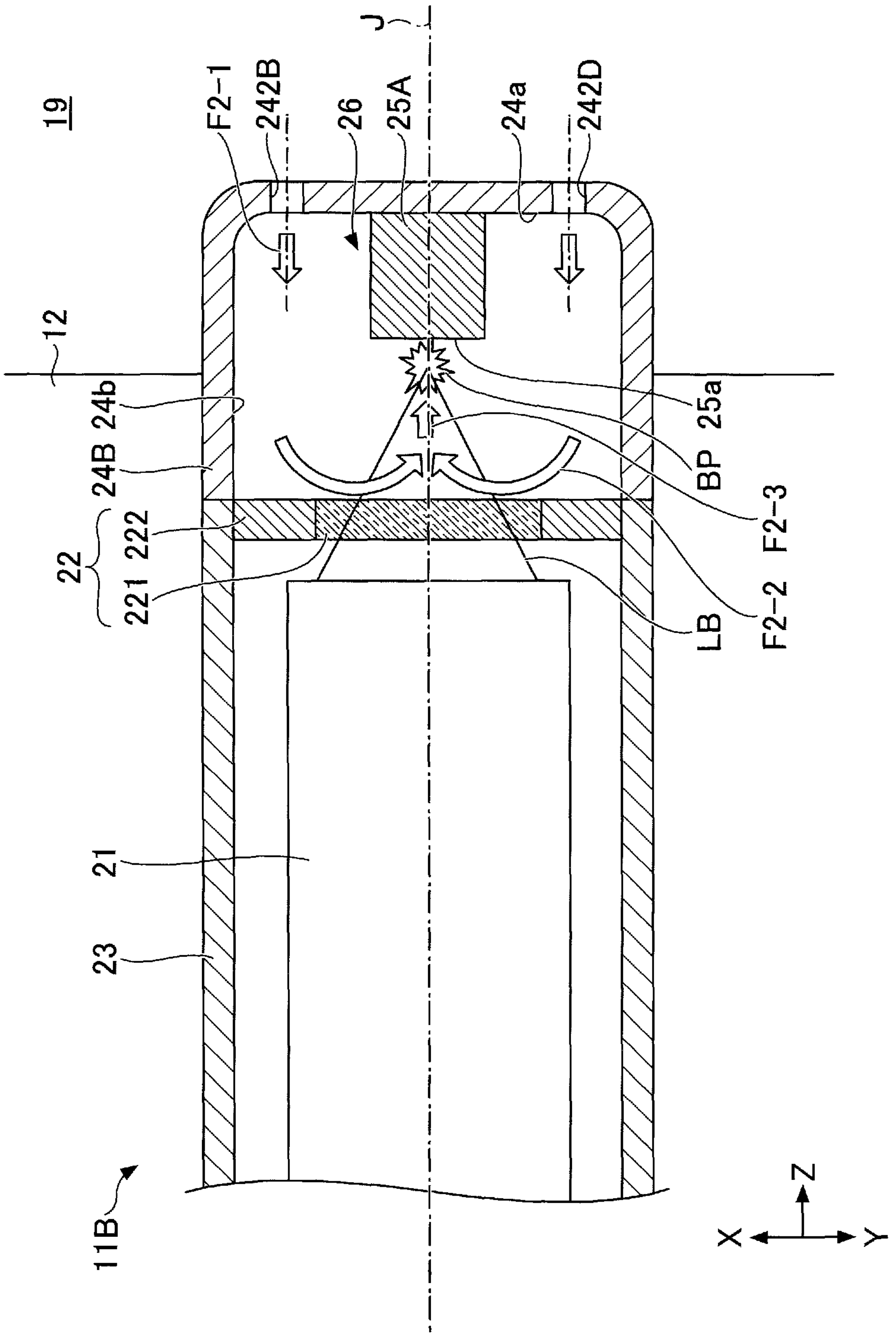
FIG. 7 is a sectional view taken along a 2B-2B line illustrated in FIG. 5.

FIG. 5 is a front view illustrating a configuration of the pre-chamber cap when the ignition device according to the second embodiment is viewed from the main combustion chamber; FIG. 6 is a sectional view taken along a line 2A-2A of FIG. 5; and FIG. 7 is a sectional view taken along a line 2B-2B of FIG. 5. As illustrated in FIGS. 5-7, in the ignition device 11B, second communicating holes (second pre-chamber holes) 242A-242D are provided from the front inner surface 24*a* of the pre-chamber cap 24B. According to the present embodiment, the second pre-chamber holes 242A-242D formed from the front inner surface 24*a* that is provided in the axial direction of the pre-chamber cap 243 (i.e., the z-axis direction) will be referred to as second pre-chamber holes.

As illustrated in FIG. 5, the second pre-chamber holes 242A-242D are arranged at positions corresponding to the four vertexes of a rectangle on the front inner surface 24*a* when an end of the pre-chamber cap 24B is viewed in the incident direction of laser light.

As illustrated in FIG. 7, the second pre-chamber holes 242A-242D are provided in such a manner that the respective axes of the second pre-chamber holes 242A-242D are approximately parallel to a central axis J extending along a longitudinal direction of the ignition device 11B. The second pre-chamber holes 242A-242D are provided in such a manner that the respective axes are not near the ignition point BP. Note that FIG. 7 illustrates only the axes of the second pre-chamber holes 242B and 242D. In this regard, the axes of the other second pre-chamber holes 242A and 242C extend in directions the same as or similar to the directions of the axes of the second pre-chamber holes 242B and 242D.

It is desirable that the second pre-chamber holes 242A-242D are provided in such a manner that the distance between the ignition point BP and each of the axes of the second pre-chamber holes 242A-242D is greater than or equal to 10% of the inner diameter of the pre-chamber cap 24B. As a result of the distance between the ignition point BP and each of the axes of the second pre-chamber holes 242A-242D being greater than or equal to 10% of the inner diameter of the pre-chamber cap 24B, it is possible to further effectively reduce the flow rates of an air-fuel mixture at and near the ignition point BP. In addition, as a result of the distance between the ignition point BP and each of the axes of the second pre-chamber holes 242A-242D being greater than or equal to 10% of the inner diameter of the pre-chamber cap 24B, it is possible to increase the flow rates of an air-fuel mixture outside the zone at and near the ignition point BP.

As illustrated in FIG. 5, the second pre-chamber holes 242A-242D are provided outside of the half (½×R) of the radius R of the inner circumferential surface 24*b* of the pre-chamber cap 24A.

As illustrated in FIGS. 6 and 7, the first interference member 25A is provided on the front inner surface 24*a* in such a manner that the axial direction is parallel to the centerline of the ignition device 11B, and the first interference member 25A is provided in such a manner that the first interference member 25A are not crossed by the axes of the second pre-chamber holes 242A-242D. Therefore, an air-fuel mixture flowing through the second pre-chamber holes 242A-242D into the precombustion chamber 26 then flows as illustrated by an arrow F2-1 and does not collide with the first interference member 25A. Thus, the flows of an air-fuel mixture having passed through the second pre-chamber holes 242A-242D are hardly changed.

In the ignition device 11B, in response to an occurrence of precombustion of an air-fuel mixture at the ignition point BP in the precombustion chamber 26, an ignition flare 31 (see FIG. 4) is jetted in the bore directions (the x-axis directions and the y-axis directions) of the cylinder 13 through the first pre-chamber holes 241A-241D. Through the second pre-chamber holes 242A-242D, an ignition flare 31 (see FIG. 4) is jetted mainly in the piston axial direction (the (+z)-axis direction) of the main combustion chamber 19 of the engine 10 (see FIG. 1). The ignition flare 31 (see FIG. 4) thus having jetted into the main combustion chamber 19 ignites and burns the fuel of an air-fuel mixture in the main combustion chamber 19 (main combustion). In addition, as a result of the ignition flare 31 (see FIG. 4) being jetted through the second pre-chamber holes 242A-242D in addition to the first pre-chamber holes 241A-241D into the main combustion chamber 19, it is possible to increase the ignition energy in the main combustion chamber 19.

At this time, an air-fuel mixture is supplied from the main combustion chamber 19 through the first pre-chamber holes 241A-241D to the precombustion chamber 26. The flows of the air-fuel mixture in the pre-chamber cap 24B illustrated by the arrows F1-1 through F1-4 are the same as the flows in the above-described first embodiment, and therefore, descriptions will be omitted.

As illustrated in FIG. 7, an air-fuel mixture is supplied from the main combustion chamber 19 further through the second pre-chamber holes 242A-242D into the precombustion chamber 26. As a result of the air-fuel mixture thus flowing into the precombustion chamber 26, the air-fuel mixture flows as illustrated by an arrow F2-1 toward the window member 22 along the inner circumferential surface 24*b*. The air-fuel mixture thus flows along the inner circumferential surface 24*b* due to a Coanda effect causing the flow of an air-fuel mixture to be attracted by the wall due to characteristics of the viscosity of the air-fuel mixture or the like.

As a result of the air-fuel mixture then colliding with the window member 22, the flows of the air-fuel mixture are reversed as being illustrated by an arrow F2-2, and the air-fuel mixture comes to flow toward the first interference member 25A. At and near the ignition point BP, the air-fuel mixture flows as illustrated by an arrow F2-3 toward the first interference member 25A. After precombustion of the air-fuel mixture then occurs in the precombustion chamber 26, the air-fuel mixture becoming an ignition flare 31 (see FIG. 4) is jetted through the second pre-chamber holes 242A-242D (see FIG. 5). According to the present embodiment, the zone at and near the ignition point BP is included in the boundary layer of an air-fuel mixture near the end face 25*a* of the first interference member 25A, therefore the flow rates of the air-fuel mixture are reduced: such a state is advantageous to form a stable initial flare.

The air-fuel mixture supplied through the second pre-chamber holes 242A-242D (see FIG. 5) into the precombustion chamber 26 flows as illustrated by the arrow F2-1 toward the window member 22 along the inner circumferential surface 24*b*. Therefore, the ignition point BP is not exposed to the flows of the air-fuel mixture having passed through the second pre-chamber holes 242A-242D. Thus, it is possible to stably form a flare at an initial stage of fuel combustion.

In the ignition device 11B, the plurality of second pre-chamber holes 242A-242D are provided from the front inner surface 24*a* in such a manner that the axes of the second pre-chamber holes 242A-242D do not cross the first interference member 25A. As a result, it is possible to reduce the flow rates of an air-fuel mixture at and near the ignition point BP, and at the same time, it is possible to increase the flow rates of an air-fuel mixture outside the zone at or near the ignition point BP in the precombustion chamber 26. As a result of a flare generated from stable ignition at and near the ignition point BP exiting the zone at and near the ignition point BP, the flare spreads in the precombustion chamber 26 faster because the flow rates of an air-fuel mixture outside the zone at or near the ignition point BP is high. As a result of the flare spreading in the precombustion chamber 26 more faster, the air-fuel mixture in the precombustion chamber 26 can be jetted through the second pre-chamber holes 242A-242D to the main combustion chamber 19 more strongly. As a result, it is possible to implement faster combustion of the fuel of the air-fuel mixture in the main combustion chamber 19.

In the ignition device 11B, as in the ignition device 11A according to the above-described first embodiment, the first interference member 25A is provided in such a manner that the first interference member 25A is crossed by the axes of the first pre-chamber holes 241A-241D. As a result, in the ignition device 11B, it is possible to stably ignite a fuel, and also, it is possible to jet an ignition flare 31 (see FIG. 4) through the first pre-chamber holes 241A-241D uniformly in the main combustion chamber 19 easily.

In the ignition device 11B, the second pre-chamber holes 242A-242D are provided from the front inner surface 24*a* at the positions corresponding to the four vertexes of a rectangle. Therefore, it is possible to jet an air-fuel mixture from the precombustion chamber 26 through the second pre-chamber holes 242A-242D approximately uniformly in the main combustion chamber 19. As a result, it is possible to implement more fast combustion more uniformly in the main combustion chamber 19.

In the ignition device 11B, the number of the second pre-chamber holes 242A-242D is made to be equal to the number of the first pre-chamber holes 241A-241D. The axial directions of the first pre-chamber holes 241A-241D are made to be approximately equal to bore directions of the cylinder 13 (the x-axis directions and the y-axis directions). The axial directions of the second pre-chamber holes 242A-242D are made to be equal to the reciprocation directions of the piston 14 (the z-axis direction). Near the top dead point at which combustion is implemented, the main combustion chamber 19 has a disk shape and the main combustion chamber 19 is wide with respect to the bore directions (the x-axis directions and the y-axis directions). The number of the second pre-chamber holes 242A-242D may be made smaller than or equal to the number of the first pre-chamber holes 241A-241D so that the number of the pre-chamber holes with respect to the bore directions (the x-axis directions and the y-axis directions) can be made greater than or equal to the number of the pre-chamber holes with respect to the reciprocation directions of the piston 14 (the z-axis direction). As a result, it is possible to make it easier to jet an ignition flare 31 (see FIG. 4) more uniformly in the main combustion chamber 19 through the first pre-chamber holes 241A-241D. As a result, it is possible to spread a flare uniformly in the main combustion chamber 19 and it is possible to increase the combustion speed in the main combustion chamber 19.

In the ignition device 11B, the first pre-chamber holes 241A-241D and the second pre-chamber holes 242A-242D are provided in the pre-chamber cap 24B in such a manner that the axes of the first pre-chamber holes 241A-241D do not cross the axes of the second pre-chamber holes 242A-242D. As a result, it is possible to spread an ignition flare 31 (see FIG. 4) uniformly in the main combustion chamber 19, and thus, it is possible to increase the combustion speed in the main combustion chamber 19.

In the ignition device 11B, as illustrated in FIG. 5, the second pre-chamber holes 242A-242D are placed outside the half (½×R) of the radius R of the inner circumferential surface 24*b* of the pre-chamber cap 24B. As a result, a flow of an air-fuel mixture toward the first interference member 25A is created at and near the ignition point BP, and thereby, it is possible to prevent an initial flare from flowing to the window member 22 or the inner circumferential surface 24*b*, resulting in that it is possible to prevent an initial flare from being cooled by the window member 22 or the inner circumferential surface 24*b*. As a result of thus maintaining the initial flare, it is possible to form the stable initial flare, and thus, it is possible to improve the stability in ignition. Therefore, in the ignition device 11B, for example, even under a combustion condition that the combustion speed is low and it is not easy for an initial flare to grow up in a case such as a case of lean-burn or a case of a turbulent flow or a weak flow of an air-fuel mixture at the ignition point BP or inside the pre-chamber cap 24A, it is possible to stably form an initial flare.

In the ignition device 11B, an arrangement is made such that, when the ignition device 11B is projected on a plane perpendicular to the central axis J of the ignition device 11B, the line segments connecting the first pre-chamber holes 241A-241D and the second pre-chamber holes 242A-242D with the central axis cross only at the central axis, and any one of the line segments does not overlap with any other one of the line segments. In other words, on the projected plane, the first pre-chamber holes 241A-241D and the second pre-chamber holes 242A-242D are arranged in a staggering manner along the circumferential direction. With respect to the main combustion chamber 19, the axes of the first pre-chamber holes 241A-241D and the second pre-chamber holes 242A-242D are uniformly arranged. As a result, it is possible to spread a flare uniformly in the main combustion chamber 19 and it is possible to further increase the combustion speed in the main combustion chamber 19.

Note that, according to the present embodiment, the number of the second pre-chamber holes 242A-242D is 4 the same as the number of the first pre-chamber holes 241A-241D. However, it is not necessary to use such an arrangement and the number of the second pre-chamber holes 242A-242D may be two or more. According to the present embodiment, it is desired that the number of the second pre-chamber holes 242A-242D is smaller than or equal to the number of the first pre-chamber holes 241A-241D. Generally speaking, the shape of the main combustion chamber 19 at the top dead point of the engine 10 (see FIG. 1) is like a flat disk: the length in the bore directions (the x-axis directions and the y-axis directions) is greater than the length in the direction of reciprocation of the piston 14 of the cylinder 13 (the z-axis direction). Therefore, by determining the number of the first pre-chamber holes 241A-241D configured to jet a fuel in the precombustion chamber 26 in the bore directions (the x-axis direction and the y-axis direction) greater than or equal to the number of the second pre-chamber holes 242A-242D configured to jet a fuel in the precombustion chamber 26 in the piston axial direction (the z-axis direction), it is possible to spread an ignition flare 31 (see FIG. 4) uniformly in the main combustion chamber 19.

According to the present embodiment, the second pre-chamber holes 242A-242D may also be arranged in such a manner that, when the ignition device 11B is viewed in the axial direction of the ignition device 11B, the second pre-chamber holes 242A-242D are not placed inside of the half (½×R) of radius R of the inner circumferential surface 24*b* of the pre-chamber cap 24C or the second pre-chamber holes 242A-242D may be placed at the half (½×R) of radius R.

According to the present embodiment, the angles of the axes of the four second pre-chamber holes 242A-242D with respect to the central axis J of the ignition device 11B are the same as each other. However, the angles of the axes of the four second pre-chamber holes 242A-242D with respect to the central axis J of the ignition device 11B may be different from each other.

According to the present embodiment, as illustrated in FIG. 5, all of the second pre-chamber holes 242A-242D are arranged along the respective peripheries of concentric circles. However, all of the second pre-chamber holes 242A-242D need not be arranged along the respective peripheries of concentric circles.

Third Embodiment

An ignition device according to a third embodiment will now be described with reference to drawings. Note that, for members having the same functions as the functions of the first embodiment and the second embodiment, the same reference signs are given and detailed descriptions for the members will be omitted. The ignition device according to the present embodiment is the same as or similar to the ignition device 11B according to the second embodiment except that the size of the first interference member 25A and the directions of the second pre-chamber holes 242A-242D of the ignition device 11B according to the second embodiment illustrated in FIGS. 5-7 are changed, and therefore, only a configuration of a pre-chamber cap 24C will be described.

Figure 8:
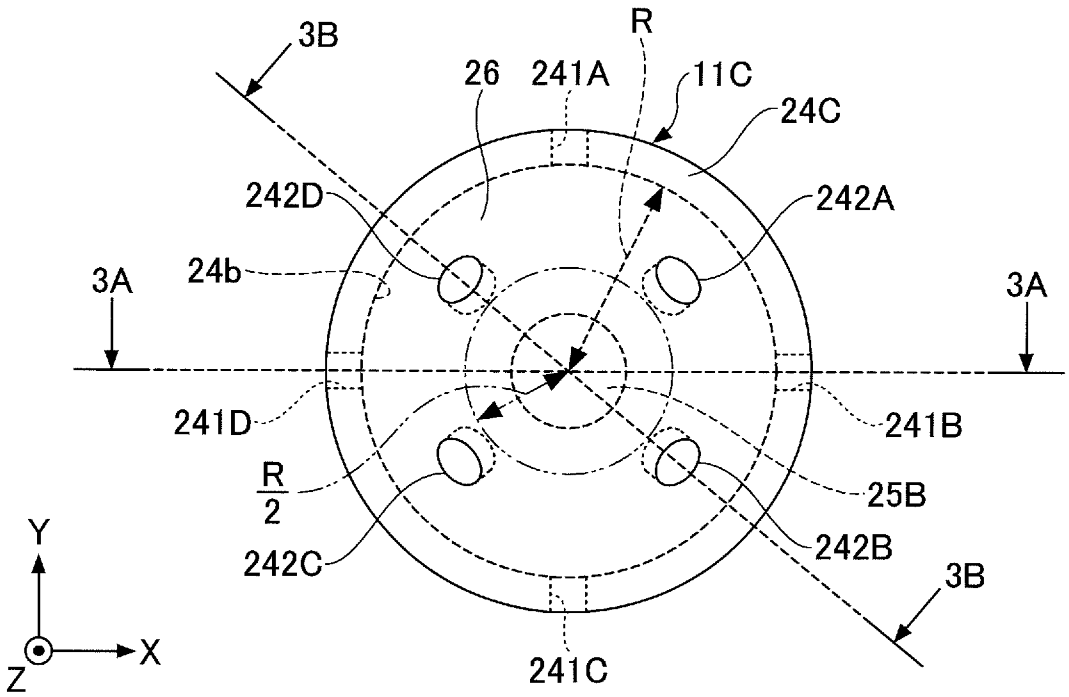
FIG. 8 is a front view illustrating a configuration of a pre-chamber cap obtained from viewing an ignition device according to a third embodiment from a main combustion chamber side.
Figure 9:
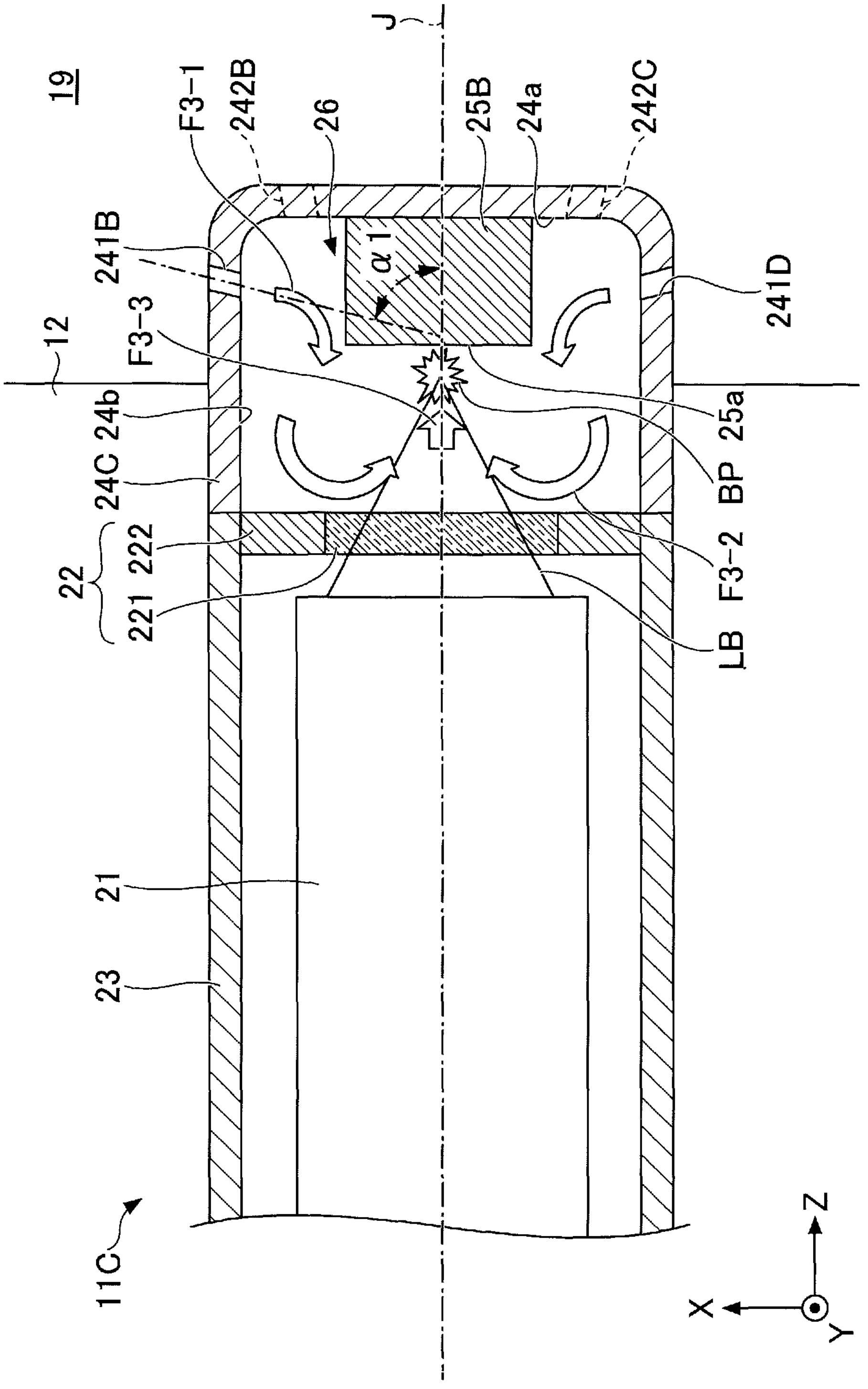
FIG. 9 is a sectional view taken along a 3A-3A line illustrated in FIG. 8.
Figure 10:
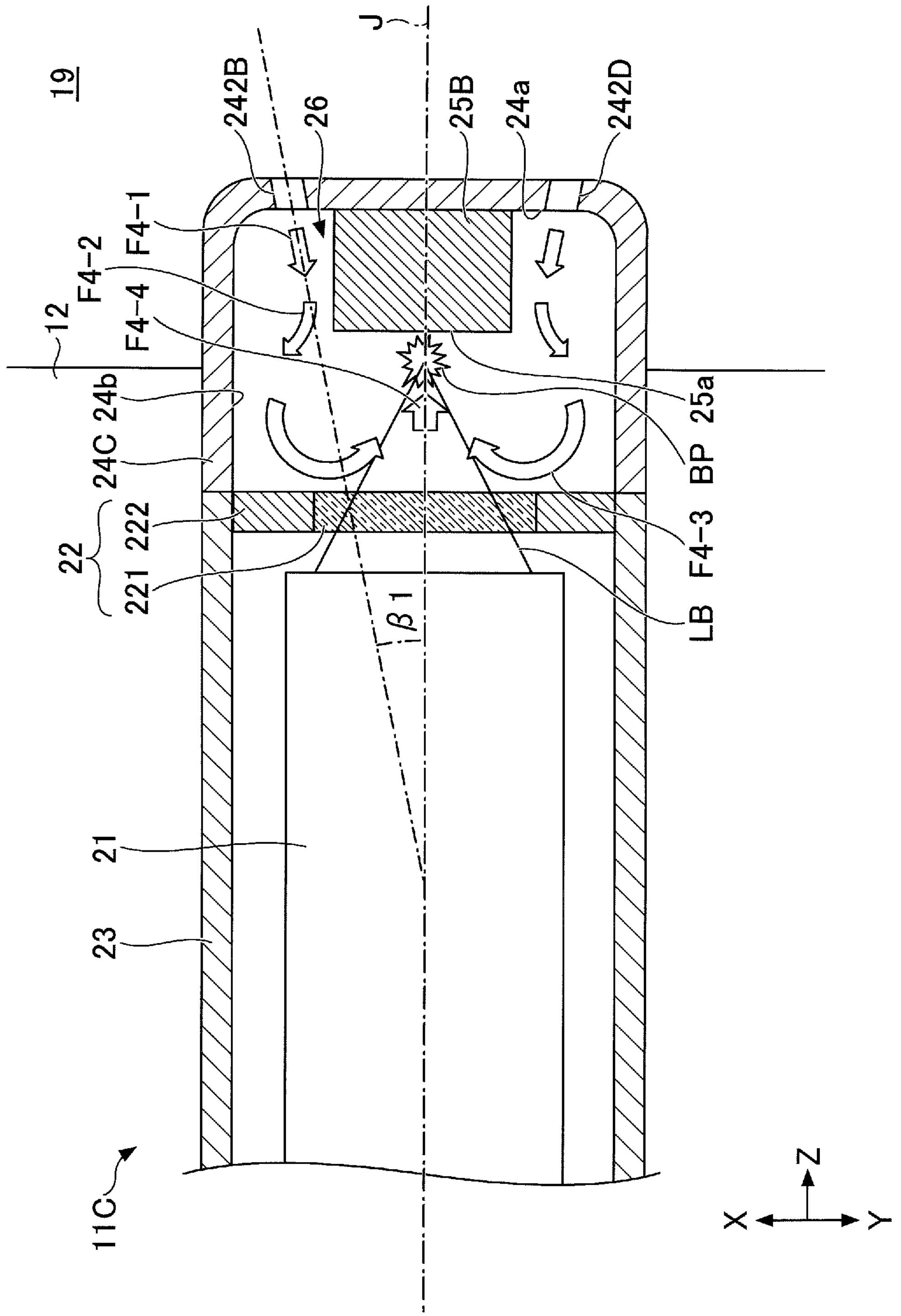
FIG. 10 is a sectional view taken along a 3B-3B line illustrated in FIG. 8.

FIG. 8 is a front view illustrating a configuration of the pre-chamber cap when the ignition device according to the third embodiment is viewed from the main combustion chamber; FIG. 9 is a sectional view taken along a line 3A-3A of FIG. 8; and FIG. 10 is a sectional view taken along a line 3B-3B of FIG. 8. As illustrated in FIGS. 8-10, in the ignition device 11C according to the third embodiment, instead of the first interference member 25A of the ignition device 11B according to the second embodiment illustrated in FIGS. 5-7, a first interference member 25B is provided. In the ignition device 11C, the second pre-chamber holes 242A-242D of the pre-chamber cap 24C are provided from the front inner surface 24*a* in such a manner that the axes of the first pre-chamber holes 241A-241D do not intersect the axes of the second pre-chamber holes 242A-242D.

The diameter of the first interference member 25B viewed from the direction perpendicular to the axial direction of the first interference member 25B is greater than the diameter of the first interference member 25A of the ignition device 11B according to the second embodiment illustrated in FIGS. 5-7. It is desirable that the diameter of the first interference member 25B is greater than or equal to 25% of the radius R of the pre-chamber cap 24C and it is more desirable that the diameter of the first interference member 25B falls within a range of 40%-80% of the radius R of the pre-chamber cap 24.

As illustrated in FIG. 9, the first pre-chamber holes 241A-241D are provided from the inner circumferential surface 24*b* of the pre-chamber cap 24C in such a manner that the axes of the first pre-chamber holes 241A-241D cross the first interference member 25B. Note that FIG. 9 illustrates only the axes of the first pre-chamber holes 241B and 241D. However, the axes of the other first pre-chamber holes 241A and 241C have inclinations the same as or similar to the inclinations of the axes of the first pre-chamber holes 241B and 241D.

As illustrated in FIG. 10, the second pre-chamber holes 242A-242D are provided from the front inner surface 24*a* of the pre-chamber cap 24C in such a manner that the axes of the second pre-chamber holes 242A-242D cross the central axis J that extends along the longitudinal direction of the ignition device 11C. Note that FIG. 10 illustrates only the axes of the second pre-chamber holes 242B and 242D. However, the axes of the other second pre-chamber holes 242A and 242C have inclinations the same as or similar to the inclinations of the axes of the second pre-chamber holes 242B and 242D.

Such a design is made that the angle $\alpha 1$ (see FIG. 9) of each of the axes of the first pre-chamber holes 241A-241D with respect to the central axis J of the ignition device 11C is greater than the angle $\beta 1$ (see FIG. 10) of each of the axes of the second pre-chamber holes 242A-242D with respect to the central axis J of the ignition device 11C. Note that the angle $\alpha 1$ is one example of the angle $\alpha$ of each of the axes of the second pre-chamber holes 242A-242D with respect to the central axis J of the ignition device 11C. The angle $\beta 1$ is one example of the angle $\beta$ of each of the axes of the first pre-chamber holes 241A-241D with respect to the central axis J of the ignition device 11C.

According to the present embodiment, the first pre-chamber holes 241A-241D are provided in such a manner that the angle of each of the axes of the first pre-chamber holes 241A-241D with respect to the central axis J that is along the longitudinal direction (the z-axis direction) of the laser device 21 is greater than or equal to 45°. Furthermore, the second pre-chamber holes 242A-242D are provided in such a manner that the angle of each of the axes of the second pre-chamber holes 242A-242D with respect to the central axis J that is along the longitudinal direction of the laser device 21 is smaller than 45°. As a result of the angle $\alpha 1$ and the angle $\beta 1$ falling within the above-mentioned ranges, respectively, an ignition flare 31 is jetted uniformly in the main combustion chamber 19, and thus, it is possible to spread a flare uniformly in the main combustion chamber 19. It is desirable that the angle $\alpha 1$ is greater than or equal to 50° and it is more desirable that the angle $\alpha 1$ is greater than or equal to 55°. It is desirable that the angle $\beta 1$ is smaller than or equal to 40° and it is more desirable that the angle $\beta 1$ is smaller than or equal to 35°.

It is desirable that the second pre-chamber holes 242A-242D are placed in such a manner that, as the above-mentioned first pre-chamber holes 241A-241D of the ignition device 11A, an air-fuel mixture flows through the second pre-chamber holes 242A-242D then flows toward the zone at and near the ignition point BP and toward the first interference member 25B. As illustrated in FIG. 8, the second pre-chamber holes 242A-242D are placed outside the half (½×R) of the radius R of the inner circumferential surface 24*b* of the pre-chamber cap 24C.

In the ignition device 11C, an ignition flare 31 (see FIG. 4) jetted through the first pre-chamber holes 241A-241D and the second pre-chamber holes 242A-242D into the main combustion chamber 19 ignites and burns the fuel included in the air-fuel mixture in the main combustion chamber 19 (as main combustion).

An air-fuel mixture is supplied from the main combustion chamber 19 through the first pre-chamber holes 241A-241D and the second pre-chamber holes 242A-242D into the precombustion chamber 26.

At this time, an air-fuel mixture is supplied from the main combustion chamber 19 through the first pre-chamber holes 241A-241D (see FIG. 8) into the precombustion chamber 26. As illustrated in FIG. 9, the air-fuel mixture having passed through the first pre-chamber holes 241A-241D flows toward the first interference member 25B as illustrated by an arrow F3-1 in the precombustion chamber 26. As a result of the air-fuel mixture then colliding with the first interference member 25A, the flow directions of the air-fuel mixture are changed, the air-fuel mixture flows toward the window member 22 as illustrated by an arrow F3-2 and collides with the window member 22.

As a result of the air-fuel mixture colliding with the window member 22, the flows of the air-fuel mixture are reversed as illustrated by an arrow F3-3, and the air-fuel mixture flows from the window member 22 toward the end face 25*a* of the first interference member 25B. At and near the ignition point BP, the air-fuel mixture flows toward the first interference member 25B as illustrated in by arrow F3-3. As a result of the air-fuel mixture colliding with the first interference member 25B, a stagnation point of the air-fuel mixture is created near the position at which the air-fuel mixture collides with the first interference member 25B. A stagnation point is a point at which the flow rate is close to zero and which is created as result of the flow of an air-fuel mixture colliding with the first interference member 25B. According to the present embodiment, a stagnation point is created nearly in front of the end face 25*a* of the first interference member 25B.

In addition, as illustrated in FIG. 10, an air-fuel mixture supplied through the second pre-chamber holes 242A-242D (see FIG. 8) into the precombustion chamber 26 flows in the precombustion chamber 26 toward the side face of the first interference member 25B as illustrated by an arrow F4-1. Then, as a result of the air-fuel mixture then colliding with the first interference member 25B, the flow directions of the air-fuel mixture are changed, the air-fuel mixture flows toward the window member 22 as illustrated by an arrow F4-2, and then, collides with the window member 22.

As a result of the air-fuel mixture colliding with the window member 22, the flows of the air-fuel mixture are reversed as illustrated by an arrow F4-3, and the air-fuel mixture flows toward the first interference member 25B. At and near the ignition point BP, the air-fuel mixture flows toward the first interference member 25B as illustrated by an arrow F4-4.

As described above, in the ignition device 11C, the first interference member 25B is provided on the front inner surface 24*a* of the pre-chamber cap 24C in such a manner that the first interference member 25B is crossed by the axes of the first pre-chamber holes 241A-241D. The end face 25*a* of the first interference member 25B is provided in such a manner that the ignition point BP is near a stagnation point formed as a result of an air-fuel mixture supplied to the precombustion chamber 26 colliding with the end face 25*a* of the first interference member 25B. Around a stagnation point, the flow rates of an air-fuel mixture are low, and therefore, it is possible to reduce the flow rates of an air-fuel mixture near the ignition point BP. As a result, it is possible to stably form an initial flare at the ignition point BP.

In addition, as described above, the first interference member 25B is provided on the front inner surface 24*a* of the pre-chamber cap 24C in such a manner that the first interference member 25B is crossed by the axes of the first pre-chamber holes 241A-241D. As a result, it is possible to reduce blockage by the first interference member 25B to a spread of an ignition flare 31 (see FIG. 4) generated at the ignition point BP. Thus, it is possible to jet an ignition flare 31 (see FIG. 4) generated from precombustion in the precombustion chamber 26 through the first pre-chamber holes 241A-241D with uniform strengths.

In the ignition device 11C, the second pre-chamber holes 242A-242D are provided from the front inner surface 24*a* of the pre-chamber cap 24C in such a manner that their axes cross the central axis J of the ignition device 11C. As a result, the axes of the second pre-chamber holes 242A-242D extend approximately along the flowing directions of a flare flowing from the ignition point BP toward the second pre-chamber holes 242A-242D. Therefore, it is possible to jet an ignition flare 31 (see FIG. 4) generated at the ignition point BP through the second pre-chamber holes 242A-242D with uniform strengths.

Thus, in the ignition device 11C, it is possible to make uniform the strengths of an ignition flare (see FIG. 4) that are jetted through the first pre-chamber holes 241A-241D and the second pre-chamber holes 242A-242D, and thus, it is possible to increase the speed of combustion of the fuel included in the air-fuel mixture in the main combustion chamber 19.

In addition, in the ignition device 11C, the second pre-chamber holes 242A-242D are provided in such a manner that of the angle $\beta 1$ of each of the axes of the second pre-chamber holes 242A-242D with respect to the central axis J of the ignition device 11C is smaller than 45°. An air-fuel mixture having flowed through the second pre-chamber holes 242A-242D can flow toward the window member 22 along the inner circumferential surface 24*b* of the pre-chamber cap 24C due to a Coanda effect. Therefore, flows toward the first interference member 25B are surely generated at the ignition point BP and it is possible to implement stable ignition.

In addition, in the ignition device 11C, as in the above-mentioned ignition devices 11A and 11B, the first pre-chamber holes 241A-241D and the second pre-chamber holes 242A-242D are placed, as illustrated in FIG. 8, outside the half (½×R) of the radius R of the inner circumferential surface 24*b* of the pre-chamber cap 24C. As a result of a flow of an air-fuel mixture toward the first interference member 25B being thus formed at and near the ignition point BP, it is possible to prevent an initial flare from flowing toward the window member 22 or the inner circumferential surface 24*b* and it is possible to prevent the initial flare from being cooled by the window member 22 or the inner circumferential surface 24*b*. By thus maintaining the initial flare, it is possible to form the stable initial flare, and it is possible to improve the stability in ignition. In the ignition device 11C, as in the above-described ignition devices 11A and 11B, for example, even under a combustion condition that the combustion speed is low and it is not easy for an initial flare to grow up in such a case as a case of lean-burn or a case of a turbulent flow or a weak flow of an air-fuel mixture at the ignition point BP or inside the pre-chamber cap 24A, it is possible to stably form an initial flare.

In the ignition device 11C, the second pre-chamber holes 242A-242D are provided in the pre-chamber cap 24C in such a manner that their axes cross the central axis J of the ignition device 11C. As a result, an air-fuel mixture supplied through the second pre-chamber holes 242A-242D to the precombustion chamber 26 flows from the side surface of the first interference member 25B toward the window member 22 as illustrated by an arrow F4-2. Therefore, the ignition point BP is not exposed to the flows of the air-fuel mixture supplied through the second pre-chamber holes 242A-242D. Thus, it is possible to stably form a flare at an initial stage of fuel combustion.

In the ignition device 11C, the angle α1 of each of the axes of the first pre-chamber holes 241A-241D with respect to the central axis J of the ignition device 11C is made greater than the angle β1 of each of the axes of the second pre-chamber holes 242A-242D with respect to the central axis J of the ignition device 11C. In other words, assuming the angle of each of the axes of the first pre-chamber holes 241A-241D with respect to the central axis J of the ignition device 11C as an angle α1 and the angle of each of the axes of the second pre-chamber holes 242A-242D with respect to the central axis J of the ignition device 11C as an angle β1, the relationship "angle α1>angle β1" holds. By making the angle α1 greater than the angle β1, it is possible to jet an ignition flare 31 (see FIG. 4) through the first pre-chamber holes 241A-241D in the bore directions (the x-axis directions and the y-axis directions). In addition, it is possible to jet an ignition flare 31 (see FIG. 4) through the first pre-chamber holes 241A-241D in the bore directions uniformly easily.

Note that, according to the present embodiment, it may be sufficient that the angle of each of the axes of the second pre-chamber holes 242A-242D are such that an air-fuel mixture flowing through the second pre-chamber holes 242A-242D can then flow along the inner circumferential surface 24*b* due to a Coanda effect.

According to the present embodiment, the respective angles α1 of the axes of the first pre-chamber holes 241A-241D with respect to the centerline of the laser device 21 that is along the longitudinal direction (the z-axis direction) are the same as each other. However, these angles α1 may be different from each other.

According to the present embodiment, the respective angles β1 of the axes of the second pre-chamber holes 242A-242D with respect to the centerline of the laser device 21 that is along the longitudinal direction (the z-axis direction) are the same as each other. However, these angles β1 may be different from each other.

According to the present embodiment, the first pre-chamber holes 241A-241D and the second pre-chamber holes 242A-242D may also be configured in such a manner that the axes of the first pre-chamber holes 241A-241D intersect the axes of the second pre-chamber holes 242A-242D.

According to the present embodiment, instead of providing the first interference member 25B on the front inner surface 24*a* of the pre-chamber cap 24C, the shape of the pre-chamber cap 24C may be changed in such a manner as to be able to reduce the flow rates of an air-fuel mixture.

Fourth Embodiment

An ignition device according to a fourth embodiment will now be described with reference to drawings. Note that, for members having the same functions as the functions of the first embodiment, the second embodiment, and the third embodiment, the same reference signs are given and detailed descriptions for the members will be omitted. The ignition device according to the present embodiment is the same as or similar to the third embodiment except that the configuration of the first interference member 25B and the number of the second pre-chamber holes 242A-242D of the ignition device 11C according to the third embodiment illustrated in FIGS. 8-10 are changed. Therefore, concerning the present embodiment, only a configuration of a pre-chamber cap will be described.

Figure 11:
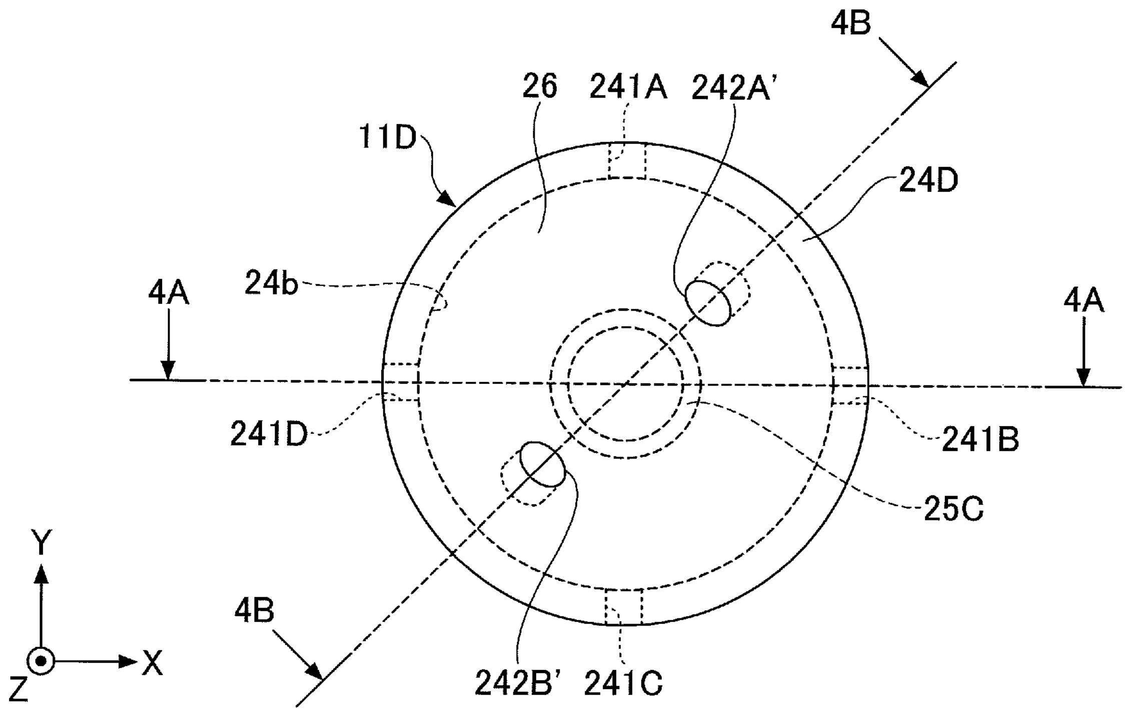
FIG. 11 is a front view illustrating a configuration of a pre-chamber cap obtained from viewing an ignition device according to a fourth embodiment from a main combustion chamber side.
Figure 12:
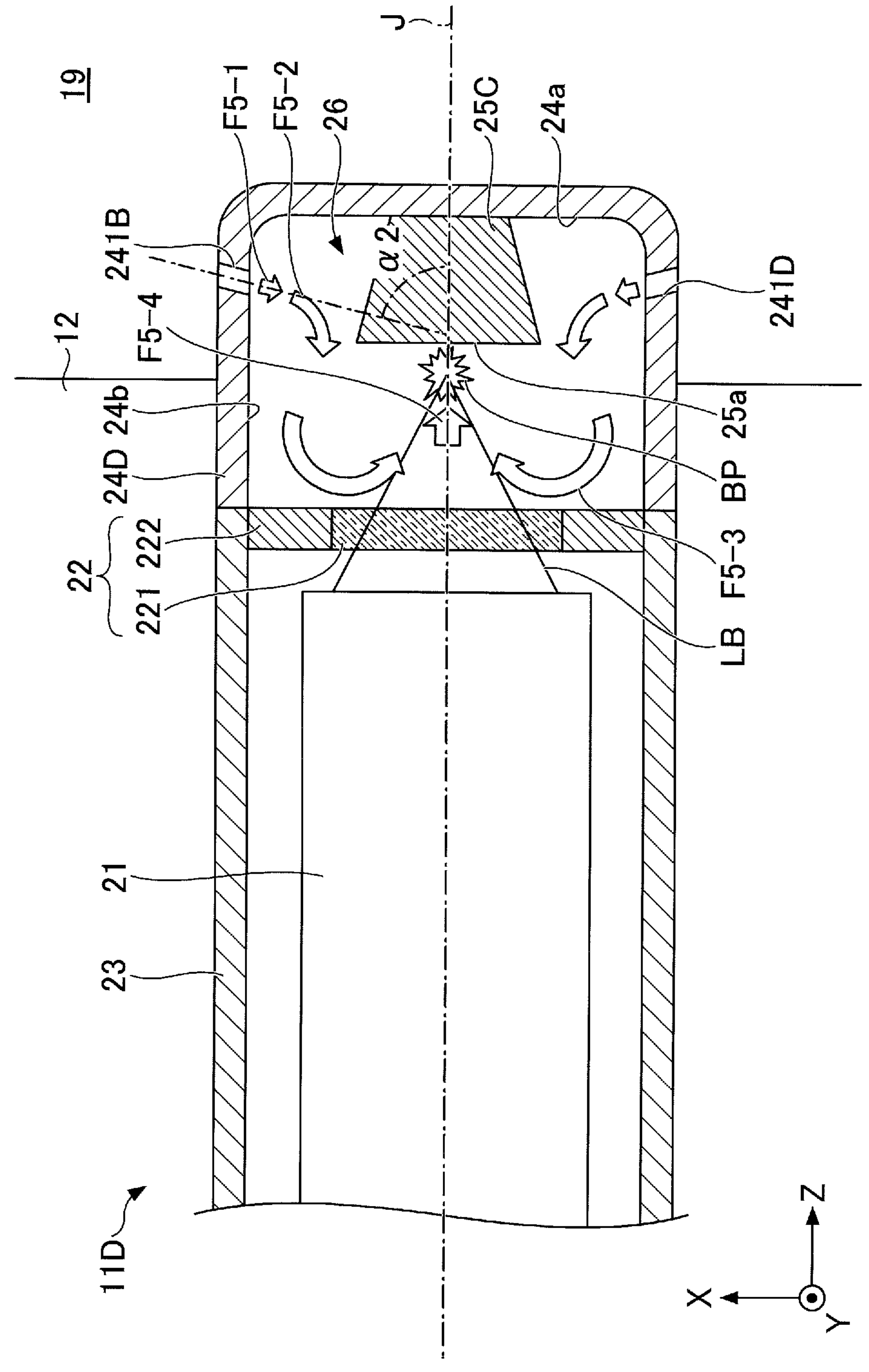
FIG. 12 is a sectional view taken along a 4A-4A line illustrated in FIG. 11.
Figure 13:
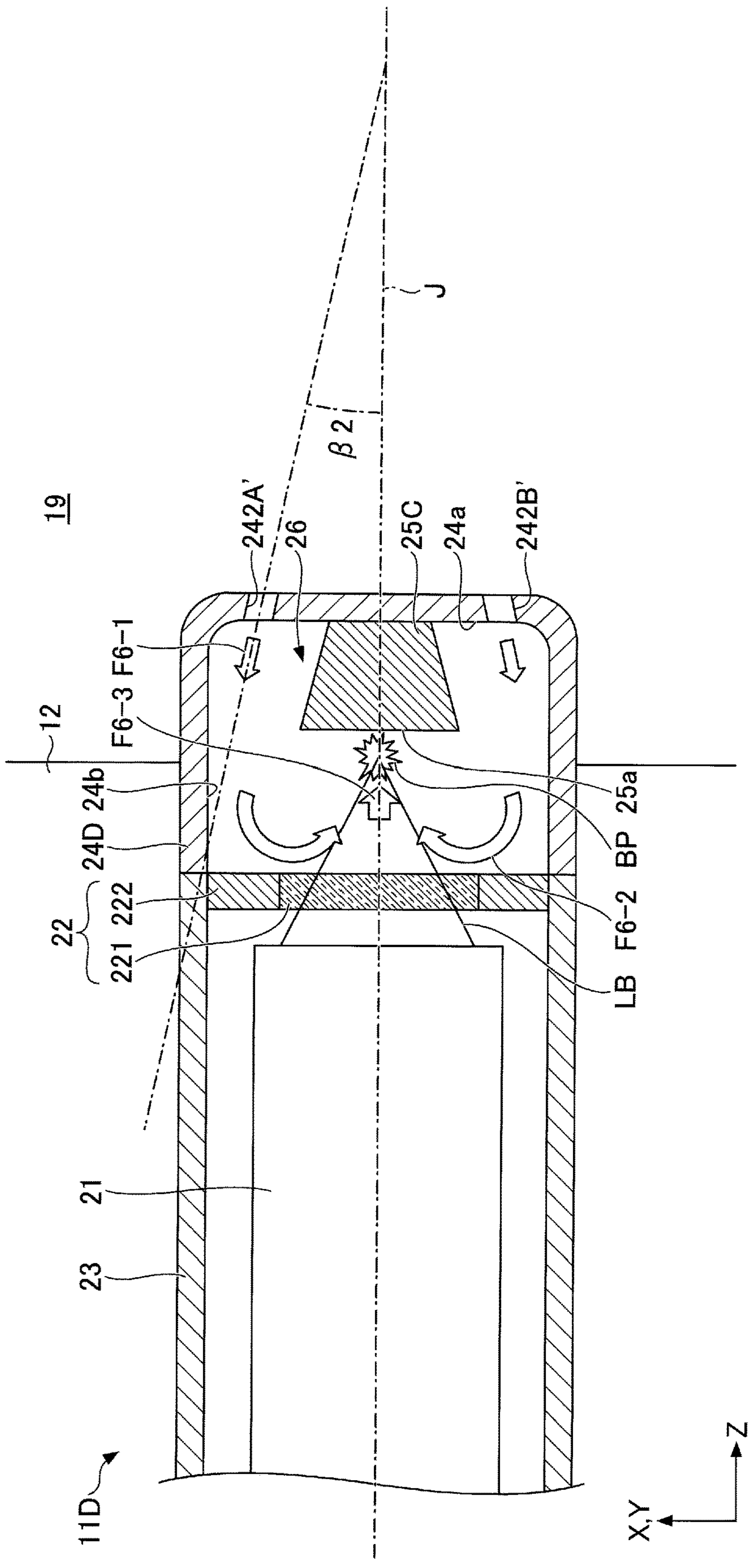
FIG. 13 is a sectional view taken along a 4B-4B line illustrated in FIG. 11.

FIG. 11 is a front view illustrating a configuration of a pre-chamber cap when an ignition device according to the four embodiment is viewed from the main combustion chamber; FIG. 12 is a sectional view taken along a line 4A-4A of FIG. 11; and FIG. 13 is a sectional view taken along a line 4B-4B of FIG. 11. As illustrated in FIGS. 11-13, in the ignition device 11D, instead of the first interference member 25B of the ignition device 11C according to the third embodiment illustrated in FIGS. 8-10, a first interference member 25C is provided. In the ignition device 11 according to the fourth embodiment, the pre-chamber cap 24C including the second pre-chamber holes 242A-242D is changed to a pre-chamber cap 24D including second pre-chamber holes 242A' and 242B'.

The second pre-chamber holes 242A' and 242B' of the pre-chamber cap 24D are provided from the front inner surface 24*a* in such a manner that the respective axes of the first pre-chamber holes 241A-241D do not intersect the respective axes of the second pre-chamber holes 242A' and 242B'.

The first interference member 25C is, as illustrated in FIG. 12, formed to have a trapezoidal shape viewed from a direction perpendicular to the axial direction (the z-axis direction). The first interference member 25C is designed to have the length of the plane facing the laser device 21 greater than the length of the plane in contact with the front inner surface 24*a* of the pre-chamber cap 24C.

The first pre-chamber holes 241A-241D and the second pre-chamber holes 242A' and 242B' are provided from the inner circumferential surface 24*b* and the front inner surface 24*a* of the pre-chamber cap 24D, respectively, as described above. In this regard, as illustrated in FIGS. 12 and 13, the angle α2 of each of the axes of the first pre-chamber holes 241A-241D with respect to the central axis J of the ignition device 11C is made greater than the angle β2 of each of the axes of the second pre-chamber holes 242A' and 242B' with respect to the central axis J of the ignition device 11C. Note that the angle α2 is one example of the angle α of each of the axes of the second pre-chamber holes 242A-242D with respect to the central axis J of the ignition device 11B; the angle β2 is one example of the angle β of each of the axes of the second pre-chamber holes 242A' and 242B' with respect to the central axis J of the ignition device 11C.

As a result of the angle α2 being greater, it is possible to prevent a combustion flare from being blocked by the first interference member 25C, and it is possible to stably jet an ignition flare 31 (see FIG. 4) generated in the precombustion chamber 26 through the first pre-chamber holes 241A-241D in the bore directions (the x-axis directions and the y-axis directions) of the main combustion chamber 19. In addition, as a result of the angle β2 being smaller, it is easy for an ignition flare 31 (see FIG. 4) generated in the precombustion chamber 26 to be jetted through the second pre-chamber holes 242A' and 242B'. Therefore, it is possible to stably jet an ignition flare 31 (see FIG. 4) through the second pre-chamber holes 242A' and 242B' in the reciprocal direction of the piston 14 (see FIG. 1) of the main combustion chamber 19.

According to the present embodiment, the first pre-chamber holes 241A-241D are provided in such a manner that the angle α2 (see FIG. 12) of each of the axes of the first pre-chamber holes 241A-241D with respect to a main combustion chamber 19 side part of the centerline that is along the longitudinal direction (the z-axis direction) is greater than or equal to 45°. The second pre-chamber holes 242A' and 242B' are provided in such a manner that the angle β2 (FIG. 13 see) of each of the axes of the second pre-chamber holes 242A' and 242B' with respect to a main combustion chamber 19 side part of the central axis J of the ignition device 11C is smaller than 45°. As a result of the angle α2 and the angle 32 falling within the above-mentioned respective ranges, flows toward the junction between the optical window holding member 222 and the pre-chamber cap 24D are generated. Therefore, it is possible to increase the flow rates of an air-fuel mixture in a wide area inside the pre-chamber cap 24D. As a result, it is possible to increase the flow rates of an air-fuel mixture outside the zone at and near the ignition point BP. It is desirable that the angle α2 is greater than or equal to 50° and it is further desirable that the angle α2 is greater than or equal to 55°. It is desirable that the angle β2 is smaller than or equal to 40° and it is further desirable that the angle β2 is smaller than or equal to 35°.

In addition, the axes of the second pre-chamber holes 242A' and 242B' are directed toward near the junction between the optical window holding member 222 and the side surface of the pre-chamber cap 24D in the precombustion chamber 26. Therefore, an air-fuel mixture supplied to the precombustion chamber 26 is not changed in its flow directions by the first interference member 25C immediately after passing through the second pre-chamber holes 242A' and 242B'. Therefore, in comparison to the case of the above-described third embodiment where an air-fuel mixture is changed in its flow directions by the first interference member 25B immediately after passing through the second pre-chamber holes 242A-242D, the flow rates of an air-fuel mixture circulating in the precombustion chamber 26 are higher. As a result, spreading of a flare in the precombustion chamber 26 is faster.

In the ignition device 11D, an ignition flare 31 (see FIG. 4) jetted through the first pre-chamber holes 241A-241D and the second pre-chamber holes 242A' and 242B' to the main combustion chamber 19 ignites and burns the fuel of the air-fuel mixture in the main combustion chamber 19 (main combustion).

An air-fuel mixture is supplied from the main combustion chamber 19 through the first pre-chamber holes 241A-241D and the second pre-chamber holes 242A-242D to the precombustion chamber 26.

At this time, an air-fuel mixture is supplied from the main combustion chamber 19 through the first pre-chamber holes 241A-241D to the precombustion chamber 26. As illustrated in FIG. 12, the air-fuel mixture having passed through the first pre-chamber holes 241A-241D flows in the precombustion chamber 26 toward the first interference member 25C as illustrated by an arrow F5-1. As a result of the air-fuel mixture then colliding with the first interference member 25C, the flow directions of the air-fuel mixture are changed, the air-fuel mixture flows toward the window member 22 as illustrated by an arrow F5-2, and collies with the window member 22.

As a result of the air-fuel mixture colliding with the window member 22, the flows of the air-fuel mixture are reversed, and the air-fuel mixture flows from the window member 22 toward the end face 25*a* of the first interference member 25C as illustrated by an arrow F5-3. At and near the ignition point BP, the air-fuel mixture flows toward the first interference member 25C as illustrated by an arrow F5-4. As a result of the air-fuel mixture then colliding with the first interference member 25C, a stagnation point of the air-fuel mixture is generated near the point at which the air-fuel mixture collides with the first interference member 25C.

In addition, an air-fuel mixture having passed through the second pre-chamber holes 242A' and 242B' and having been supplied into the precombustion chamber 26 flows, as illustrated by an arrow F6-1, toward the inner circumferential surface 24*b* of the precombustion chamber 26. As a result of the air-fuel mixture then colliding with the window member 22, the flows of the air-fuel mixture are reversed as illustrated by an arrow F6-2, and the air-fuel mixture flows toward the end face 25*a* of the first interference member 25C. At and near the ignition point BP, the air-fuel mixture flows, as illustrated by an arrow F6-3, toward the first interference member 25C.

As a result of precombustion of the air-fuel mixture then occurring in the precombustion chamber 26 at the ignition point BP, an ignition flare 31 (see FIG. 4) is jetted through the first pre-chamber holes 241A-241D in the bore directions (the x-axis directions and the y-axis directions) of the cylinder 13. Also through the second pre-chamber holes 242A' and 242B', an ignition flare (see FIG. 4) is jetted mainly in the piston axial direction (the (+z)-axis direction) of the main combustion chamber 19 of the engine 10 (see FIG. 1).

As described above, in the ignition device 11D, as a result of the first interference member 25C and the second pre-chamber holes 242A' and 242B' being provided, it is possible to increase the flow rates of an air-fuel mixture circulating in the precombustion chamber 26. As a result, it is possible to increase the strength of an ignition flare 31 (see FIG. 4) jetted through the second pre-chamber holes 242A' and 242B', and therefore, it is possible to increase the speed of combustion of the fuel of an air-fuel mixture in the main combustion chamber 19.

In addition, in the ignition device 11D, holes for jetting an ignition flare (see FIG. 4) provided from the front inner surface 24*a* are the only two second pre-chamber holes 242A' and 2423'. By thus reducing the number of holes for jetting an ignition flare (see FIG. 4) provided in the pre-chamber cap 24D, it is possible to jet an ignition flare 31 (see FIG. 4) generated in the precombustion chamber 26 through the second pre-chamber holes 242A' and 242B' to the main combustion chamber 19 more uniformly. In addition, it is possible to jet an ignition flare 31 (see FIG. 4) through the second pre-chamber holes 242A' and 242B' to the main combustion chamber 19 more strongly. As a result, it is possible to improve the combustion efficiency in the main combustion chamber 19.

Note that, according to the present embodiment, the first pre-chamber holes 241A-241D and the second pre-chamber holes 242A' and 242B' may be provided also in such a manner that the respective axes of the first pre-chamber holes 241A-241D intersect the respective axes of the second pre-chamber holes 242A' and 242B'.

Fifth Embodiment

An ignition device according to a fifth embodiment will now be described with reference to drawings. Note that, for members having the same functions as the functions of the first embodiment through the fourth embodiment, the same reference signs are given and detailed descriptions for the members will be omitted. The ignition device according to the present embodiment is such that side plate parts formed from the front inner surface through the window member are provided to the first interference member 25B of the ignition device 11C of the third embodiment illustrated in FIGS. 8-10 described above. Therefore, concerning the present embodiment, configurations of side plate parts will be described.

Figure 14:
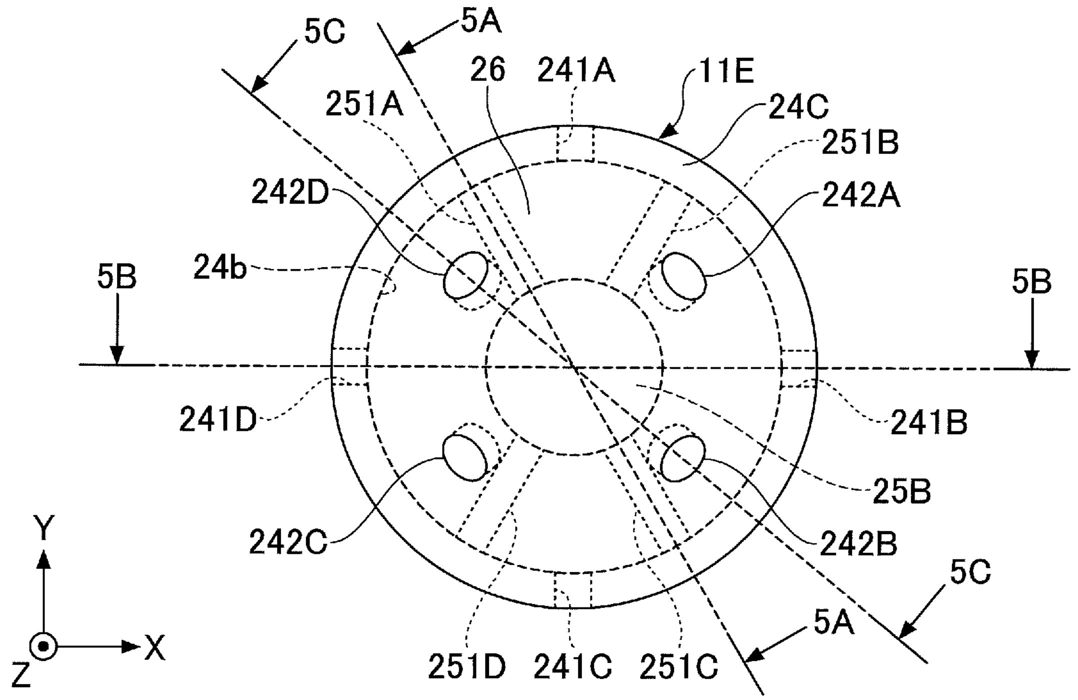
FIG. 14 is a front view illustrating a configuration of a pre-chamber cap obtained from viewing an ignition device according to a fifth embodiment from a main combustion chamber side.
Figure 15:
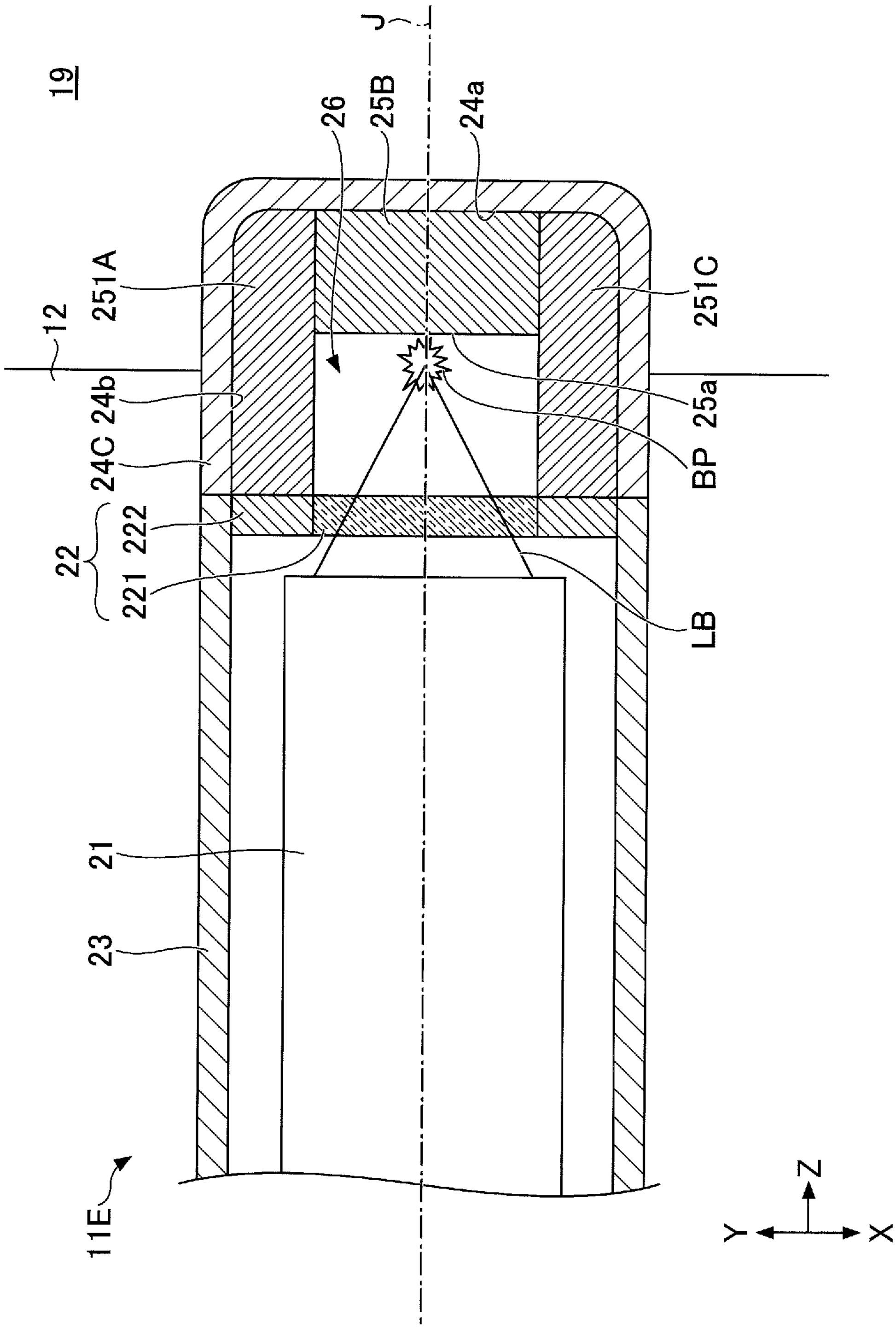
FIG. 15 is a sectional view taken along a 5A-5A line illustrated in FIG. 14.
Figure 16:
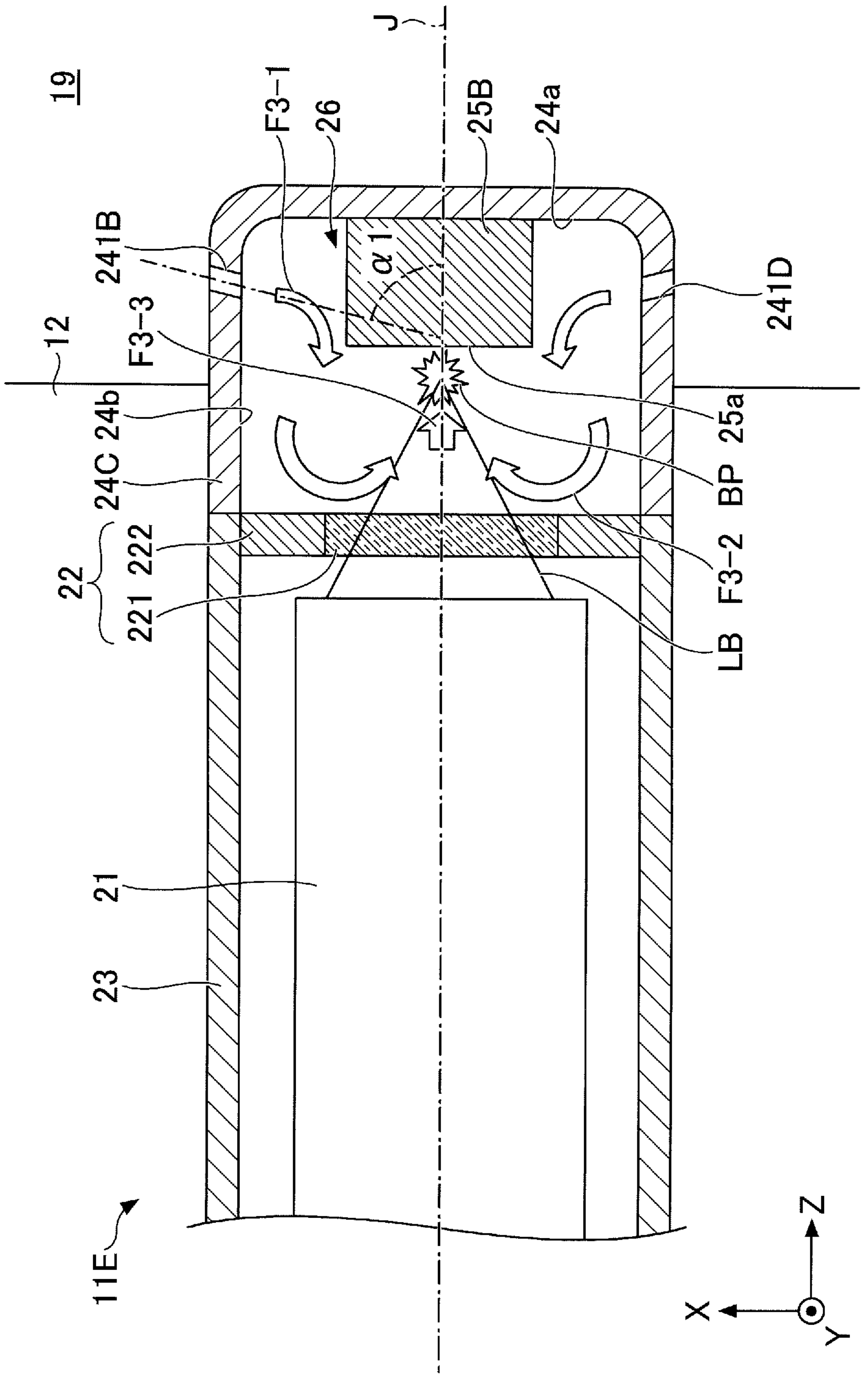
FIG. 16 is a sectional view taken along a 5B-5B line illustrated in FIG. 14.
Figure 17:
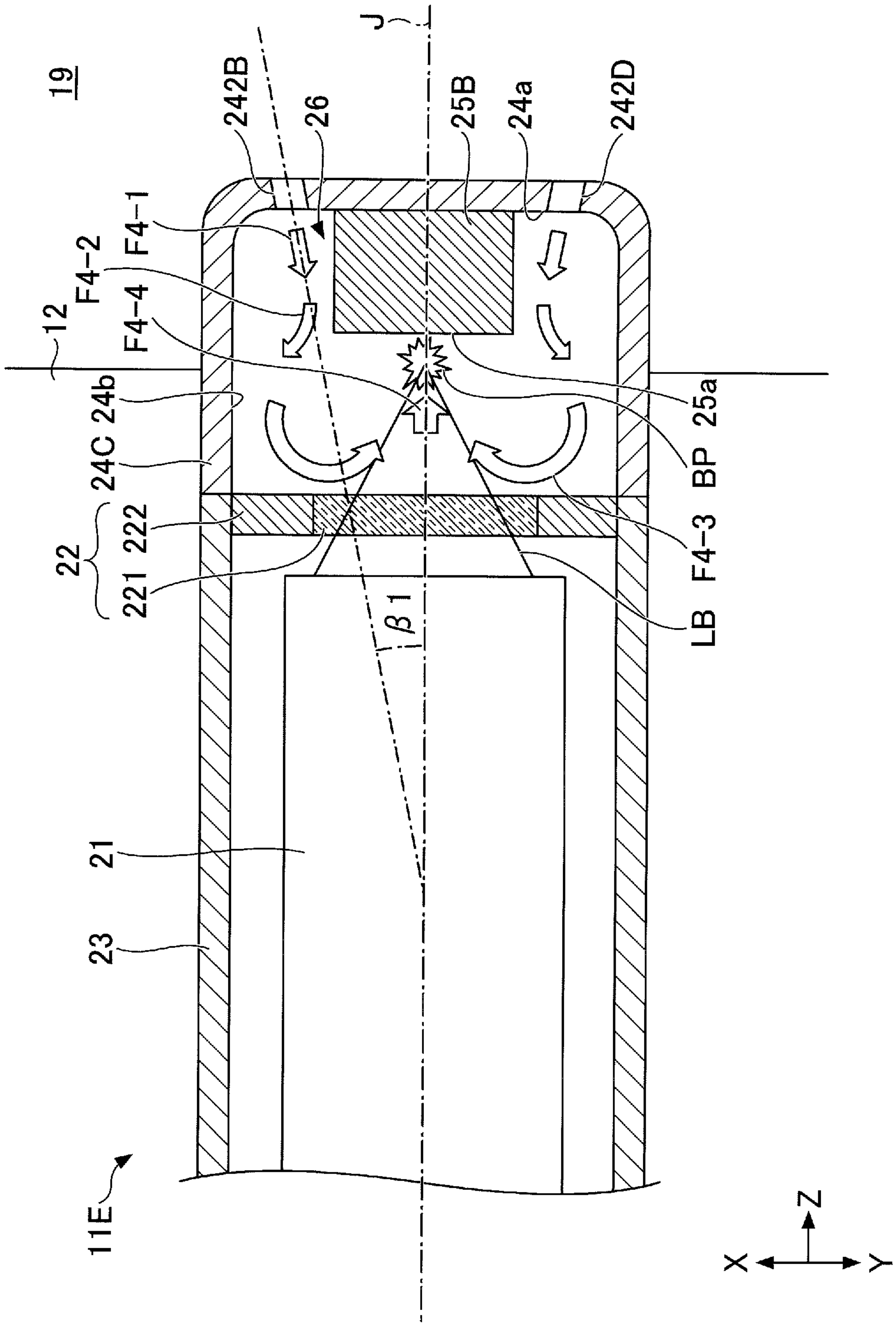
FIG. 17 is a sectional view taken along a 5C-5C line illustrated in FIG. 14.

FIG. 14 is a front view illustrating a configuration of a pre-chamber cap when an ignition device according to the fifth embodiment is viewed from the main combustion chamber; FIG. 15 is a sectional view taken along a line 5A-5A of FIG. 14; FIG. 16 is a sectional view taken along a line 5B-5B of FIG. 14; and FIG. 17 is a sectional view taken along a line 5C-5C of FIG. 14. As illustrated in FIGS. 14 and 15, in the ignition device 11E according to the fifth embodiment, the side plate parts 251A-251D having rectangular shapes are provided from the outer circumferential surface of the first interference member 25B of the ignition device 11C of the third embodiment illustrated in FIGS. 8-10 described above.

The side plate parts 251A-251D are provided from the front inner surface 24*a* of the pre-chamber cap 24C through the window member 22. The side plate parts 251A-251D are arranged along a circumferential direction of the first interference member 25B. The side plate part 251A and the side plate part 251C are provided from the first interference member 25B to be opposite to one another with respect to the first interference member 25B present between these two parts. The side plate part 251B and the side plate part 251D are provided from the first interference member 25B to be opposite to one another with respect to the first interference member 25B present between these two parts.

The side plate parts 251A-251D may be made of the same materials as the material of the first interference member 25B, and also, may be made of materials different from the material of the first interference member 25B.

The side plate parts 251A-251D may be joined to the first interference member 25B according to a known joining method and may be joined to the first interference member 25B with the use of a blazing filler material or through welding.

In the ignition device 11E according to the present embodiment, an ignition flare 31 (see FIG. 4) jetted through the first pre-chamber holes 241A-241D and the second pre-chamber holes 242A-242D to the main combustion chamber 19 ignites and burns the fuel of an air-fuel mixture in the main combustion chamber (main combustion).

An air-fuel mixture is supplied from the main combustion chamber 19 through the first pre-chamber holes 241A-241D and the second pre-chamber holes 242A-242D to the pre-combustion chamber 26.

At this time, an air-fuel mixture is supplied from the main combustion chamber 19 through the first pre-chamber holes 241A-241D to the precombustion chamber 26. As illustrated in FIG. 16, the directions illustrated by arrows F3-1 through F3-3 of an air-fuel mixture having passed through the first pre-chamber holes 241A-241D are the same as or similar to the directions illustrated by arrows F3-1 through F3-3 in the ignition device 11C of the third embodiment illustrated in FIGS. 8-10 described above, and therefore, the description will be omitted.

As illustrated in FIG. 17, the directions illustrated by arrows F4-1 through F4-3 of an air-fuel mixture having passed through the second pre-chamber holes 242A-242D are the same as or similar to the directions illustrated by arrows F4-1 through F4-3 in the ignition device 11C of the third embodiment illustrated in FIGS. 8-10 described above, and therefore, the description will be omitted.

In the ignition device 11E, as a result of the side plate parts 251A-251D being provided to the first interference member 25B, it is possible to transmit heat given to the first interference member 25B to the pre-chamber cap 24C at a time of combustion, and therefore, it is possible to lower the temperature of the first interference member 25B. Therefore, it is possible to restrain a phenomenon that the first interference member 25B is excessively heated, and therefore, it is possible to restrain a phenomenon that the pre-chamber cap 24C is damaged.

Sixth Embodiment

An ignition device according to a sixth embodiment will now be described with reference to drawings. Note that, for members having the same functions as the functions of the first embodiment through the fifth embodiment, the same reference signs are given and detailed descriptions for the members will be omitted. The ignition device according to the present embodiment is such that the number of the second pre-chamber holes provided from the front inner surface 24*a* of the pre-chamber cap 24C of the ignition device 11C of the third embodiment illustrated in FIGS. 8-10 described above is changed to 2. In addition, at portions of the outer circumferential surface of the first interference member 25B, other first interference members are provided from the front inner surface 24*a* through the inner circumferential surface 24*b*: the plurality of first interference members are provided. Therefore, concerning the present embodiment, configurations of only the other first interference members will be described.

Figure 18:
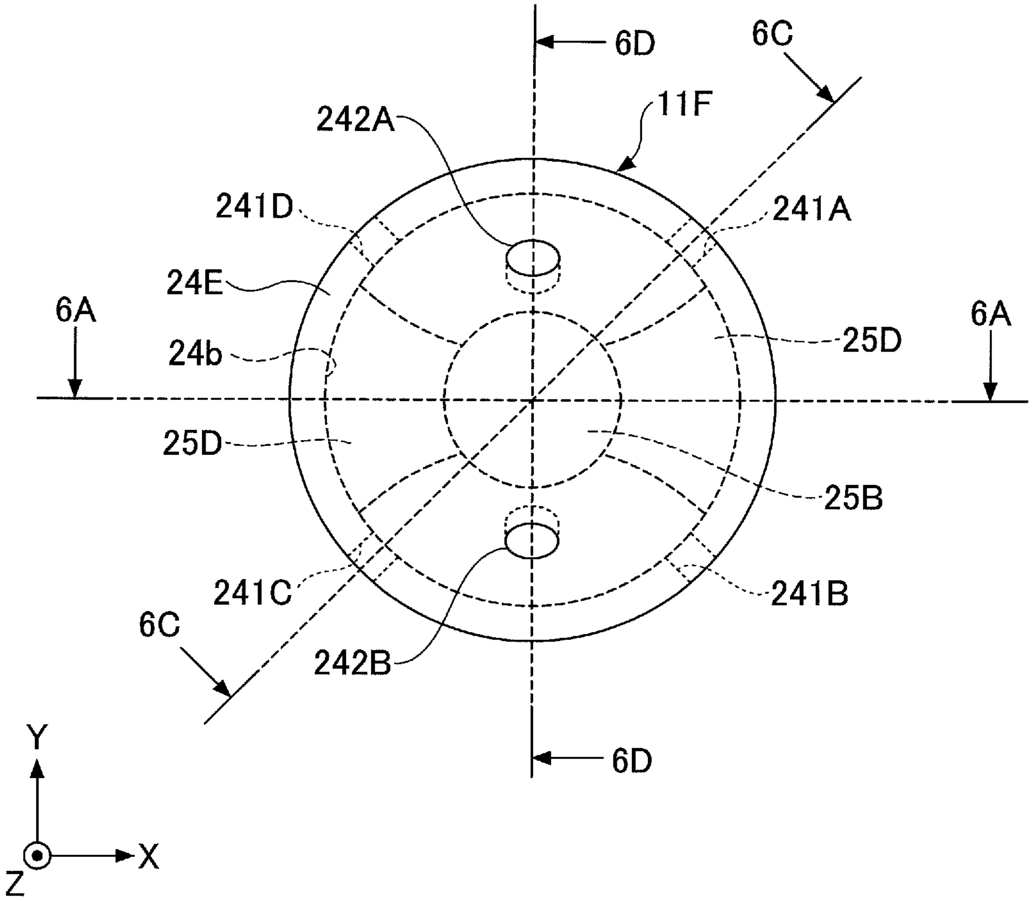
FIG. 18 is a front view illustrating a configuration of a pre-chamber cap obtained from viewing an ignition device according to a sixth embodiment from a main combustion chamber side.
Figure 19:
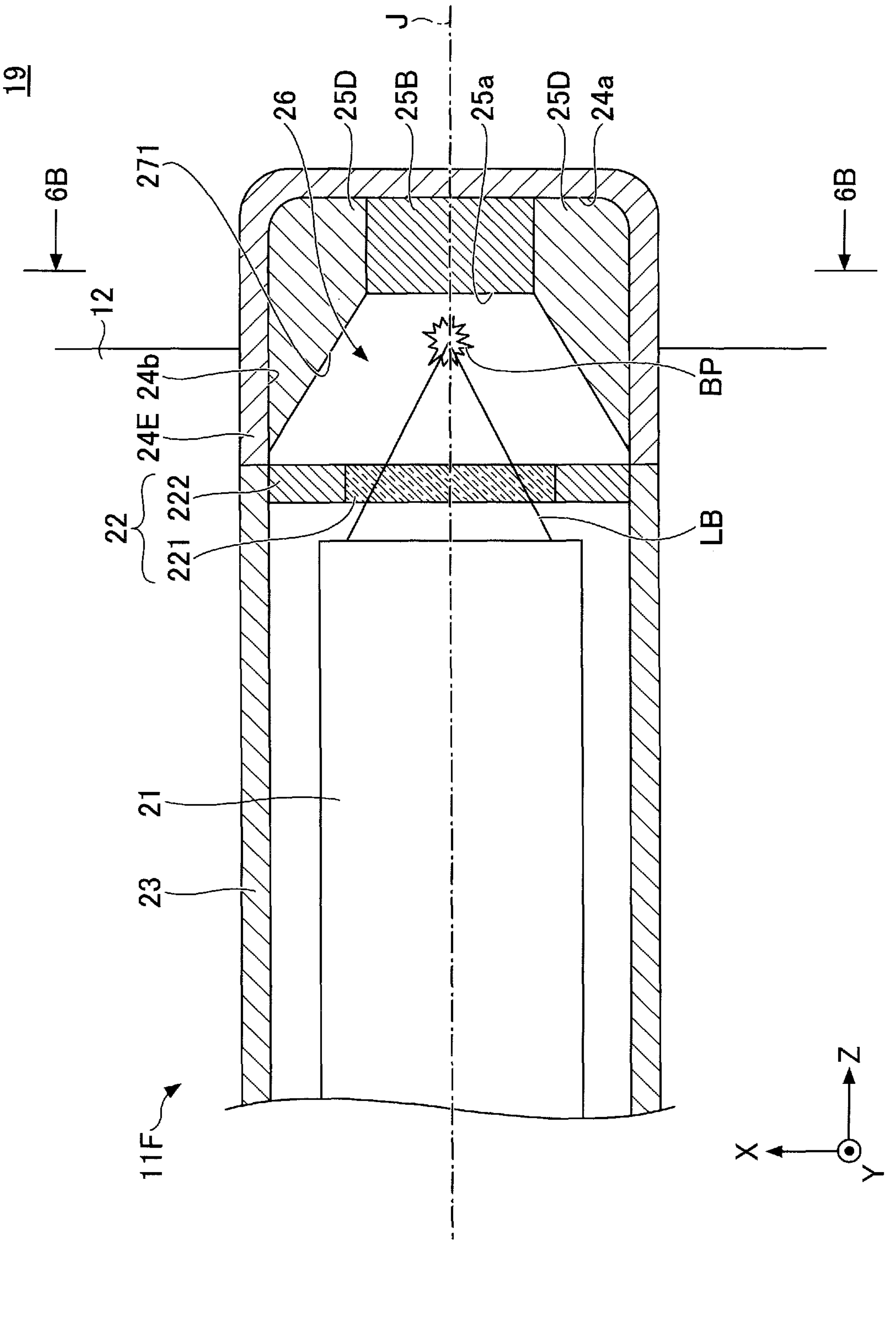
FIG. 19 is a sectional view taken along a 6A-6A line illustrated in FIG. 18.
Figure 20:
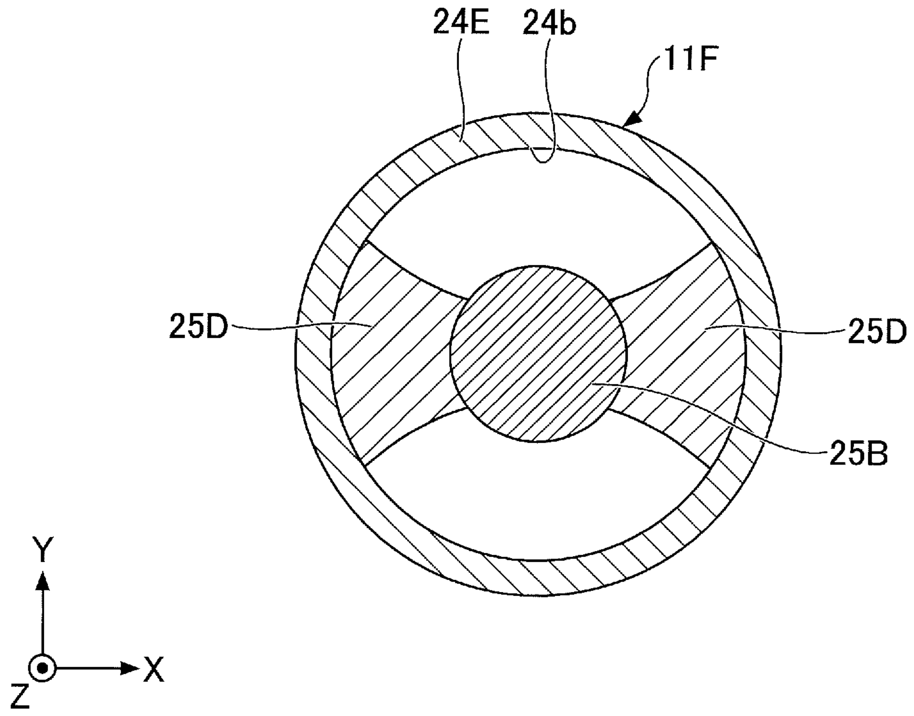
FIG. 20 is a sectional view taken along a 6B-6B line illustrated in FIG. 19.

FIG. 18 is a front view illustrating a configuration of a pre-chamber cap when an ignition device according to the sixth embodiment is viewed from the main combustion chamber; FIG. 19 is a sectional view taken along a line 6A-6A of FIG. 18; and FIG. 20 is a sectional view taken along a line 6B-6B of FIG. 19. As illustrated in FIGS. 18-20, in the ignition device 11F according to the sixth embodiment, the pre-chamber cap 24C of the ignition device 11C of the third embodiment illustrated in FIGS. 8-10 described above is changed to a pre-chamber cap 24E where two second pre-chamber holes 242A and 242B are provided from the front inner surface 24*a*. In addition, the ignition device 11F includes the first interference members 25D extending from the front inner surface 24*a* through the inner circumferential surface 24*b*.

The two second pre-chamber holes 242A and 242B are provided from the front inner surface 24*a* of the pre-chamber cap 24E to be opposite to one another with respect to the first interference member 25B present between these two holes when the ignition device 11F is viewed in the axial direction (the z-axis direction).

As illustrated in FIGS. 19 and 20, at portions of the outer circumferential surface of the first interference member 25B, the pair of the first interference members 25D are provided. The pair of the first interference members 25D are, as illustrated in FIG. 19, provided from the front inner surface 24*a* along the inner circumferential surface 24*b* of the pre-chamber cap 24E to connect the front inner surface 24*a*, the inner circumferential surface 24*b*, and the first interference member 25B with each other.

According to the present embodiment, the first interference members 25D are formed to have sectorial shapes as illustrated in FIG. 20 when the ignition device 11F is viewed in the axial direction. The shape of the face of each of the first interference members 25D in contact with the front inner surface 24*a* and the inner circumferential surface 24*b* is formed to curve to correspond to the front inner surface 24*a* and the inner circumferential surface 24*b*, as illustrated in FIG. 19.

As illustrated in FIG. 19, the first interference members 25D are formed on the outer circumferential surface of the first interference member 25B along its axial direction to be in contact with the inner circumferential surface 24*b* and the first interference member 25B when the ignition device 11F is viewed from a direction perpendicular to the axial direction (the z-axis direction) of the first interference member 25B. In addition, the first interference members 25D are formed in such a manner that the diameters of their inner circumferential surfaces 271 gradually increase along the direction from the first interference member 25B through the window member 22.

The first interference members 25D may be made of a material the same as or similar to the material of the first interference member 25B.

The first interference members 25D may be joined to the first interference member 25B according to a known joining method and may be joined to the first interference member 25B with the use of a brazing filler metal or through welding.

In the ignition device 11F, an ignition flare 31 (see FIG. 4) jetted through the first pre-chamber holes 241A-241D and the second pre-chamber holes 242A and 242B to the main combustion chamber 19 ignites and burns the fuel of an air-fuel mixture in the main combustion chamber 19 (main combustion).

Figure 21:
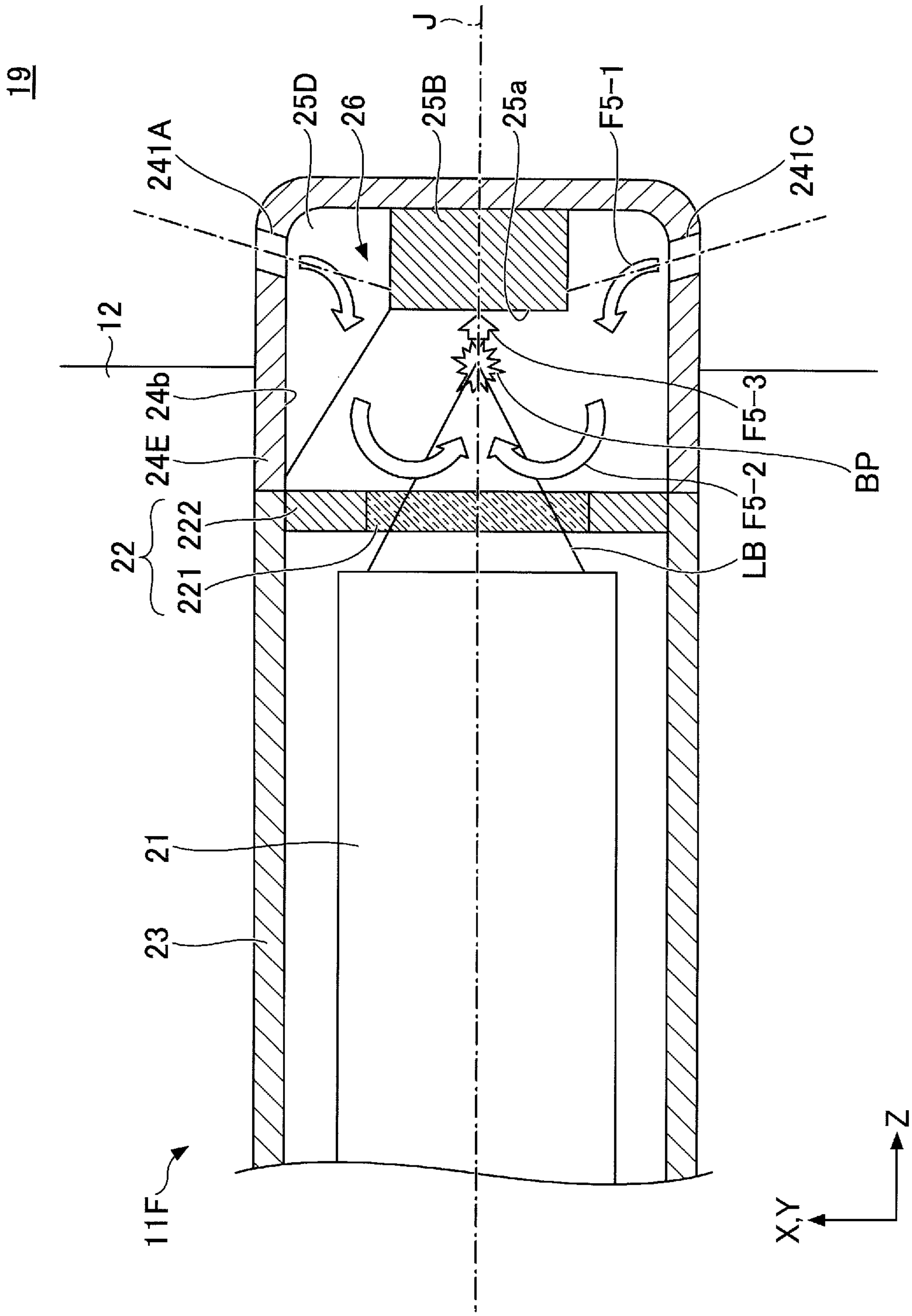
FIG. 21 is a sectional view taken along a 6C-6C line illustrated in FIG. 18.
Figure 22:
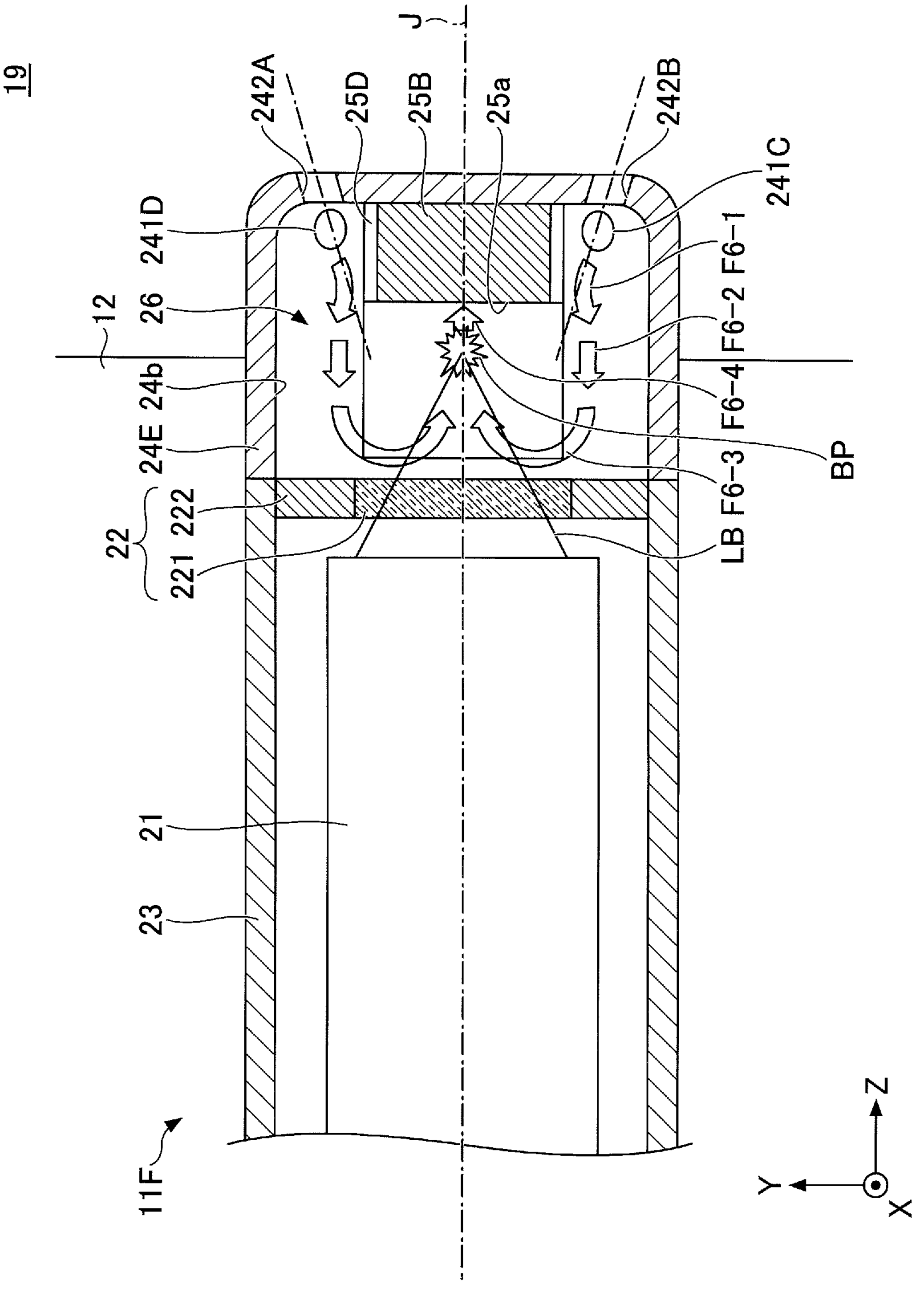
FIG. 22 is a sectional view taken along a 6D-6D line illustrated in FIG. 18.

FIG. 21 is a sectional view taken along a 6C-6C line illustrated in FIG. 18; FIG. 22 is a sectional view taken along a 6D-6D line illustrated in FIG. 18. As illustrated in FIG. 21, an air-fuel mixture is supplied from the main combustion chamber 19 through the first pre-chamber holes 241A-241D into the precombustion chamber 26, and also, as illustrated in FIG. 22, an air-fuel mixture is supplied through the second pre-chamber holes 242A and 242B to the precombustion chamber 26.

Thus, the air-fuel mixture is supplied from the main combustion chamber 19 through the first pre-chamber holes 241A-241D to the precombustion chamber 26. As illustrated in FIG. 21, the air-fuel mixture having passed through the first pre-chamber holes 241A-241D flows, as illustrated by an arrow F5-1, toward the first interference members 25B and 25D in the precombustion chamber 26. As a result of the air-fuel mixture then colliding with the first interference members 25B and 25D, the flow directions of the air-fuel mixture are changed and the air-fuel mixture flows, as illustrated by an arrow F5-2, toward the window member 22, and collides with the window member 22. Note that, FIG. 21 illustrates only the flows of the air-fuel mixture flowing through the first pre-chamber holes 241A and 241C. However, the flows of the air-fuel mixture flowing through the other first pre-chamber holes 241B and 241D are similar to the flows the air-fuel mixture flowing through the first pre-chamber holes 241A and 241C.

As a result of the air-fuel mixture colliding with the window member 22, the flows of the air-fuel mixture are reversed and the air-fuel mixture flows, as illustrated by an arrow F5-2, from the window member 22 toward the end face 25*a* of the first interference member 25B along the first interference members 25D. At and near the ignition point BP, the air-fuel mixture flows, as illustrated by an arrow F5-3, toward the first interference member 25B. As a result of the air-fuel mixture then colliding with the first interference member 25B, as described above, a stagnation point of the air-fuel mixture occurs near the point at which the air-fuel mixture collides with the first interference member 25B.

In addition, as illustrated in FIG. 22, the air-fuel mixture supplied through the second pre-chamber holes 242A and 242B to the precombustion chamber 26 flows, as illustrated by an arrow F6-1, toward the side surface of the first interference member 25B in the precombustion chamber 26. Then, as a result of the air-fuel mixture then colliding with the first interference member 25B, the flows of the air-fuel mixture are changed. The air-fuel mixture flows, as illustrated by an arrow F6-2, in parallel to the inner circumferential surface 24*b*, flows toward the window member 22, and collides with the window member 22.

As a result of the air-fuel mixture colliding with the window member 22, the flows of the air-fuel mixture are reversed as illustrated by an arrow F6-3, and the air-fuel mixture flows from the window member 22 toward the first interference member 25B. At and near the ignition point BP, the air-fuel mixture flows, as illustrated by an arrow F6-4, toward the first interference member 25B.

In the ignition device 11F, as illustrated in FIG. 21, the first interference members 25D are provided on the front inner surface 24*a* of the pre-chamber cap 24E in such a manner as to be crossed by the axes of the first pre-chamber holes 241A-241D. In addition, the end face 25*a* of the first interference member 25B is provided in such a manner that the ignition point BP is near a stagnation point created when an air-fuel mixture supplied to the precombustion chamber 26 collides with the first interference members 25D. Near the stagnation point, the flow rate of an air-fuel mixture is low, and therefore, it is possible to reduce the flow rate of an air-fuel mixture near the ignition point BP. As a result, it is possible to stably form an initial flare at the ignition point BP.

In the ignition device 11F, the first interference members 25D are provided on the first interference member 25B to extend from the front inner surface 24*a* through the inner circumferential surface 24*b* of the pre-chamber cap 24E. The first interference members 25D can remove heat of the first interference member 25B through the first interference members 25D to the cylinder head 12 (see FIG. 1) and the window member 22. The outside of the cylinder head 12 (see FIG. 1) and the ignition device 11F are cooled by a cooling liquid not illustrated: the side surfaces of the window member 22 and the pre-chamber cap 24E are cooled by the cooling liquid. Therefore, by thus discharging heat of the first interference member 25B through the first interference members 25D to the cylinder head 12 (see FIG. 1) and the window member 22, it is possible to reduce excessive heating of the first interference member 25B. If the first interference member 25B were excessively heated by combustion heat, abnormal combustion might occur such as pre-ignition or knocking as a result of self-ignition of a fuel occurring near a wall surface. In the ignition device 11F, by discharging heat of the first interference member 25B through the first interference members 25D to the cylinder head 12 (see FIG. 1) and the window member 22, it is possible to reduce excessive heating of the first interference member 25B. Thus, in the ignition device 11F, because it is possible to prevent abnormal combustion from occurring in the main combustion chamber 19, it is possible to stably operate the engine 10 (see FIG. 1).

Note that, according to the present embodiment, the pair of the first interference members 25D are provided on the front inner surface 24*a* of the pre-chamber cap 24E. However, an embodiment is not limited to this example. The number of the first interference members 25D may be 1, may be 3 or more, and, may be designed appropriately depending on the size of the pre-chamber cap 24E, the number or the positions of the first pre-chamber holes 241A-241D and/or the second pre-chamber holes 242A and 242B, and so forth.

According to the present embodiment, the axes of the first pre-chamber holes 241A-241D intersect the first interference member 25B; the axes of the first pre-chamber holes 241A-241D may intersect also the first interference members 25D.

According to the present embodiment, the first interference members 25D may be welded to the front inner surface 24*a* of the pre-chamber cap 24E; also the pre-chamber cap 24E and the first interference members 25D may be cut with the use of a 3D printer or the like and thus the first interference members 25D may be formed to the front inner surface 24*a* integrally.

Seventh Embodiment

An ignition device according to a seventh embodiment will now be described with reference to drawings. Note that, for members having the same functions as the functions of the first embodiment through the sixth embodiment, the same reference signs are given and detailed descriptions for the members will be omitted. The ignition device according to the present embodiment is the same as or similar to the ignition device according to the sixth embodiment illustrated in FIGS. 18-22 except that other first interference members are provided to project inward from the inner circumferential surface 24*b* of the pre-chamber cap 24E of the ignition device 11F of the sixth embodiment and to extend on the ignition point BP side of the first interference member 25B. Therefore, concerning the present embodiment, configurations of only the other first interference members will be described.

Figure 23:
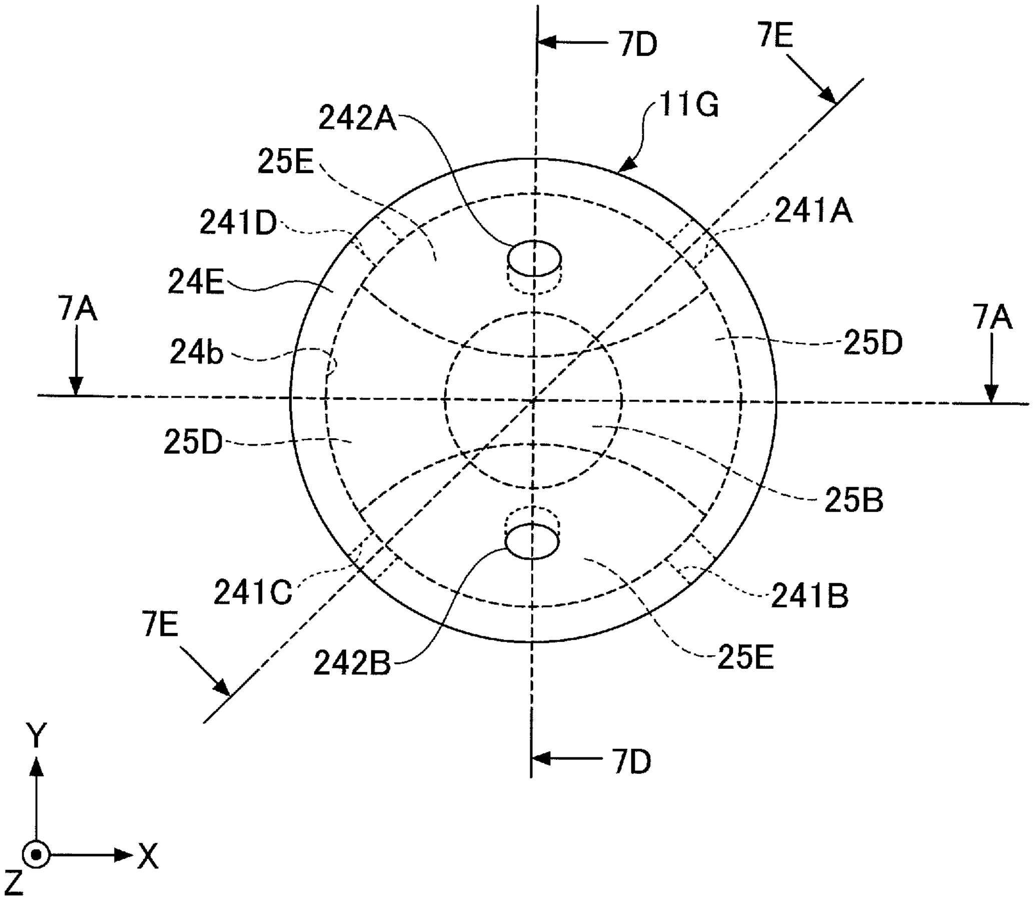
FIG. 23 is a front view illustrating a configuration of a pre-chamber cap obtained from viewing an ignition device according to a seventh embodiment from a main combustion chamber side.
Figure 24:
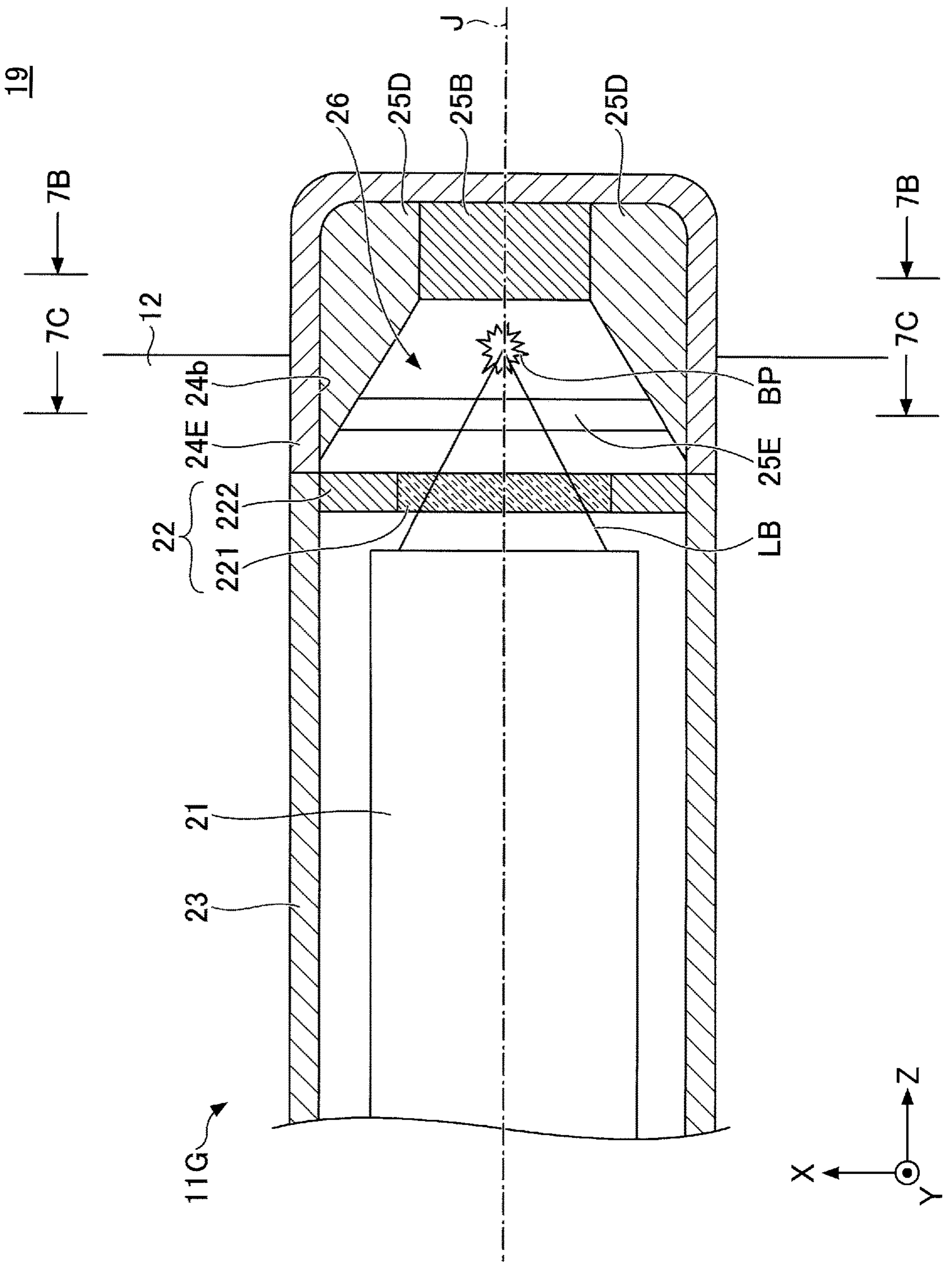
FIG. 24 is a sectional view taken along a 7A-7A line illustrated in FIG. 23.
Figure 25:
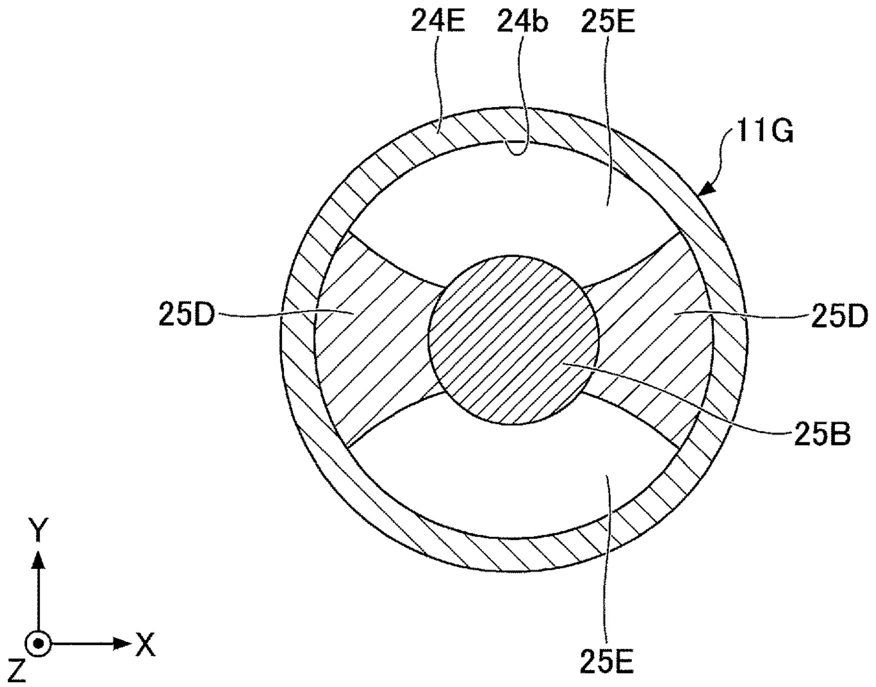
FIG. 25 is a sectional view taken along a 7B-7B line illustrated in FIG. 24.
Figure 26:
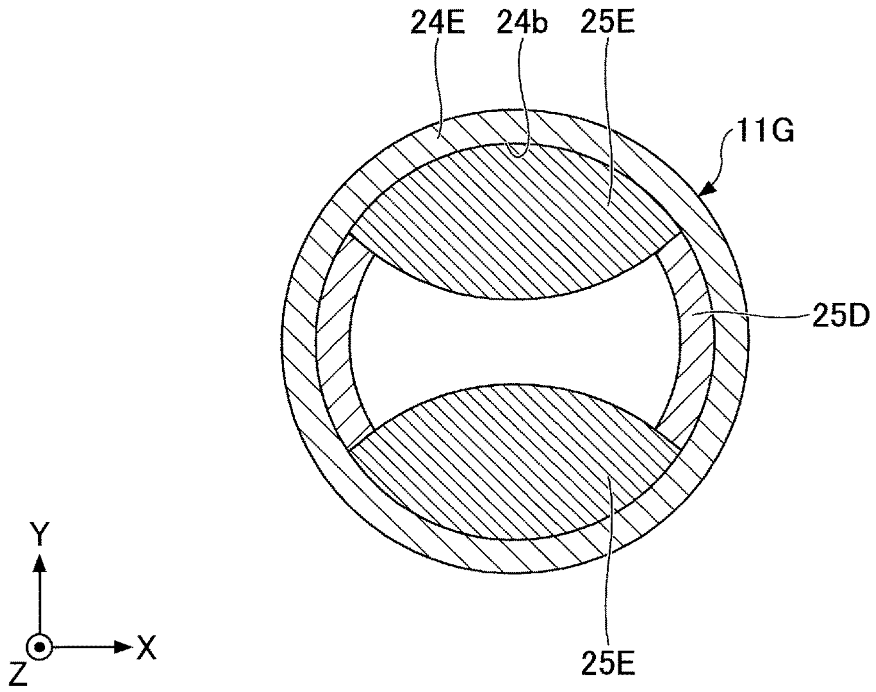
FIG. 26 is a sectional view taken along a 7C-7C line illustrated in FIG. 24.

FIG. 23 is a front view illustrating a configuration of a pre-chamber cap when an ignition device according to the seventh embodiment is viewed from the main combustion chamber; FIG. 24 is a sectional view taken along a line 7A-7A of FIG. 23; FIG. 25 is a sectional view taken along a line 7B-7B of FIG. 24; and FIG. 26 is a sectional view taken along a line 7C-7C of FIG. 24. As illustrated in FIGS. 23 and 24, in the ignition device 11G according to the present embodiment, first interference members 25E are further provided on the inner circumferential surface 24*b* of the pre-chamber cap 24E of the ignition device 11F of the sixth embodiment illustrated in FIGS. 18-20 described above, in addition to the first interference members 25B and 25D.

As illustrated in FIG. 24, the first interference members 25D are formed to have trapezoid shapes viewed in a direction perpendicular to the axial direction (the z-axis direction). In this regard, as illustrated in FIG. 24, each of the first interference members 25D is designed so that the length of the face facing the laser device 21 is greater than the length of the face in contact with the front inner surface 24*a* of the pre-chamber cap 24E. In addition, as illustrated in FIG. 25, the first interference members 25D are formed to have sectorial shapes viewed from the axial direction of the ignition device 11G (the z-axis direction).

Figure 27:
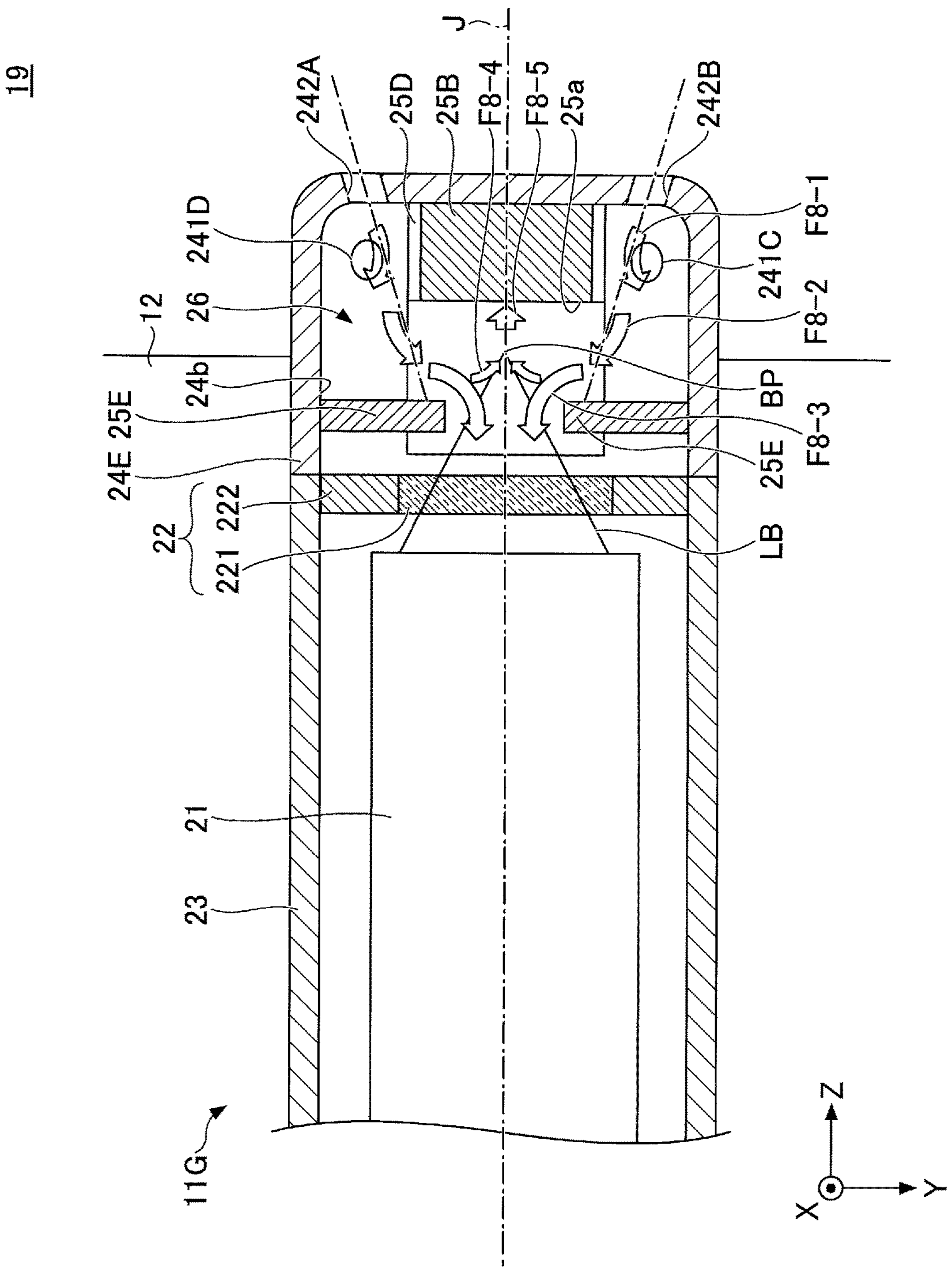
FIG. 27 is a sectional view taken along a 7D-7D line illustrated in FIG. 23.

As illustrated in FIG. 23, the pair of first interference members 25E are provided on the inner circumferential surface 24*b* of the pre-chamber cap 24E to be opposite to one another. As illustrated in FIG. 26, the first interference members 25E are formed to have shapes like convex lenses in each of which each of both sides is convex (biconvex lenses) viewed in the axial direction (the z-axis direction). As illustrated in FIG. 27, the first interference members 25E are formed to have plate shapes when the ignition device 11G is viewed from a direction perpendicular to the axial direction of the ignition device 11G (the z-axis direction).

As illustrated in FIG. 24, the first interference members 25E are provided near the ignition point BP when the ignition device 11G is viewed from a direction perpendicular to the axial direction of the ignition device 11G (the z-axis direction). According to the present embodiment, the first interference members 25E are provided on the window member 22 side of the ignition point BP in a state of being apart from the first interference members 25B and 25D by predetermined spaces.

As illustrated in FIG. 26, there is a space between the pair of first interference member 25E to allow an air-fuel mixture supplied to the precombustion chamber 26 to pass through.

FIG. 27 is a sectional view taken along a line 7D-7D illustrated in FIG. 23. As illustrated in FIG. 27, the first interference members 25E are provided on the inner circumferential surface 24*b* of the pre-chamber cap 24E to be crossed by the axes of the second pre-chamber holes 242A and 242B.

The inner diameters, the positions, and the directions of the holes of the first pre-chamber holes 241A-241D and the second pre-chamber holes 242A and 242B, the inside shape and/or volume of the pre-chamber cap 24E, the shapes and the positions of the first interference members 25B, 25D, and 25E, and so forth, are determined appropriately to generate flows of an air-fuel mixture as illustrated by arrows F7-4, F7-5, F8-4 and F8-5 described later. In addition, generation of flows of an air-fuel mixture as illustrated by the arrows F7-4, F7-5, F8-4, and F8-5 described later can be confirmed through fluid simulation or the like.

In the ignition device 11G, an ignition flare 31 (see FIG. 4) jetted through the first pre-chamber holes 241A-241D and the second pre-chamber holes 242A and 242B to the main combustion chamber 19 ignites and burns the fuel of an air-fuel mixture in the main combustion chamber 19 (main combustion).

Figure 28:
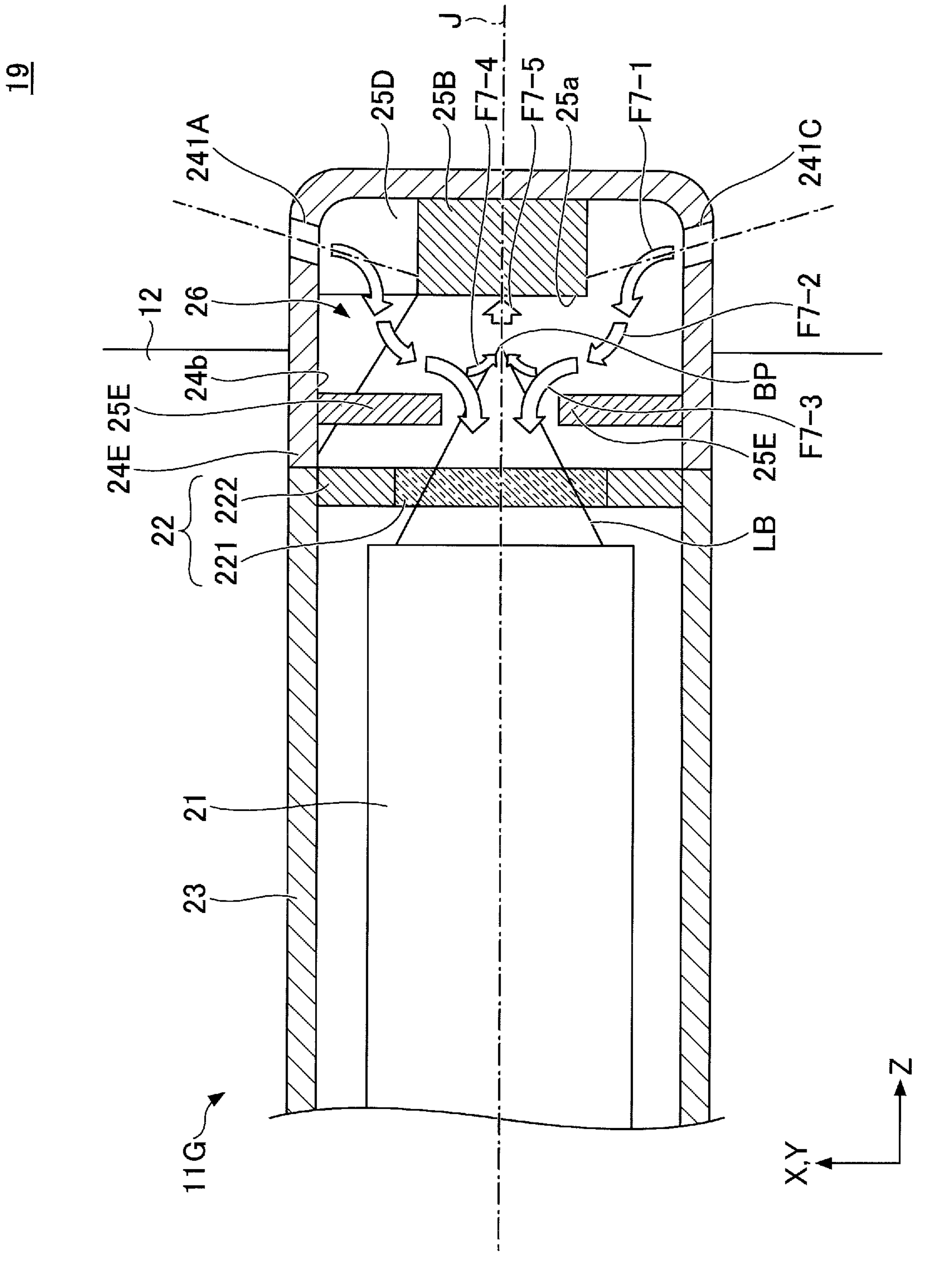
FIG. 28 is a sectional view taken along a 7E-7E line illustrated in FIG. 23.

FIG. 28 is a sectional view taken along a 7E-7E line illustrated in FIG. 23. An air-fuel mixture is supplied from the main combustion chamber 19 through the first pre-chamber holes 241A-241D and the second pre-chamber holes 242A and 242B to the precombustion chamber 26.

At this time, an air-fuel mixture is supplied from the main combustion chamber 19 through the first pre-chamber holes 241A-241D to the precombustion chamber 26. As illustrated in FIG. 28, the air-fuel mixture having passed through the first pre-chamber holes 241A-241D flows, as illustrated by an arrow F7-1, toward the first interference members 25B and 25D in the precombustion chamber 26. As a result of the air-fuel mixture then colliding with the first interference members 25B and 25D, the flow directions of the air-fuel mixture are changed, and the air-fuel mixture collides with the first interference members 25E as illustrated by an arrow F7-2. Note that, in FIG. 28, only the flows of the air-fuel mixture having flowed through the first pre-chamber holes 241A and 241C are illustrated. However, also the flows of the air-fuel mixture having flowed through the other first pre-chamber holes 241B and 241D are the same as or similar to the flows of the air-fuel mixture having flowed through the first pre-chamber holes 241A and 241C.

As illustrated by an arrow F7-3, the air-fuel mixture detours around the first interference members 25E and flows toward the space between the pair of first interference member 25E. The air-fuel mixture flows toward the window member 22. At this time, a part of the air-fuel mixture flows toward the first interference member 25B as illustrated by an arrow F7-4.

The air-fuel mixture having flowed toward the first interference member 25B flows, as illustrated by an arrow F7-5, in the direction from the window member 22 toward the end face 25*a* of the first interference member 25B. The air-fuel mixture flows, as illustrated by an arrow F7-5, toward the first interference member 25B at and near the ignition point BP. As a result of the air-fuel mixture then colliding with the first interference member 25B, a stagnation point of the air-fuel mixture is created near the point at which the air-fuel mixture collides with the first interference member 25B.

On the other hand, as a result of the flows of an air-fuel mixture having flowed between the pair of the first interference member 25E then colliding with the window member 22, the flows of the air-fuel mixture are reversed, and the air-fuel mixture passes between the pair of first interference member 25E. The air-fuel mixture having passed through the space then flows, together with the air-fuel mixture that have branched without passing through the space as illustrated by an arrow F7-4, toward the first interference member 25B.

In addition, as illustrated in FIG. 27, an air-fuel mixture supplied through the second pre-chamber holes 242A and 242B into the precombustion chamber 26 flows, as illustrated by an arrow F8-1, in the precombustion chamber 26 toward the side surface of the first interference member 25B and the surfaces of the first interference members 25D. As a result of the air-fuel mixture then colliding with the first interference members 25B and 25D, the flow directions of the air-fuel mixture are changed, and the air-fuel mixture collides with the first interference members 25E as illustrated by an arrow F8-2.

As illustrated by an arrow F8-3, the air-fuel mixture detours around the first interference members 25E and flows toward the space between the pair of first interference members 25E. The air-fuel mixture thus having passed through the space flows toward the window member 22. At this time, an air-fuel mixture partially flows toward the first interference member 25B as illustrated by an arrow F8-4.

The air-fuel mixture having partially flowed toward the first interference member 25B then flow, as illustrated by an arrow F8-5, in the direction from the window member 22 toward the end face 25*a* of the first interference member 25B. At and near the ignition point BP, the air-fuel mixture flows toward the first interference member 25B, as illustrated by an arrow F8-5. At and near the ignition point BP, a flow of the air-fuel mixture toward the first interference member 25B is generated. As a result of the air-fuel mixture then colliding with the first interference member 25B, a stagnation point of the air-fuel mixture is created near the point at which the air-fuel mixture collides with the first interference member 25B.

On the other hand, as a result of the air-fuel mixture having passed through the pair of first interference members 25E then colliding with the window member 22, the flows of the air-fuel mixture are reversed, and the air-fuel mixture passes through the space between the pair of first interference members 25E. The air-fuel mixture having passed through the space flows, together with the air-fuel mixture having branched without passing through the space as illustrated by an arrow F8-4, toward the first interference member 25B.

The ignition device 11G includes the pair of first interference members 25E so that it is possible to reduce the distance for an air-fuel mixture flowing from the main combustion chamber 19 to reach the ignition point BP. As a result, for a case where, for example, the ignition device 11G is used as a gas engine for power generation, it is easy to supply a fresh air-fuel mixture (i.e., an air-fuel mixture to which a residual exhaust gas is not much mixed) to the ignition point BP, resulting in that it is possible to cause more stable ignition.

For a case where the ignition device 11G is used as in internal combustion engine as a gas engine for power generation, before a stage of a compression stroke, the pre-chamber cap 24E has been filled with an exhaust gas (a residual exhaust gas). Therefore, in an ignition device using a pre-chamber plug in the related art, there would be a possibility that an air-fuel mixture having reached an ignition point includes many residual exhaust gas components. For example, in a case of lean-burn, a large amount of nitrogen or unburned residual oxygen is included in an exhaust gas. As a result of a lean air-fuel mixture in a main combustion chamber being mixed with an exhaust gas in a pre-chamber, the air-fuel mixture in the pre-chamber would become leaner than the air-fuel mixture in the main combustion chamber. In addition, at least in a condition where an air-fuel mixture at an ignition point were under a lean state, it might be impossible to cause ignition. This is because, even in a case where an air-fuel mixture in a main combustion chamber falls within a range of inflammable limit density, there would be a possibility that an air-fuel mixture supplied to an ignition point BP falls outside the range of inflammable limit density (to a leaner side) as a result of a residual exhaust gas in a pre-chamber being mixed with the air-fuel mixture in the main combustion chamber. In contrast thereto, in the ignition device 11G according to the present embodiment, it is easy for an air-fuel mixture in the main combustion chamber 19 to reach the ignition point BP while the air-fuel mixture is maintained in a state of falling within a inflammable limit density, the air-fuel mixture is not likely to be affected by a residual exhaust gas in the pre-chamber cap 24E, and therefore, it is possible to cause ignition more stably. Therefore, it is possible to further stabilize operation of the engine 10 (see FIG. 1).

In the ignition device 11G, the pair of first interference members 25E are placed in such a manner as to be crossed by the axes of the second pre-chamber holes 242A and 242B. As a result, strong flows of the arrows F7-4 and F7-5 can be generated. As a result, flows toward the first interference member 25B are surely generated at the ignition point BP: it is possible implement stable ignition.

Note that, according to the present embodiment, the axes of the second pre-chamber holes 242A and 242B cross the first interference members 25E. However, the axes of the second pre-chamber holes 242A and 242B need not cross the first interference members 25E.

According to the present embodiment, the shapes of the first interference members 25E viewed in the axial direction are sectorial shapes. However, the shapes of the first interference members 25D viewed in the axial direction are not limited to sectorial shapes.

According to the present embodiment, the first interference members 25E are formed to have biconvex shapes when the ignition device 11G is viewed in the axial direction of the ignition device 11G. However, the shapes of the first interference members 25E are not particularly limited as long as the first interference members 25E can be provided in such a manner as to be in contact with the inner circumferential surface 24*b* and can have a space between the pair of first interference members 25E.

According to the present embodiment, the first interference members 25E may be welded to the inner circumferential surface 24*b* of the pre-chamber cap 24E, or the pre-chamber cap 24E and the first interference members 25E may be cut by a 3D or the like and thus the first interference members 25E may be formed to the inner circumferential surface 24*b* integrally.

Eighth Embodiment

An ignition device according to an eighth embodiment will now be described with reference to drawings. Note that, for members having the same functions as the functions of the first embodiment through the seventh embodiment, the same reference signs are given and detailed descriptions for the members will be omitted. In the ignition device according to the present embodiment, the number of the second pre-chamber holes formed from the front inner surface 24*a* of the pre-chamber cap 24C of the ignition device 11C of the third embodiment illustrated in FIGS. 8-10 described above is changed into 2. Moreover, in addition to the first interference member 25B, other first interference members are provided from the front inner surface 24*a* through the inner circumferential surface 24*b* and a second interference member is provided on the inner circumferential surface 24*b* of the pre-chamber cap 24C. Therefore, concerning the present embodiment, configurations of only the other first interference members and the second interference member will be described.

Figure 29:
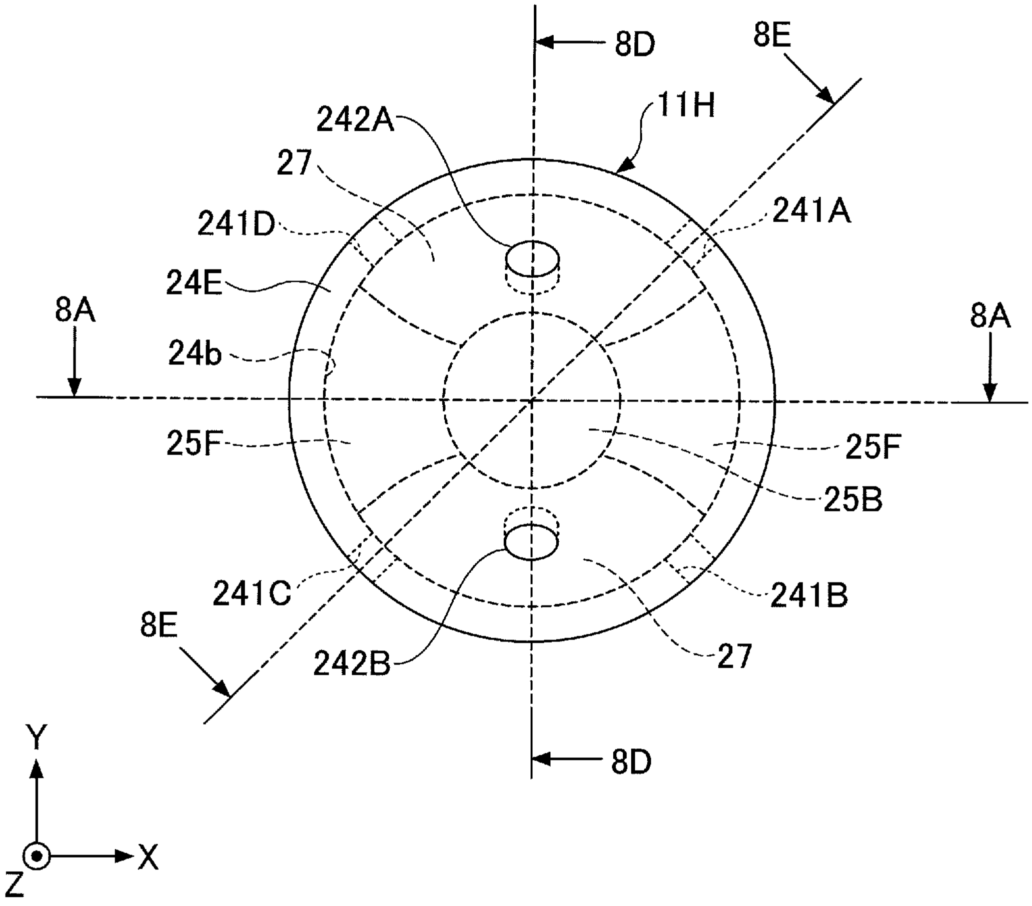
FIG. 29 is a front view illustrating a configuration of a pre-chamber cap obtained from viewing an ignition device according to an eighth embodiment from a main combustion chamber side.
Figure 30:
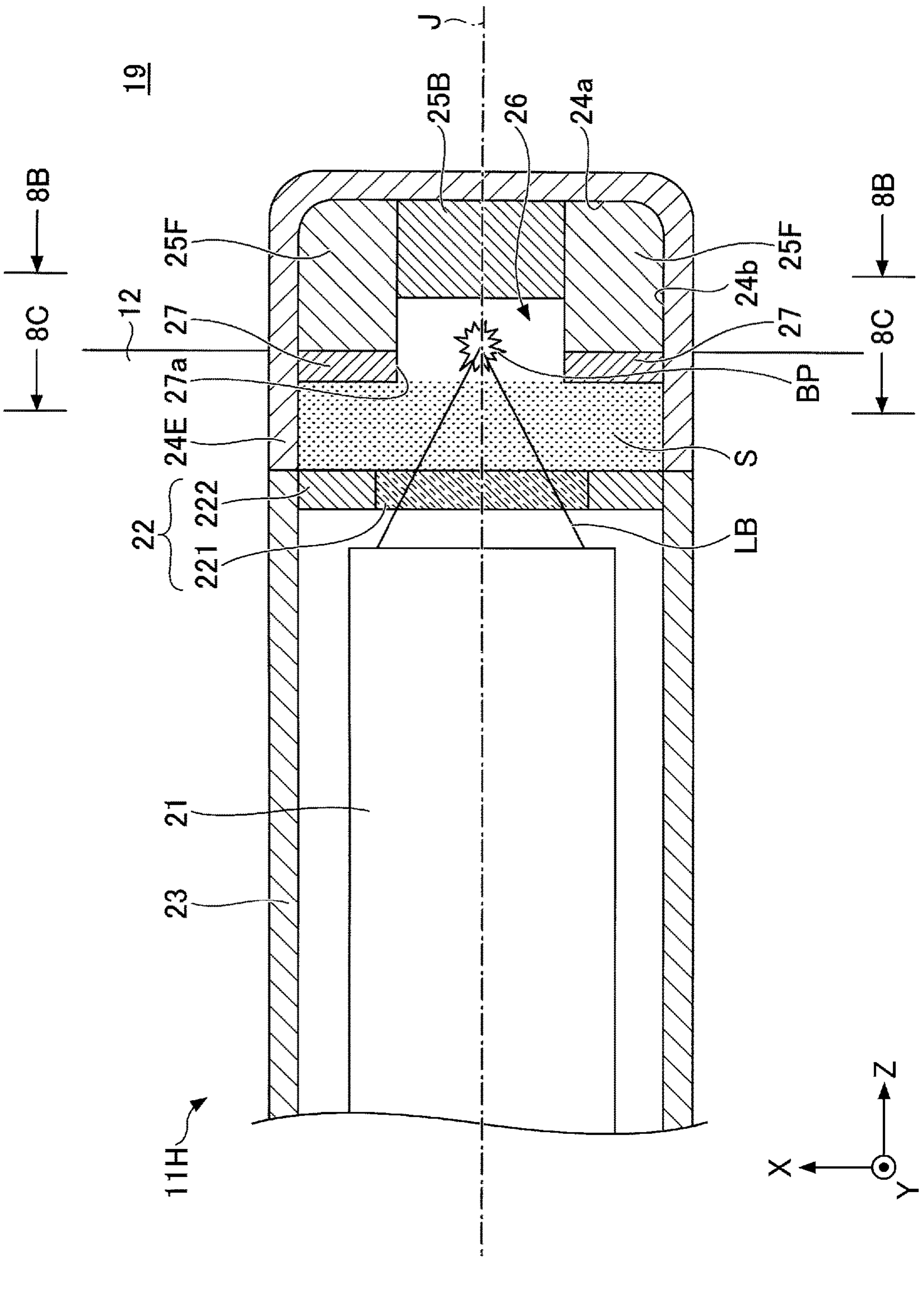
FIG. 30 is a sectional view taken along an 8A-8A line illustrated in FIG. 29.
Figure 31:
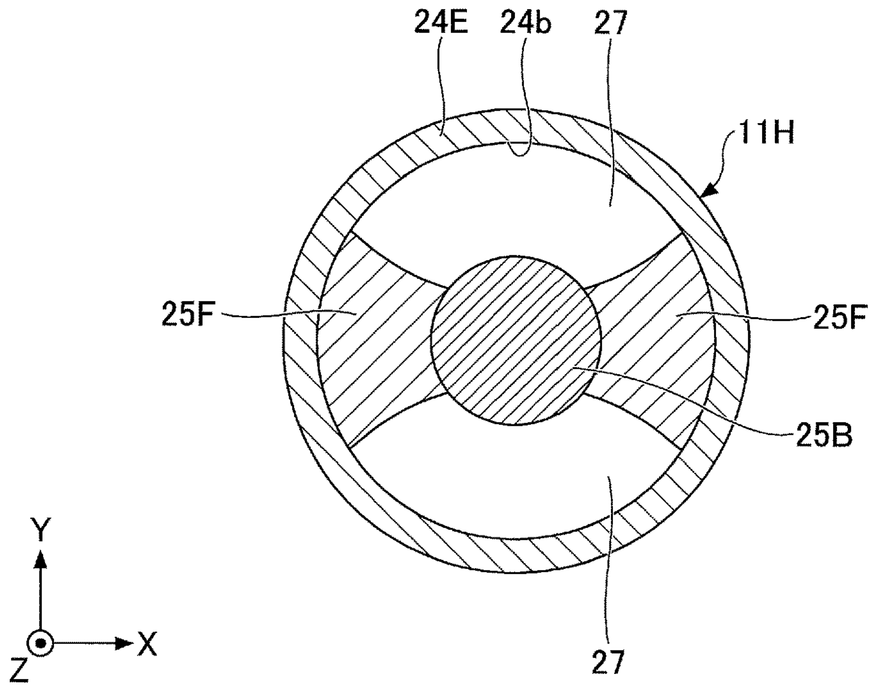
FIG. 31 is a sectional view taken along an 8B-8B line illustrated in FIG. 30.
Figure 32:
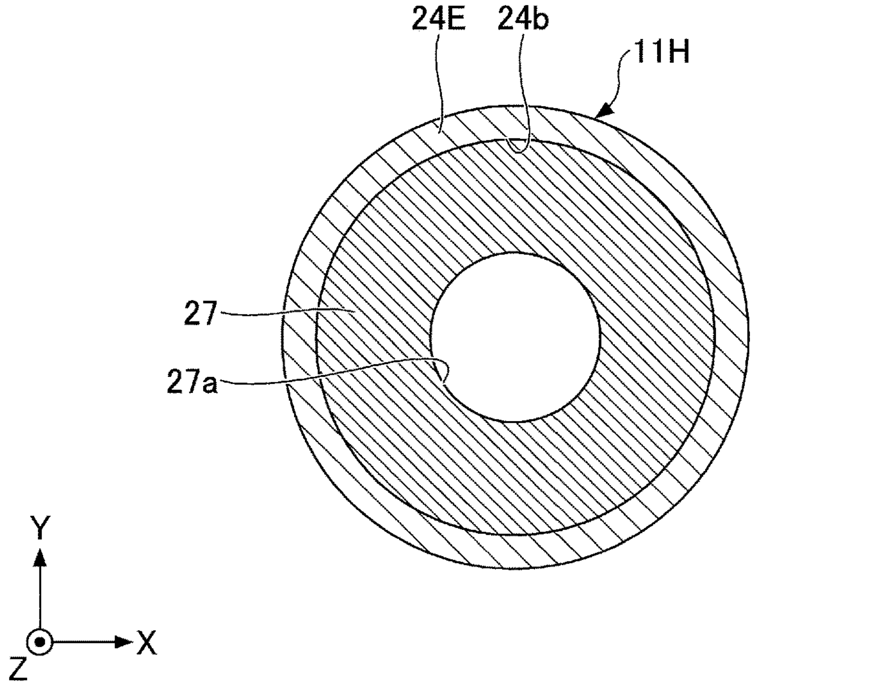
FIG. 32 is a sectional view taken along an 8C-8C line illustrated in FIG. 30.

FIG. 29 is a front view illustrating a configuration of a pre-chamber cap when an ignition device according to the eighth embodiment is viewed from the main combustion chamber; FIG. 30 is a sectional view taken along a line 8A-8A of FIG. 29; FIG. 31 is a sectional view taken along a line 8B-8B of FIG. 30; and FIG. 32 is a sectional view taken along a line 8C-8C of FIG. 30. As illustrated in FIGS. 29-32, in the ignition device 11H according to the present embodiment, the pre-chamber cap 24C of the ignition device 11C of the third embodiment illustrated in FIGS. 8-10 described above is changed into a pre-chamber cap 24E where the two second pre-chamber holes 242A and 242B are provided from the front inner surface 24*a*. In addition, in the ignition device 11H, the first interference members 25F are provided from the front inner surface 24*a* through the inner circumferential surface 24*b* of the pre-chamber cap 24E; the second interference member 27 is provided to extend from the inner circumferential surface 24*b*.

As illustrated in FIGS. 29 and 30, the pair of first interference members 25F are provided to be opposite to one another with respect to the first interference member 25B present between the members 25F to extend from the inner circumferential surface 24*b* of the pre-chamber cap 24E. The pair of first interference members 25F are provided to extend from the front inner surface 24*a* through the inner circumferential surface 24*b* to connect the front inner surface 24*a*, the inner circumferential surface 24*b*, and the first interference member 25B of the pre-chamber cap 24E together.

As illustrated in FIG. 30, when the ignition device 11H is viewed from a direction perpendicular to the axial direction of the ignition device 11H (the z-axis direction), the first interference members 25F extend along the inner circumferential surface 24*b* of the pre-chamber cap 24E in the axial direction.

As illustrated in FIG. 31, the first interference members 25F are formed to have sectorial shapes viewed in the axial direction; the face of each of the first interference members 25F in contact with the front inner surface 24*a* and the inner circumferential surface 24*b* is curved to correspond to the front inner surface 24*a* and the inner circumferential surface 24*b*.

The first interference members 25F can be made of a material the same as or similar to the material of the first interference member 25B.

The first interference members 25F may be joined to the first interference member 25B according to a known joining method and may joined to the first interference member 25B with the use of a blazing filler metal or through welding.

As illustrated in FIG. 30, the second interference member 27 is provided on the inner circumferential surface 24*b* of the pre-chamber cap 24E to be in contact with the first interference members 25F.

As illustrated in FIG. 30, the second interference member 27 is formed to have a plate shape. As illustrated in FIG. 32, the second interference member 27 is formed to have a ring shape viewed in the axial direction, is provided between the front inner surface 24*a* and the window member 22, and is shaped as a hollow cylinder having a through hole 27*a*.

Figure 33:
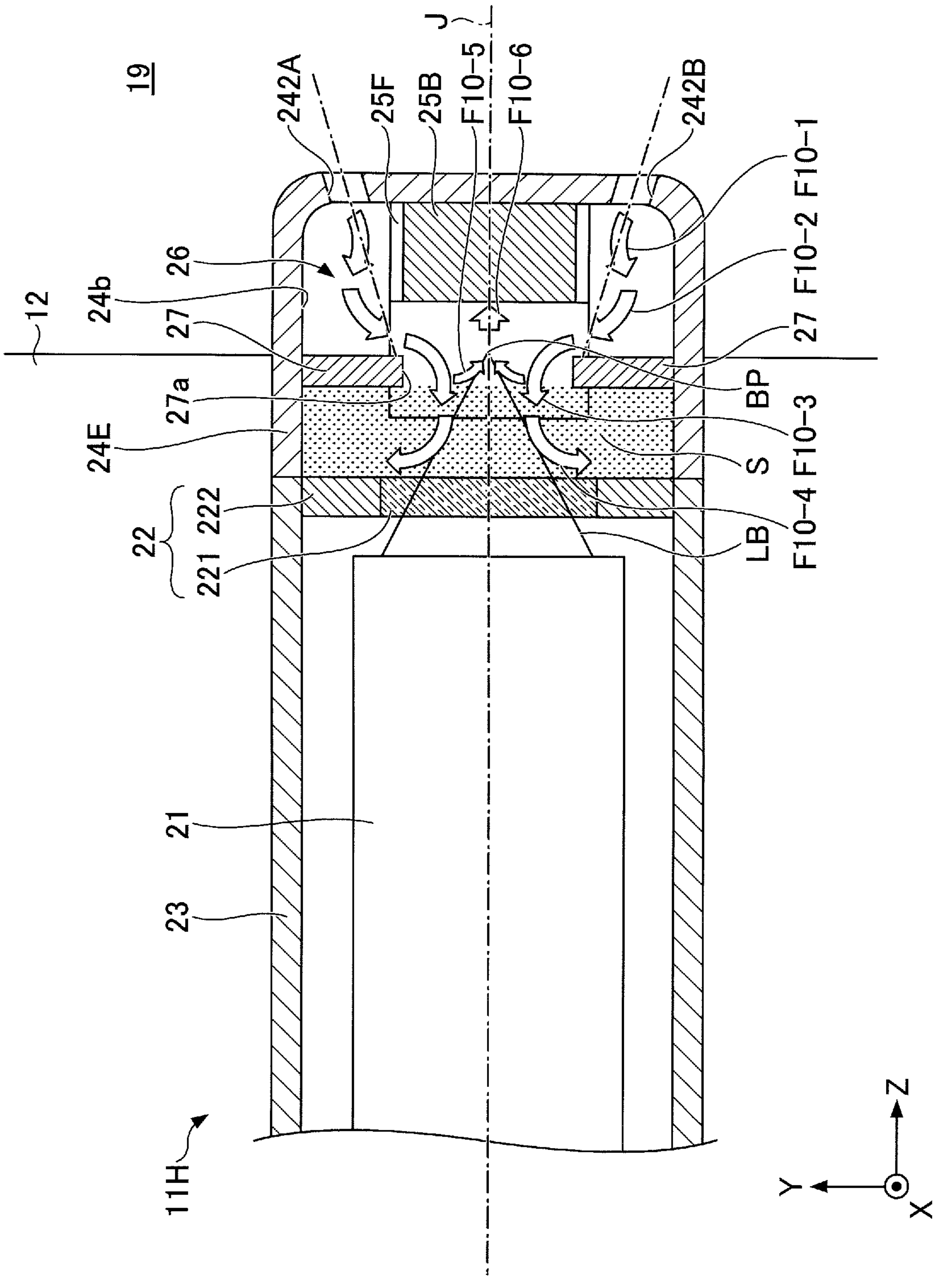
FIG. 33 is a sectional view taken along an 8D-8D line illustrated in FIG. 29.

FIG. 33 is a sectional view taken along an 8D-8D line illustrated in FIG. 29. As illustrated in FIG. 33, the second interference member 27 is provided from the inner circumferential surface 24*b* of the pre-chamber cap 24E to be crossed by the axes of the second pre-chamber holes 242A and 242B.

The second interference member 27 may be made of a material the same as or similar to the material of the first interference members 25B and 25F.

The second interference member 27 may be joined to the inner circumferential surface 24*b* or the first interference members 25F according to a known joining method and may be joined to the inner circumferential surface 24*b* with the use of a blazing filler material or through welding.

As illustrated in FIG. 30, the window member 22, the pre-chamber cap 24E, and the second interference member 27 form a residual exhaust gas storage space S. An air-fuel mixture having passed through the through hole 27*a* of the second interference member 27 is stored in the residual exhaust gas storage space S as a residual exhaust gas.

In the ignition device 11H, an ignition flare 31 (see FIG. 4) jetted through the first pre-chamber holes 241A-241D and the second pre-chamber holes 242A and 242B to the main combustion chamber 19 ignites and burns the fuel of an air-fuel mixture in the main combustion chamber 19 (main combustion).

Figure 34:
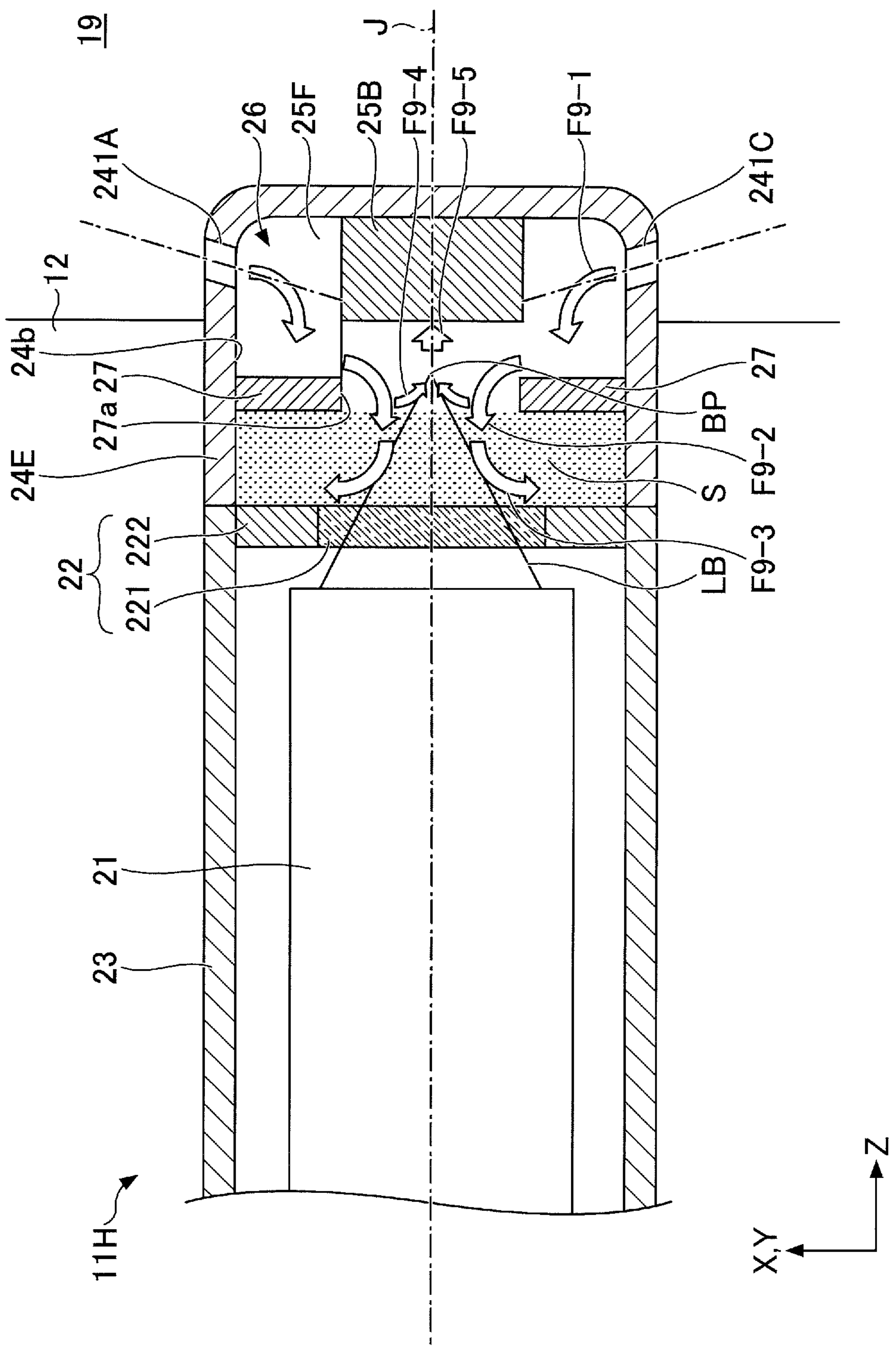
FIG. 34 is a sectional view taken along an 8E-8E line illustrated in FIG. 29.

FIG. 34 illustrates a sectional view taken along a line 8E-8E illustrated in FIG. 29. An air-fuel mixture is supplied, as illustrated in FIG. 34, from the main combustion chamber 19 through the first pre-chamber holes 241A-241D to the precombustion chamber 26; an air-fuel mixture is supplied, as illustrated in FIG. 33, from the main combustion chamber 19 through the second pre-chamber holes 242A and 242B to the precombustion chamber 26.

Thus, the air-fuel mixture is supplied from the main combustion chamber 19 through the first pre-chamber holes 241A-241D to the precombustion chamber 26. As illustrated in FIG. 34, the air-fuel mixture having passed through the first pre-chamber holes 241A-241D flows, as illustrated by an arrow F9-1, toward the first interference member 25B in the precombustion chamber 26. As a result of the air-fuel mixture then colliding with the first interference members 25B and 25F, the flow directions of the air-fuel mixture are changed, and the air-fuel mixture flows, as illustrate by an arrow F9-2, toward the through hole 27*a* of the second interference member 27. The air-fuel mixture then passes through the through hole 27*a* and flows to the residual exhaust gas storage space S. At this time, as illustrated by an arrow F9-4, an air-fuel mixture partially flows toward the first interference member 25B. Note that, FIG. 33 illustrates only the flows of the air-fuel mixture flowing through the first pre-chamber holes 241A and 241C. However, the flows of the air-fuel mixture flowing through the other first pre-chamber holes 241B and 241D are the same as or similar to the flows of the air-fuel mixture flowing through the first pre-chamber holes 241A and 241C.

The air-fuel mixture having flowed toward the first interference member 25B flows, as illustrated by an arrow F9-5, in the direction from the window member 22 toward the end face 25*a* of the first interference member 25B. At and near the ignition point BP, the air-fuel mixture flows, as illustrated by an arrow F9-5, toward the first interference member 25B. As a result of the air-fuel mixture then colliding with the first interference member 25B, as described above, a stagnation point of the air-fuel mixture is created near the point at which the air-fuel mixture collides with the first interference member 25B.

On the other hand, the air-fuel mixture having flowed to the residual exhaust gas storage space S collides with the surface of the window member 22 and spreads in directions toward the inner circumferential surface 24*b*, as illustrated by an arrow F9-3. The air-fuel mixture in the residual exhaust gas storage space S circulates in the residual exhaust gas storage space S.

In addition, as illustrated in FIG. 33, the air-fuel mixture supplied through the second pre-chamber holes 242A and 242B to the precombustion chamber 26 flows, as illustrated by an arrow F10-1, toward the side surface of the first interference member 25B and the surfaces of the first interference members 25F in the precombustion chamber 26. As the air-fuel mixture then colliding with the first interference members 25B and 25F, the flow directions of the air-fuel mixture are changed and the air-fuel mixture then collides with the second interference member 27 as illustrated by an arrow F10-2.

As illustrated by an arrow F10-3, the air-fuel mixture flows toward the through hole 27*a* of the second interference member 27 and flows through the through hole 27*a* into the residual exhaust gas storage space S. At this time, an air-fuel mixture partially flows toward the first interference member 25B as illustrated by an arrow F10-5.

The air-fuel mixture having flowed toward the first interference member 25B flows, as illustrated by an arrow F10-6, in the direction from the second interference member 27 toward the end face 25*a* of the first interference member 25B. At and near the ignition point BP, the air-fuel mixture flows, as illustrated by an arrow F10-6, toward the first interference member 25B. Thus, at and near the ignition point BP, the flow of the air-fuel mixture toward the first interference member 25B is generated. As a result of the air-fuel mixture then colliding with the first interference member 25B, a stagnation point of the air-fuel mixture is created near the point at which the air-fuel mixture collides with the first interference member 25B.

On the other hand, the air-fuel mixture having flowed to the residual exhaust gas storage space S collides with the surface of the window member 22 and spreads in directions toward the inner circumferential surface 24*b* as illustrated by an arrow F10-4. The air-fuel mixture in the residual exhaust gas storage space S circulates in the residual exhaust gas storage space S and passes through the through hole 27*a* of the second interference member 27. The air-fuel mixture having passed through the through hole 27*a* flows, together with the air-fuel mixture that has been branched as illustrated by an arrow F10-5 without flowing through the through hole 27*a*, toward the first interference member 25B.

Thus, in the ignition device 11H, the first interference members 25F and second interference member 27 are provided, and, in front of (in the (−z)-axis direction of) the window member 22, the residual exhaust gas storage space S is formed by the window member 22, the pre-chamber cap 24E, and the second interference member 27. The residual exhaust gas storage space S functions as a gas storage tank for storing an air-fuel mixture as a residual exhaust gas. In addition, an air-fuel mixture in the residual exhaust gas storage space S passes through the through hole 27*a* to reach the precombustion chamber 26. Therefore, it is not easy for an air-fuel mixture in the residual exhaust gas storage space S to reach the precombustion chamber 26. Therefore, by storing in the residual exhaust gas storage space S a residual exhaust gas in the pre-chamber to prevent the residual exhaust gas from being mixed too much with an air-fuel mixture flowing from the main combustion chamber 19, it is possible to reduce the remaining rate of the residual exhaust gas flowing to the ignition point BP. As a result of thus reducing the remaining rate of the residual exhaust gas, it is possible to improve the stability in ignition at the ignition point BP. Thus, by using the ignition device 11G, it is possible to implement stable operation of the engine.

In the ignition device 11H, as a result of the residual exhaust gas storage space S being formed on the emission side of the window member 22 in the pre-chamber cap, it is possible to cause an air-fuel mixture that has flowed through the first pre-chamber holes 241A-241D and the second pre-chamber holes 242A and 242B to flow to the ignition point BP faster. As a result, it is possible to increase the inflow amount of an air-fuel mixture. As a result of the inflow amount of an air-fuel mixture thus being increased, the remaining rate of a residual exhaust gas in the zones near the first pre-chamber holes 241A-241D and the second pre-chamber holes 242A and 242B are lowered. Thus, it is possible to reduce the flow rate of a residual exhaust gas supplied through the first pre-chamber holes 241A-241D and the second pre-chamber holes 242A and 242B to the ignition point BP.

Note that, according to the present embodiment, the axes of the second pre-chamber holes 242A and 242B cross the second interference member 27. However, the axes of the second pre-chamber holes 242A and 242B need not cross the second interference member 27.

According to the present embodiment, the through hole 27*a* of the second interference member 27 has a circular shape. However, the through hole 27*a* of the second interference member 27 may have a polygonal shape such as a triangular shape, or a rectangular shape, or may have an elliptic shape.

Ninth Embodiment

An ignition device according to a ninth embodiment will now be described with reference to drawings. Note that, for members having the same functions as the functions of the first embodiment through the eighth embodiment, the same reference signs are given and detailed descriptions for the members will be omitted. The ignition device according to the present embodiment is the same as the ignition device according to the first embodiment illustrated in FIGS. 2 and 3 described above except that the laser device 21 of the ignition device 11A and the optical window 221 of the window member 22 in the first embodiment are replaced by a spark plug. Therefore, a configuration of only the spark plug will be described.

Figure 35:
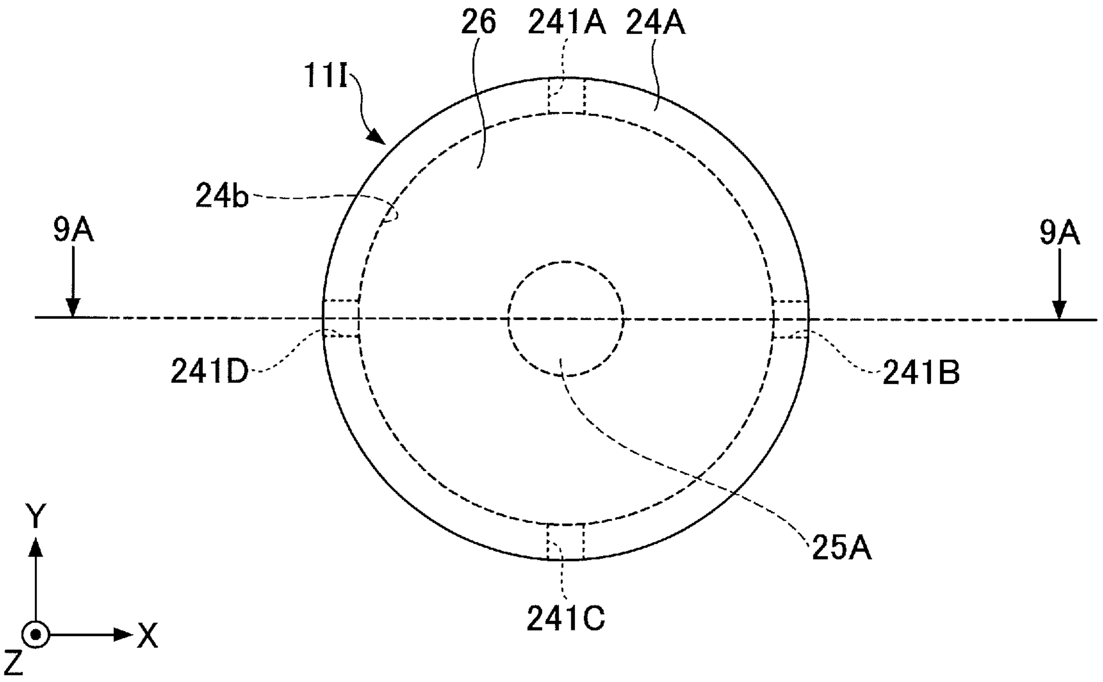
FIG. 35 is a front view illustrating a configuration of a pre-chamber cap obtained from viewing an ignition device according to a ninth embodiment from a main combustion chamber side.
Figure 36:
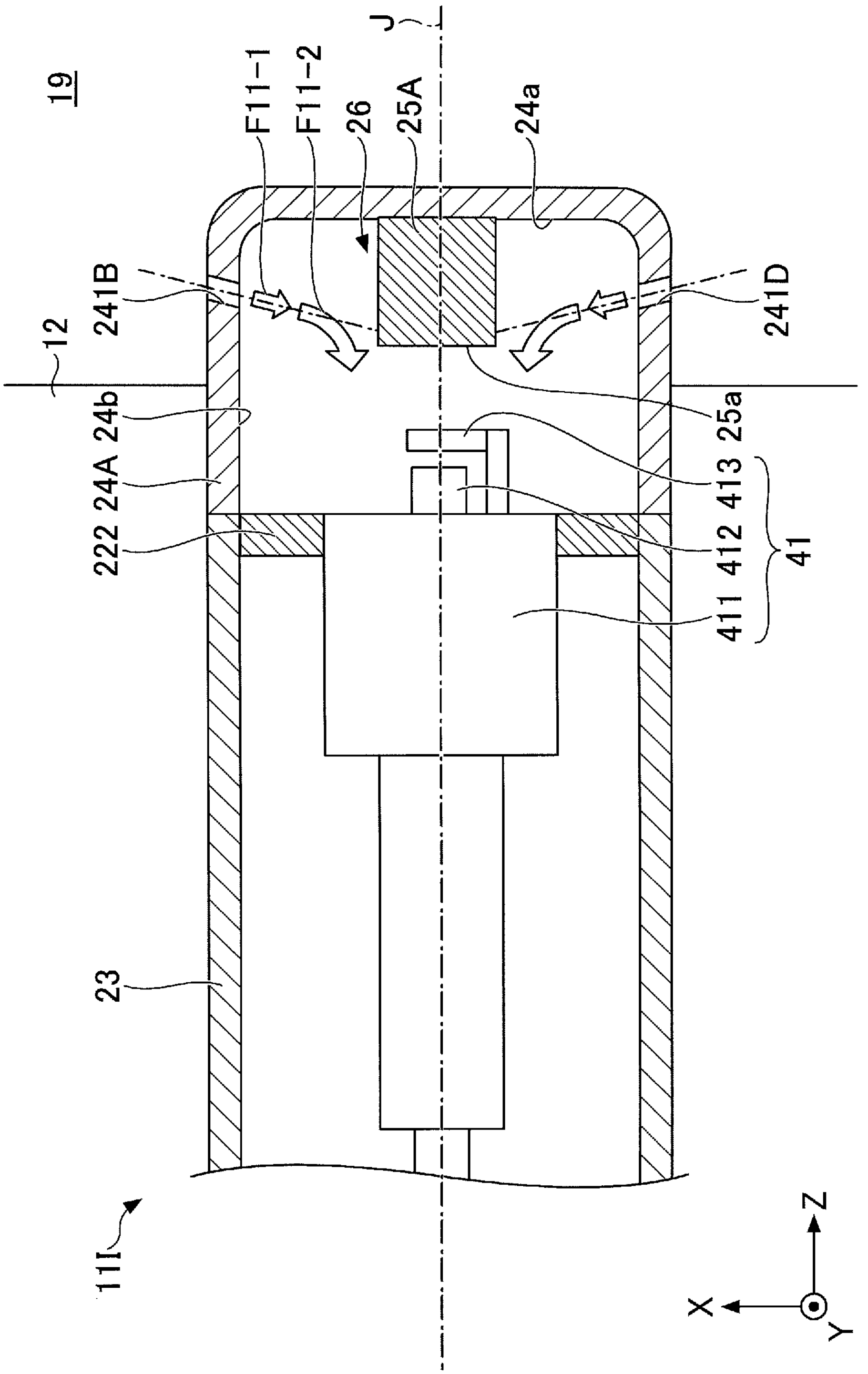
FIG. 36 is a sectional view taken along a 9A-9A line illustrated in FIG. 35.

FIG. 35 is a front view illustrating a configuration of a pre-chamber cap 24A when an ignition device according to the ninth embodiment is viewed from the main combustion chamber; FIG. 36 is a sectional view taken along a line 9A-9A of FIG. 35. As illustrated in FIGS. 35 and 36, the ignition device 11I uses the spark plug 41 instead of the laser device 21 and the optical window 221 of the window member 22.

As the spark plug 41, a known ignition plug may be used. The spark plug 41 includes an insulator 411, a center electrode 412, and an earth electrode 413.

The insulator 411 supports the center electrode 412 inside in a state where the center electrode 412 is electrically insulated.

The center electrode 412 is provided to project from an end of the insulator 411 into the precombustion chamber 26.

The earth electrode 413 is formed to have a rectangular shape and is provided at a position away from the center electrode 412 by a predetermined space (a discharge gap). The earth electrode 413 is fixed at a fixing end that is provided on an end face of the insulator 411 through welding or the like.

In the ignition device 11I, during a suction stroke of the engine 10, an air-fuel mixture supplied to the main combustion chamber 19 of the engine 10 (see FIG. 1) is forcibly supplied from the main combustion chamber 19 through the first pre-chamber holes 241A-241D to the precombustion chamber 26. Thereafter, a voltage is applied between the center electrode 412 and the earth electrode 413 so that, at the discharge gap, a plasma arc, i.e., a spark discharge is generated. As a result of the spark discharge igniting the air-fuel mixture, an ignition flare 31 (see FIG. 4) is generated at the discharge gap. The ignition flare 31 (see FIG. 4) is jetted to the main combustion chamber 19 through the first pre-chamber holes 241A-241D during a combustion stroke of the engine 10 (see FIG. 1).

An air-fuel mixture having flowed from the main combustion chamber 19 through the first pre-chamber holes 241A-241D to the precombustion chamber 26 as mentioned above flows as illustrated by an arrow F11-1. The flow directions of the air-fuel mixture are changed near the first interference member 25A, the air-fuel mixture flows as illustrated by an arrow F11-2, and the air-fuel mixture flows toward the optical window 221. As a result of the air-fuel mixture then being burned by the spark discharge generated at the discharge gap, the air-fuel mixture in the precombustion chamber 26 is jetted through the first pre-chamber holes 241A-241D as an ignition flare 31 (see FIG. 4). According to the present embodiment, near the discharge gap, the flow directions of an air-fuel mixture are changed by the first interference member 25A, and therefore, the flow rates of the air-fuel mixture are low. Thus, the flow rates of an air-fuel mixture are reduced, and it is possible to generate an initial flare stably.

Generally speaking, for spark ignition using a spark plug, for a case where the flow rates of an air-fuel mixture in a precombustion chamber 26 were high, an initial flare would be generated in the precombustion chamber 26 as a result of the discharge energy being increased. In this regard, according to the present embodiment, it is possible to reduce the flow rates of an air-fuel mixture near the discharge gap, and therefore, it is possible to generate a flare kernel at an initial stage of ignition even at reduced discharge energy. As a result of using reduced discharge energy, it is possible to restrain wear of the center electrode 412 and the earth electrode 413.

Thus, according to the present embodiment, also for a case where the spark plug 41 is used, it is possible to improve the stability in ignition of a fuel, and also, it is possible to elongate the life of the spark plug 41.

Thus, the present invention has been described with reference to the embodiments of the ignition devices and the internal combustion engines. However, the above-described embodiments have been illustrated as examples, and the present invention is not limited to the embodiments. The above-described embodiments can be implemented in other various modes; and various combination, omissions, replacements, alternations, and so can be made within the scope of the present invention. These embodiments and their variants are included in the scope and the spirit of the invention and are included in the scope of the claimed invention and their equivalents.

The present application is based on and claims priority to Japanese patent application No. 2018-009215 filed Jan. 23, 2018 and Japanese patent application No. 2018-200020 filed Oct. 24, 2018; the entire contents of these applications are hereby incorporated herein by reference.

What is claimed is:

1. An ignition device configured to ignite a fuel included in an air-fuel mixture supplied to a main combustion chamber of an internal combustion engine, the ignition device comprising:

a partition member having a front inner surface and a circumferential surface which are provided to form a precombustion chamber that encloses an ignition point of a fuel, the partition member including a plurality of first communicating holes in the circumferential surface to communicate between the main combustion chamber and the precombustion chamber; and a first interference member that protrudes inward from the front inner surface of the partition member, wherein the first interference member is crossed by a central axis of each of the plurality of first communicating holes in a plane including a central axis of the ignition device, wherein the partition member further includes a plurality of second communicating holes in the front inner surface to communicate between the main combustion chamber and the precombustion chamber, each of the plurality of second communicating holes having a central axis not crossing the first interference member, and wherein at least one of the central axes of the plurality of first communicating holes does not intersect any of the central axes of the plurality of second communicating holes.

2. The ignition device according to claim 1, wherein the first interference member is crossed by a straight line connecting between two of the plurality of first communicating holes.

3. The ignition device according to claim 1, wherein the central axis of each of the plurality of second communicating holes crosses a central axis of the ignition device.

4. The ignition device according to claim 1, wherein a greater one of a first angle between the central axis of each of the plurality of first communicating holes and a central axis of the ignition device and a second angle between the central axis of each of the plurality of second communicating holes and the central axis of the ignition device is specified as angle $\alpha$, and a smaller one of the first angle and the second angle is specified as angle $\beta$, and a relationship of (angle $\alpha$)>(angle $\beta$) is held.

5. The ignition device according to, claim 1, wherein the number of the plurality of second communicating holes is smaller than or equal to the number of the plurality of first communicating holes.

6. The ignition device according to claim 1, wherein when the ignition device is projected onto a plane perpendicular to the central axis of the ignition device, each of the plurality of first communicating holes is apart from the central axis of the ignition device by a distance greater than or equal to R/2 where R denotes a maximum distance between the central axis of the ignition device and the front inner surface of the partition member.

7. The ignition device according to claim 1, wherein when the ignition device is projected onto a plane perpendicular to the central axis of the ignition device, respective line segments connecting between the plurality of first communicating holes and the central axis of the ignition device cross one another only at the central axis of the ignition device and any one of the line segments does not overlap with any other one of the line segments.

8. The ignition device according to claim 1, further comprising:

a side plate part on an outer circumferential surface of the first interference member, the side plate part connecting between the first interference member and the partition member.

9. The ignition device according to claim 1, wherein the first interference member includes a plurality of first interference members on the front inner surface of the partition member, and one of the plurality of first interference members is provided at either or both of (i) a portion of an outer circumferential surface of another one of the plurality of first interference member and (ii) an ignition point side of the another one of the plurality of first interference member.

10. The ignition device according to claim 1, further comprising a second interference member that projects from the partition member and has an opening.

11. The ignition device according to claim 10, wherein the second interference member is crossed by a central axis of at least one of the plurality of first communicating holes.

12. The ignition device according to claim 10, wherein the ignition point is on a main combustion chamber side of the second interference member.

13. The ignition device according to claim 1, wherein the ignition device is inserted into an engine head in a state where the partition member is in contact with and projects from the engine head.

14. The ignition device according to claim 1, wherein laser light is used to ignite a fuel, and the laser light is focused at the ignition point.

15. An internal combustion engine for combustion of a fuel to generate a combustion gas, the internal combustion engine comprising:

a main combustion chamber; and the ignition device according to claim 1, wherein in the main combustion chamber, a fuel in the main combustion chamber is ignited and main combustion occurs, precombustion occurs in the precombustion chamber of the ignition device prior to the main combustion, and the fuel in the main combustion chamber is ignited by an ignition flare generated from ignition of a fuel in the precombustion chamber.

16. The ignition device according to claim 1, wherein all the plurality of first communicating holes are provided to have the central axes crossing the first interference member.

* * * * *